US010261960B2

(12) United States Patent
Regni et al.

(10) Patent No.: US 10,261,960 B2
(45) Date of Patent: Apr. 16, 2019

(54) SNAPSHOTS AND FORKS OF STORAGE SYSTEMS USING DISTRIBUTED CONSISTENT DATABASES IMPLEMENTED WITHIN AN OBJECT STORE

(71) Applicant: Scality, S.A., Paris (FR)

(72) Inventors: Giorgio Regni, Paris (FR); Vianney Rancurel, La Frette s/Seine (FR); David Pineau, Sartrouville (FR); Guillaume Gimenez, Joinville le Pont (FR); Jean-Marc Saffroy, Paris (FR); Benoit Artuso, Chanteloupe les Vignes (FR)

(73) Assignee: Scality, S.A., Paris (FR)

( * ) Notice: Subject to any disclaimer, the term of this patent is extended or adjusted under 35 U.S.C. 154(b) by 602 days.

(21) Appl. No.: 14/485,585

(22) Filed: Sep. 12, 2014

(65) Prior Publication Data
US 2016/0077920 A1    Mar. 17, 2016

(51) Int. Cl.
*G06F 7/00* (2006.01)
*G06F 17/00* (2006.01)
(Continued)

(52) U.S. Cl.
CPC .............. *G06F 16/27* (2019.01); *G06F 3/065* (2013.01); *G06F 3/0608* (2013.01);
(Continued)

(58) Field of Classification Search
USPC ....................................................... 707/649
See application file for complete search history.

(56) References Cited

U.S. PATENT DOCUMENTS 7,051,033 B2    5/2006  Agarwal et al.
8,055,622 B1    11/2011 Botes et al.
(Continued)

FOREIGN PATENT DOCUMENTS

WO    2005024552 A3    11/2006

OTHER PUBLICATIONS

Chandy, K. Mani, et al., Distributed Snapshots: Determining Global States of Distributed Systems, ACM Transactions on Computer Systems, Feb. 1985, pp. 63-75, vol. 3, No. 1. University of Texas at Austin and Stanford Research Institute.
(Continued)

*Primary Examiner* — David T. Brooks
(74) *Attorney, Agent, or Firm* — Compass IP Law PC

(57) ABSTRACT

A method is described that includes providing a snapshot counter for a storage system implemented with multiple distributed consistent database instances. The method further includes recognizing the taking of a snapshot of the storage system by incrementing the snapshot counter from a first snapshot counter value to a second snapshot counter value. The method further includes, in response to a first change for one of the distributed consistent databases subsequent to the taking of the snapshot, performing the following: saving state information of the distributed consistent database as the state information existed prior to the change and associating the first snapshot counter value to the state information. Associating the second snapshot counter's value with the distributed consistent database having the first change. Another method for the taking of a snapshot of a distributed consistent database is also described.

19 Claims, 33 Drawing Sheets

(51) Int. Cl.
   G06F 16/27    (2019.01)
   G06F 3/06     (2006.01)
   G06F 11/14    (2006.01)
(52) U.S. Cl.
   CPC .......... *G06F 3/0619* (2013.01); *G06F 3/0641*
         (2013.01); *G06F 3/0665* (2013.01); *G06F*
         *11/1435* (2013.01); *G06F 11/1451* (2013.01);
            *G06F 11/1446* (2013.01); *G06F 2201/80*
                 (2013.01); *G06F 2201/84* (2013.01)

(56) References Cited

U.S. PATENT DOCUMENTS

| | | | |
|---|---|---|---|
| 8,200,706 | B1 | 6/2012 | Sim-Tang |
| 8,250,035 | B1* | 8/2012 | Tang ................ G06F 17/30088 |
| | | | 707/639 |
| 8,260,792 | B1 | 9/2012 | Hsu |
| 8,352,431 | B1 | 1/2013 | Protopopov et al. |
| 8,429,444 | B2 | 4/2013 | Rancurel et al. |
| 8,515,911 | B1* | 8/2013 | Zhou ................ G06F 17/3023 |
| | | | 707/638 |
| 8,775,428 | B2 | 7/2014 | Birdwell et al. |
| 8,825,602 | B1* | 9/2014 | Desai ............... G06F 17/30088 |
| | | | 707/646 |
| 9,152,648 | B2 | 10/2015 | Regni et al. |
| 9,311,135 | B2 | 4/2016 | Regni et al. |
| 9,652,334 | B2 | 5/2017 | Junqueira et al. |
| 2003/0159007 | A1* | 8/2003 | Sawdon ............ G06F 11/1435 |
| | | | 711/154 |
| 2004/0088301 | A1* | 5/2004 | Mahalingam ..... G06F 17/30067 |
| 2005/0065986 | A1 | 3/2005 | Bixby et al. |
| 2005/0203819 | A1 | 9/2005 | Rogers et al. |
| 2006/0106878 | A1* | 5/2006 | Shitomi ............ G06F 17/30067 |
| 2007/0043790 | A1* | 2/2007 | Kryger ............. G06F 17/30613 |
| | | | 707/204 |
| 2007/0067583 | A1* | 3/2007 | Zohar ............... G06F 11/1458 |
| | | | 711/162 |
| 2008/0040565 | A1 | 2/2008 | Rozas et al. |
| 2008/0059541 | A1* | 3/2008 | Fachan ............ G06F 17/30088 |
| 2008/0183973 | A1* | 7/2008 | Aguilera .......... G06F 11/1464 |
| | | | 711/147 |
| 2009/0112880 | A1 | 4/2009 | Oliveira et al. |
| 2009/0112908 | A1 | 4/2009 | Wintel et al. |
| 2009/0144342 | A1* | 6/2009 | Sudhakar ........... G06F 17/3023 |
| 2009/0150364 | A1 | 6/2009 | Melander et al. |
| 2009/0254693 | A1 | 10/2009 | Karamanolis et al. |
| 2010/0082538 | A1* | 4/2010 | Rentsch ........... G06F 17/30457 |
| | | | 707/616 |
| 2010/0199040 | A1 | 8/2010 | Schnapp et al. |
| 2012/0079207 | A1* | 3/2012 | Yochai .............. G06F 11/1451 |
| | | | 711/141 |
| 2012/0130949 | A1* | 5/2012 | Picken ............. G06F 17/30115 |
| | | | 707/626 |
| 2012/0259863 | A1* | 10/2012 | Bodwin ............ G06F 17/3023 |
| | | | 707/747 |
| 2014/0040199 | A1* | 2/2014 | Golab .............. G06F 17/30309 |
| | | | 707/634 |
| 2014/0258239 | A1* | 9/2014 | Amlekar .......... G06F 11/1402 |
| | | | 707/649 |
| 2014/0280187 | A1 | 9/2014 | Molaro |
| 2015/0254272 | A1 | 9/2015 | Regni et al. |
| 2016/0004720 | A1* | 1/2016 | Tabaaloute ....... G06F 17/30607 |
| | | | 707/639 |
| 2016/0019081 | A1* | 1/2016 | Chandrasekaran ...................... |
| | | | G06F 9/45558 |
| | | | 718/1 |

OTHER PUBLICATIONS

Pilarski, Slawomir, et al., Checkpointing for Distributed Databases: Starting from the Basics, IEEE Transactions on Parallel and Distributed Systems, Sep. 1992, vol. 3, No. 5, pp. 602-610, School of Computing Science, Simon Fraser University, Burnaby, B.C. Canada.

Dabek, Frank et al., Wide-Area Cooperative Storage with CFS, SOSP '01, Oct. 21-24, 2001, 14 pages, MIT Laboratory for Computer Science, Banff, Canada.

Peterson, Zachary N. J., et al., Ext3cow: A Time-Shifting File System for Regulatory Compliance, ACM Transactions on Storage, vol. 1, Issue 2, May 2005, 21 pages.

Bonwick, Jeff, et al., The Zettabyte File System, 2003, 13 pages.

MacCormick, John., et al., Boxwood: Abstractions as the Foundation for Storage Infrastructure, 2004, 16 pages, Microsoft Research Silicon Valley.

Henson, Val, et al., Double the Metadata, Double the Fun: A Cow-like Approach to File System Consistency, 2004, 5 pp., IBM, Inc.

Rodeh, Ohad, B-trees, Shadowing, and Clones, 2007, 51 pages, IBM Haifa Research Labs.

Shaull, Ross, et al., Skippy: A New Snapshot Indexing Method for Time Travel in a Storage Manager, SIGMOD '08, Jun. 9-12, 2008, pp. 637-648, Department of Computer Science, Brandeis University, Waltham, Massachusetts.

Aguilera, Marcos K., et al., A Practical Scalable Distributed B-Tree, PVLDB '08, Aug. 23-28, 2008, pp. 598-609, Auckland, New Zealand.

Kara, Jan, Ext4, btrfs, and others, SUSE Labs, 2008, 13 pages, Czech Republic.

Kasampalis, Sakis, Chapter 3 "Copy On Write based file systems" from Copy On Write Based File Systems Performance Analysis and Implementation, 2010, Technical University of Denmark, Department of Informatics, Kongens Lyngby, Denmark, 94 pages.

Wu, Sai, et al., Efficient B-tree Based Indexing for Cloud Data Processing, Proceedings of the VLDB Endowment, 2010, 12 pages, vol. 3, No. 1, School of Computing, National University of Singapore, Singapore.

SnapLock® Compliance and Snaplock Enterprise Software, Datasheet, 2006, 2 pages.

EMC ISILON SnapShotIQ, Datasheet, Aug. 2012, 2 pages.

Klosowski, Przemek, B-Tree File System BTRFS, DCLUG, Aug. 2009, 14 pages.

Bonwick, Jeff, et al., ZFS The Last Word in File Systems, SDC Storage Developer Conference, SNIA Santa Clara, 2009, 44 pages.

"The Non-Volatile Systems Laboratory NV-Heaps: Fast and Safe Persistent Objects", http://nvsl.ucsd.edu/nvuheaps/, 2 pgs., Sep. 1, 2011.

Ceph Developers Ceph Documentation Release dev Ceph Developers, Aug. 8, 2012. Section 1.

Ceph Developers Ceph Documentation Release dev Ceph Developers, Aug. 8, 2012. Section 2.

Stender, Jan et al., "Loosely Time-Synchronized Snapshots in Object-Based File Systems", Performance Computing and Communications Conference (IPCCC), 2010 IEEE $29_{th}$ International, IEEE, Dec. 9, 2010. pp. 188-197, Sections 4 and 5.

Sage A. Weil:, 'CEPH: Reliable, Scalable, and High-Performance Distributed Storage, University of Carolina Dissertation, Dec. 31, 2007, Chapter 4, pp. 27-81.

Notification of Transmittal of the International Search Report and Written Opinion, in related Application No. PCT/2015/018834, dated Jul. 29, 2015, 17 pages.

Cohen, et al., "Version Management in Gypsy", Software Engineering Notes, ACM, New York, New York, vol. 13, No. 5, Nov. 1, 1988, pp. 201-215.

Starting on p. 5, paragraphs [0063] through paragraph [0096] only of the published patent application 2015/0254272A, filed Mar. 5, 2014, pp. 5-7.

Final Office Action for U.S. Appl. No. 14/627,962, dated Sep. 20, 2018, 7 pages.

Notice of Allowance for U.S. Appl. No. 14/627,954, dated Aug. 26, 2018, 8 pages.

Office Action for U.S. Appl. No. 15/163,560, dated Jul. 27, 2018, 24 pages.

Notice of Allowance for U.S. Appl. No. 15/163,560, dated Feb. 6, 2019, 10 pages.

(56) References Cited

OTHER PUBLICATIONS

Office Action for U.S. Appl. No. 15/384,159, dated Nov. 7, 2019, 11 pages.

* cited by examiner

SNAPSHOTS AND FORKS OF STORAGE SYSTEMS USING DISTRIBUTED CONSISTENT DATABASES IMPLEMENTED WITHIN AN OBJECT STORE

FIELD OF THE INVENTION

The field of invention relates generally to the computing sciences and more specifically to snapshots and forks of storage systems using distributed consistent databases implemented within an object store.

BACKGROUND

FIG. 1 depicts three primary types of storage systems. As will be made more clear immediately below, what differentiates each of the storage systems from one another is the mechanism that is used to access the stored information.

FIG. 1a shows basic object storage. In the case of an object store, a requestor 101 requests access to a specific item of stored information ("an object") from the object store 102 by way of an "object ID" 103. An object ID is a uniquely identifying reference of a specific object with the store (e.g. a randomly assigned alphanumeric character). Another type of store that conceptually has a large degree of overlap with an object store is a "key-value" store. By definition, a key-value store maps individually stored information (i.e., the "values") to individual keys that are uniquely assigned to the values. A specific set of stored values are accessed by providing the store with the key for those values. Thus, the "key" corresponds to an "object ID" and the "values" correspond to an "object".

FIG. 1b shows file directory based storage. In the case of file directory based storage individual items of stored information are kept in files 104_1 through 104_N. Files are organized into a directory where any sub-directory 106_1 through 106_M can include one or more files or one or more lower sub-directories. A specific item of information is obtained by accessing its file. The file is accessed by articulating the path through the directory that leads to the file. For example, in the exemplary directory of FIG. 1b, file 104_3 is accessed by articulating "C/FOO/BAR/NOTES".

FIG. 1c shows block based storage. In the case of block based storage, the storage resource is viewed as being broken down into contiguous blocks 107_1 through 107_N. A specific item of information is accessed by identifying the block where it resides. A common type of block storage is a "thin provisioning" system in which a block is identified by an offset within a larger "logical" storage resource. Thin provisioned systems have been traditionally used to more efficient use of physical storage resources as unused block segments do not occupy physical storage space. For example, a logical file (e.g., as contemplated by an operating system) may include active data portions or "stripes" where actual data resides and "unused" portions where no substantive data resides.

The unused portions may correspond, for instance, to regions that have not been written to yet. The "real" data that has been written to is written in "stripes". For example, if FIG. 1c represents a logical file that spans offset 80 through 106, stripes 80-87 and stripes 100-106 contain real data and are stored in physical storage while offset values 88-99 are understood to contain 0s that are not actually stored in physical storage.

While FIGS. 1a-1c depict core physical storage solutions by themselves, FIG. 1d shows a fundamental usage case or implementation of any of these core storage solutions. FIG. 1d shows a traditional "database" storage implementation. As observed in FIG. 1d, the traditional database storage implementation includes a database interface 108, an indexing layer 109 and a storage layer 110.

The database interface layer 108 accepts queries to the database storage (e.g., according to some type of predefined structured query language (e.g., SQL) or other query format). A common feature of queries is that they often identify data by its content rather than a particular address where the sought for data is found. For example, a query submitted through interface 108 might ask for all email addresses having a specific string (e.g., "@abc.com"). It is the role of the indexing and storage layers 109, 110 to actually find the targeted information.

The indexing layer 109 exists to speedup lookups into the storage layer 110. As a point of comparison, without the indexing layer 109, a query for a particular item of information within the storage layer 110 would be accomplished primarily by scrolling through each item of information kept by the storage layer 110 until the sought for information was found.

The function of the indexing layer 109 is similar to the index at the end of a textbook. With input criteria specifying the sought after information (e.g., "@abc.com"), the index returns with one or more pointers or other information useable to fetch the specifically requested information from the storage layer 110. Thus the indexing layer 109 can be viewed as a mechanism for effectively searching the contents of the underlying storage layer 110.

The storage layer 110 corresponds to the resources used to actually store the information and can be implemented with any of the storage systems discussed above with reference to FIGS. 1a through 1c.

FIG. 1e depicts the implementation of a relational database. As is understood in the art a relational database is typically contemplated as a collection of tables. The individual rows of the various tables are viewed as the records that are kept by the relational database. The columns of a particular table are used to keep the various data items for a particular row. For example, referring to table 120, if each row represents a particular person, a first column may be used to keep the person's name, a second column may be used to keep the person's phone number, a third column may be used to keep the person's email address, etc. Rows whose data content are defined by the same set of columns are logically viewed as being kept within the same table.

Typically, one column of a table is identified as the "primary key" used to identify a particular row within the table. For example, continuing with the example above where each row represents a person, one column of a table may be used for a "userid" that uniquely identifies the person. With the userid for a particular person, the row in the table for the particular person can be easily fetched. In this sense, the userid also acts as a primary key for accessing the table as well. Here, a primary key may include a combination of an identifier of the table and an identifier of a specific row within the table. The columns of a table may also include the primary keys of (rows of) other tables to establish "relationships" between records. For example, if the columns of table 120 table keep the personal information for specific people, one of these columns may include the primary key for another table 121 that keeps records on the employers of these people.

Thus, if a logic operation desires to know specific information about an employer of a particular individual, the logic operation may first access the person's record from table 120 with the userid for that person and obtain the primary key for the row in table 121 that contains information about the person's employer.

Relational databases can also be "queried" for specific information. For example, the relational database discussed above could be queried to provide the names of all people who have a specific area code in their phone number. Here, the first table 120 would be accessed, all the records having the sought for area code would be extracted and the information from the name column of these extracted records would be provided as the query result.

Note that an indexing layer 122 could be used to speed up the querying process. That is, rather than simply access the table 121 and scroll row-by-row through it for records having the desired area code, instead, an index layer 122 could be built on top of the tables 120, 121 that is designed to provide the primary keys of people based on their area code. Here, the index 122 can take the form of a B+ tree whose nodes are associated with specific area code numeric ranges with a narrower range being specified moving down through the tree. Eventually the leaf pages of the B+ tree are reached that provide specific primary keys for specific people having a specific area code. In a basic approach there is a separate index for every column in a table so that any query for any item of information within the table can be sped up as described above. Of course, any changes to the records in the table will need to be reflected in the index.

FIGURES

FIGS. 1a through 1e pertain to prior art storage technologies;

Figure 18A:
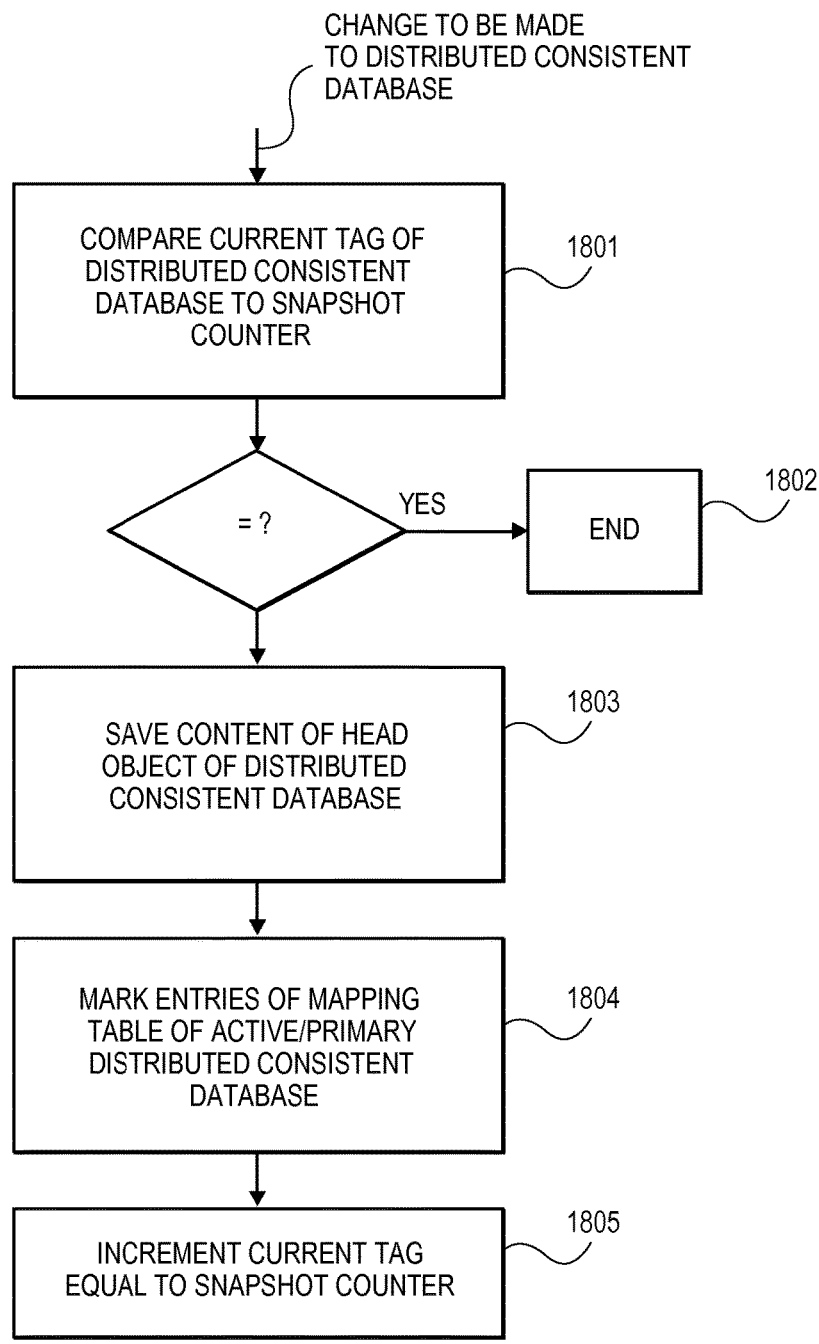

FIGS. 18a,b,c each show methodologies that pertain to snapshots of a storage system.

FIG. 19A through 19I demonstrate mapping table and object manipulations as a function of global forking, global snapshots, local forking and local snapshots;

DETAILED DESCRIPTION 1.0 Overview

Figure 2:
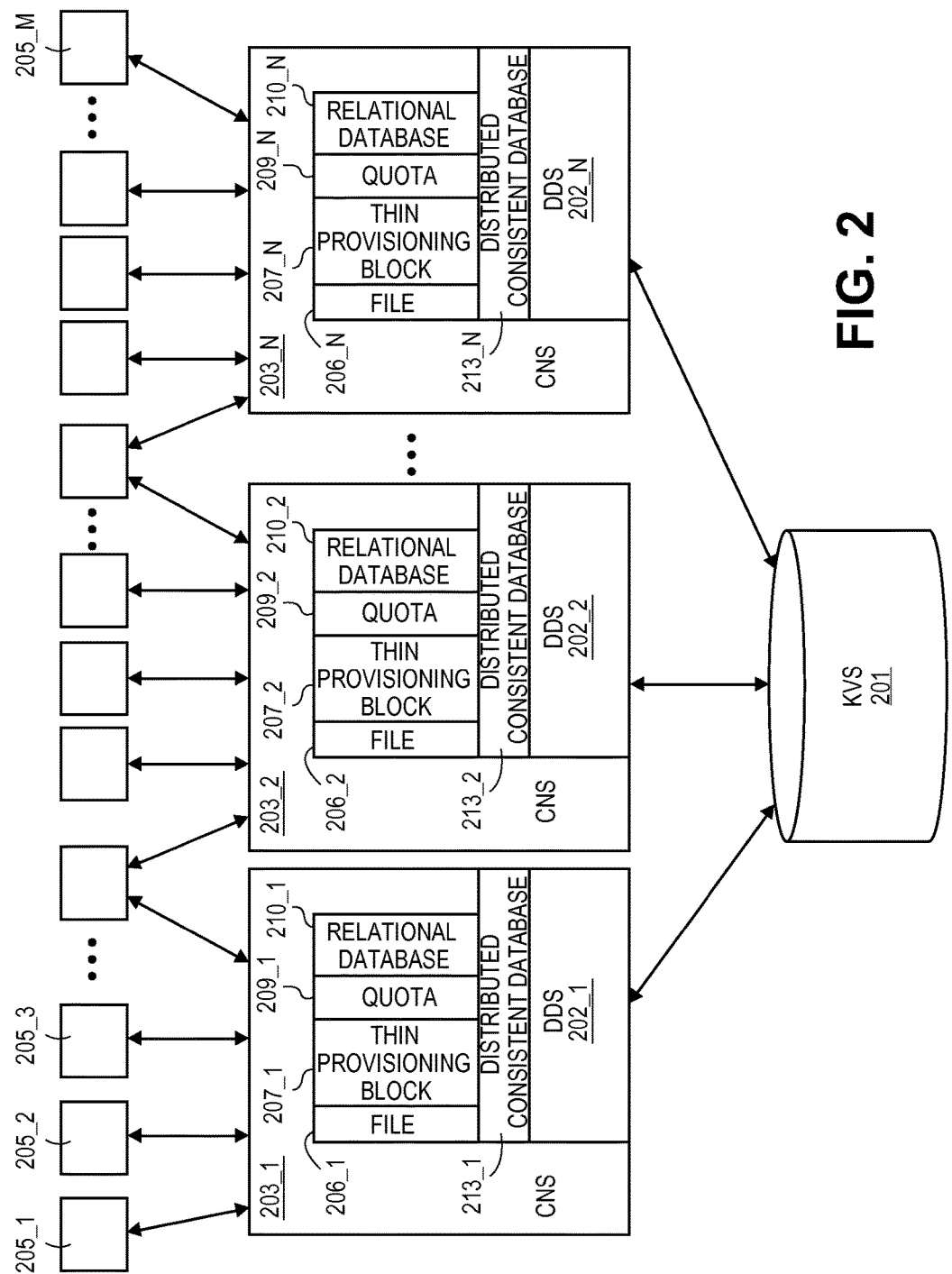
FIG. 2 shows an improved storage technology that provides for quotas, thin provisioning and relational databases with distributed consistent database technology.

FIG. 2 shows an embodiment of a new and versatile storage architecture 200. As observed in FIG. 2, the new architecture includes an object or key value store (KVS) 201, a distributed database management system (DDS) 202 (implemented with separate DDS instances 202_1 through 202_N) and a connectors node system (CNS) 203 (implemented with separate CNS instances 203_1 through 203_N).

At a high level perspective, the KVS 201 can be viewed as the principle storage resource of the system. In various implementations the KVS is implemented as an "object store" that stores "objects". Objects and object stores are well understood in the art. Objects are units of fundamental storage in an object store. Each object is assigned its own unique (e.g., random) identifier that uniquely identifies its corresponding object. This particular type of access is distinguishing from other types of storage systems such as file systems (whose fundamental unit of storage, a "file", is identified with a directory path) and block storage systems (whose fundamental unit of storage, "a block" is identified with a numerically restrictive offset).

Here, as will be discussed at length below, in an embodiment, the KVS 201 is implemented as an object store having a Chord-like distributed hash table access mechanism. The combination of a Chord-like distributed hash table access mechanism with an object store provides for certain advantages for large scale storage systems (principally: intelligent routing resulting in reduced message passing, parallel accessing capability and the ability to keep meta-data along with the stored information).

As described in the background, however, key value store systems employ the use of a key or object ID as the primary mechanism for accessing the data. This means other storage types, such as directory storage or block types of storage, are not natively implemented on the primary KVS storage 201.

The DDS 202 therefore is added as a database management layer above the KVS 201 to provide interfaces 206, 207 of the KVS 201 that permit the KVS 201 to be used as file directory or block based storage system. The file directory interface 206 essentially acts as a translation layer that converts an access specified in the form of a directory into an object ID for the KVS 201. Likewise the block storage interface 207 acts as a translation layer that converts an access specified in the form of an offset (or other type of block specific access) into an object ID for the KVS 201. Practically then, the KVS 201 can be used directly as a key value store or, indirectly as a directory based storage (with a directory interface 206) or indirectly as a block store (with a block interface 207). If the KVS 201 is sufficiently large, one or more of each of these different types of storage systems may be simultaneously implemented.

In an embodiment, both of these interface layers 206, 207 are built with a special mechanism, referred to as an "distributed consistent database", for effectively imposing structure or organization into the KVS 201 Each instance of a distributed consistent database includes a head object for the structure to be imposed. The head object has a mapping table that defines the hierarchy of the structure and its implementation in KVS. In an embodiment, the mapping table: i) identifies a root page that represents the apex of the hierarchy; ii) identifies the intermediate and leaf pages that reside beneath the root page; iii) maps the "page ID" of the intermediate and leaf pages to specific object IDs within the KVS 201. Leaf pages contain object ID(s) (or information from which object ID(s) can be determined) for the information within KVS that the structure was accessed to obtain.

Individual users can be provided, through interface 213, with their own distributed consistent database instances for their own individual storage. For example, a first user may be provided a first distributed consistent database instance for storage of the first user's content and a second user may be provided with a second distributed consistent database instance for storage of the second user's content, etc. However, multiple distributed consistent database instances can also be coordinated together as fundamental kernels in the construction of a singular, extremely large capacity storage solution. In one approach, a unique distributed consistent database is instantiated at each node of a storage system's hierarchy (e.g., each directory, each sub-directory and each file of a file system) to effect extremely large and easily managed storage resources at each node of the system.

As such, as observed on FIG. 2, the file directory interface 206 uses the distributed consistent database technology 213 to effect extremely large scale file directories, and, the block storage interface 207 uses the distributed consistent database technology 213 to effect extremely large block storage systems.

Moreover, the behavior of the distributed consistent database naturally lends itself to the implementation of "functional bricks" that can run on top of any storage system implemented within the KVS 201. An example of one such functional brick is a quota policy 209. Another functional brick is a relational database 210. The functional bricks 209, 210 and interfaces 206, 207, 213 can be used in various combinations to effect various storage systems.

With the DDS 202 and the CNS 203 a wide range of different storage system interfaces to end-users 205_1 though 205_M. Here, an "end-user" or "user" or "requestor" is any entity that makes use of the storage resources in KVS 201. Examples include an application software instance, an application software process, a client computer instantiated with any one or more of these software instances/processes, an organization such as a corporation, etc.

With direct access to the KVS 201, the CNS 203 is able to provide various object store connectors/interfaces to end-users (e.g., Cloud Data Management Interfaces (CDMI), Simple Storage System (S3), etc.). With access to the file directory interface 206 provided by the DDS 202, the CNS 203 is able to provide any directory file system connector/interface to end-users (e.g., Network File System (NFS), Common Internet File System (CIFS), File System in User Space (FUSE), etc.). Likewise with access to the block storage interface 207 provided by the DDS 202, the CNS 203 is able to provide any block storage system connector/interface to end users (e.g., iSCSI, FC). Again, any/all of these different storage solutions may simultaneously be implemented on the KVS 201 as the actual physical storage resource.

2.0 The KVS System

Figure 3:
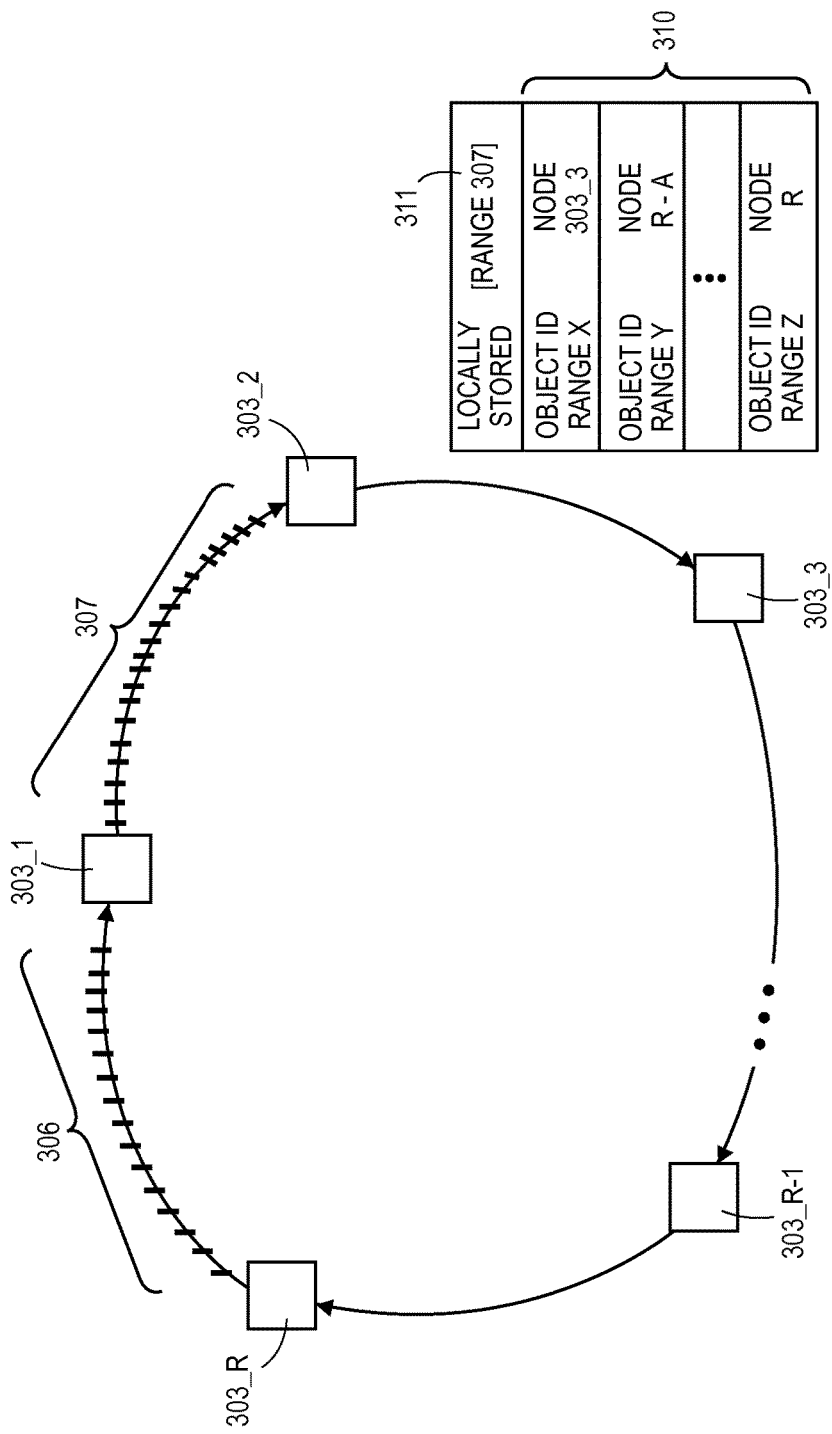
FIG. 3 shows an exemplary KVS layer.

FIG. 3 shows a depiction of an embodiment 301 of the KVS system 201 of FIG. 2. As mentioned above the KVS system 301 can be implemented as an object store having a Chord or Chord-like distributed hash table access mechanism. Such a KVS system 301 can readily be implemented with less expensive disks. Moreover, due to the fact that any of its storage nodes can receive input queries, it essentially has a parallel accessing structure which can be used to diminish any points of contention when writing in parallel and offers good overall parallel I/O performance.

As will be described in more detail below, in an embodiment, the KVS system 201 has the following properties: 1) it is composed of storage nodes; 2) it understands specific verbs to create, read, update and delete data; 3) it manages versions and other system attributes per object; 4) it understands specific verbs to manage reservations which prevent concurrent writers to overwrite an object; 5) it forbids concurrent writing to and reading from the same object; 6) it permits concurrent multiple reads of the same object; 7) it does not require a strong consensus algorithm to operate; 8) the system may have hierarchical levels in which an attempt is made to place objects that are more likely to be accessed in a higher level than objects that are less likely to be accessed (e.g., caching); 9) multiple replicas of a same data object may be stored on different storage nodes to ensure reliability should any particular node go down.

The same keyspace is used for both keys and actual storage nodes where the entirety of the keyspace is envisioned as a logical "ring". Some locations on the ring 303_1 through 303_R correspond to actual storage nodes. Each storage node may receive queries from one or more DDS instances. Remaining ring locations correspond to the respective keyspace IDs or "object IDs" for the data objects that are stored on the storage nodes. Thus, the object ID for a stored data object essentially defines its storage location on the ring.

According to the routing scheme of the system, object IDs are mapped to their successor node. For example, the object IDs within range 306 are mapped to node 303_1, the object IDs within range 307 are mapped to node 303_2, etc.

Each storage node has its own associated routing function, referred to as a finger table. FIG. 3 depicts node 303_2's finger table 311 as an example. Finger table 311 identifies the range 307 of the object IDs 309 whose corresponding objects are stored locally on node 303_2. Node 303_2's finger table 211 also includes routing information 310 that directs a query for any object ID outside its local range 309 to another more appropriate node downstream along the ring. As such, when an object ID is presented to the finger table 311 of node 303_2, the locally stored range 307 information is referred to and the requested data object is immediately returned if it is stored locally on node 303_2. If the object ID is outside node 303_2's object ID range 307 the query is directed further along the ring to a particular node specified in node 303_2's routing information 310.

Generally, the farther a querying object ID is outside a node's local storage range, the farther downstream along the ring the node's routing information will direct the query. The mathematical protocol used in construction of the nodes' respective finger tables ensures that the query will "hit" the node whose local storage range covers the querying object ID within a limited number of routing hops around the ring.

Additionally, through a technique referred to as "replication", a single object ID can be mapped to more than one node along the ring. By so doing, multiple instances of a particular data object are kept at various nodes along the ring thereby ensuring reliability should a node having the data object suffer a failure. When a node does fail, all that needs to be done to reconfigure nodal routing information is to update the failing node's successor to include the failing node's object ID range and update the finger table routing information of the affected nodes along the ring.

According to one approach, referred to as "consistent hashing" each of the nodes along the ring will locally store approximately the same number of object IDs As such complex routing table reconfiguration is not required in the face of a node failure or join.

The object ID for a stored data item may, for instance, be a randomly assigned value or the output of a hashing function. In one implementation, an object ID is assigned for a data item when the data is first presented to the KVS system for storage (e.g., with a CREATE operation). The KVS system may provide the caller of the CREATE operation with the object ID for the data item for subsequent reference to the same data object.

In an implementation, the "object ID" corresponds to entropy information within a larger key structure that is actually used to fetch data along the ring. The larger key structure may include, for example, information appended to the entropy object ID that identifies the number of replicas of the data object within the system as well as which replica the specific key structure corresponds to.

In one embodiment, the individual data items that are stored in the KVS system are embodied as a "chunk" of information having not only the actual data object being stored but also meta-data containing system and/or user defined meta data that is stored along with the actual data object (for simplicity the remainder of the document will refer mainly to a data object). The system meta-data may include, e.g., time of creation of the data object, size of the data object, last access time of the data object, last modification time of the data object and the version number of the data object among other possible characteristics. The user defined meta-data can be any attribute of the data object defined by the user. System meta-data is updated as appropriate when an object is accessed. User meta-data (and even system meta-data) for a particular data object may be returned along with the data object whenever the data is accessed (e.g., for GET and PUT operations).

In an embodiment, the KVS system supports CREATE, PUT, DELETE and GET operations and uses a reservation system to ensure data consistency. Here, RESERVE commands are sent to nodes to effectively place a lock on the data item.

In the case of a CREATE operation, which is used to create a new object, a RESERVE command is initially sent to every node that will be used to store the data object or a replica of the data object. A subsequent CREATE command for the same object is not issued to any such node until an appropriate response is received from each node to which a RESERVE command was sent. In the case of the creation of a new data object, an appropriate response to a RESERVE command includes an indication that the object ID for the new data object is available and there are no competing requests for the same object ID.

In the case of a PUT operation, which is used to update an existing data object, like the CREATE operation, a RESERVE command with a "PUT" intent is initially sent to every node that stores the data object or a replica of the data object. A subsequent PUT command is not issued to any such node until an appropriate response is received from each node to which a RESERVE command was sent. In the case of a PUT operation, an appropriate response to a RESERVE command includes an indication that the specific data object exists and there are no competing PUT, GET or DELETE requests for the same data object. As part of the process of modifying the data object with a PUT command, the version number of the data item's meta-data is incremented commensurate with the writing of the new data.

In the case of DELETE operations, like PUT operations, a RESERVE command is initially sent to every node having the data object or a replica of the data object. Unlike a PUT command, however, a DELETE command is issued to a node that appropriately responds to a RESERVE command as soon as the response to the RESERVE command is received. Here, an appropriate response to a RESERVE command for a DELETE operation includes an indication that the object exists and there are no competing PUT or GET requests for the same object.

In the case of GET operations, a RESERVE command with "GET" intent is sent to every node having the data object. If the RESERVE command is responded to favorably (which indicates that the data object exists and there are no competing PUT or DELETE requests for the same object), the data item is returned to the caller. Here, the fastest replica with the highest version number is chosen for the GET operation (otherwise the operation fails and is retried later).

In a further implementation, the KVS system may be enhanced to include one or more supervisory nodes (not depicted in FIG. 2) that are communicatively coupled to the storage nodes of the ring. The supervisory node(s) execute processes that: 1) formally join new nodes to the ring; 2) formally delete existing nodes from the ring; 3) monitor the ranges of object IDs stored on each node; 4) detects incorrect storage of object IDs on a particular node (e.g., a node is storing successor object IDs); and, 5) resolves any such incorrect object ID storage.

In another further implementation, the KVS system has multiple storage tiers (also not shown in FIG. 2). For example, a first ring is used as a caching layer (tier 1) and a second ring is used as a deeper storage later (tier 2). Here, accesses to the tier 1 layer are generally completed sooner than accesses to the tier 2 layer. A probabilistic offload engine determines which data objects warrant storage in the tier 1 layer (e.g., objects deemed more likely to be accessed in the immediate time frame are identified for storage in the tier 1 layer). Various semantics between the caching and deeper layers may be exercised (e.g., write through, copy-on-write, etc.) to ensure data reliability and consistency.

More details pertaining to an implementation of a KVS system may be found in U.S. application Ser. No. 12/640,373 filed on Dec. 17, 2009 entitled "Multipurpose Storage System Based Upon A Distributed Hashing Mechanism With Transactional Support and Failover Capability" and issued as U.S. Pat. No. 842,944 and U.S. application Ser. No. 12/964,656 filed on Dec. 9, 2010 and entitled "Probabilistic Offload Engine For Distributed Hierarchical Object Storage Devices" both of which are hereby incorporated by reference in their entirety into the instant application.

3.0 the DDS Database Management System (the Distributed Consistent Database and Uses of the Distributed Consistent Database)

Referring to FIG. 2, the distributed database management system (DDS) 202 is used to help realize different kinds of structures that can be implemented within the KVS 201. Specifically, as discussed with respect to FIG. 2, the KVS system dictates the use of a key (object ID) to a caller of the KVS system 201. As such, in order to implement directory based storage systems and/or block based storage systems in KVS, the DDS 202, in an embodiment, offers both a directory interface 206 and a block storage interface 207.

As discussed above, the directory and block storage interfaces 206, 207 rely on an underlying structural kernel imposed into KVS, referred to as a distributed consistent database 213, that permits for extremely large storage systems. Distributed consistent database instances may also be exposed for direct use. Additionally, distributed consistent databases can be used to implement other functions or applications on top of any of the storage systems implemented within KVS 201. Examples include quotas 208 and relational database functions 210.

3.1 The Distributed Consistent Database—Structure and Overview

Figure 4:
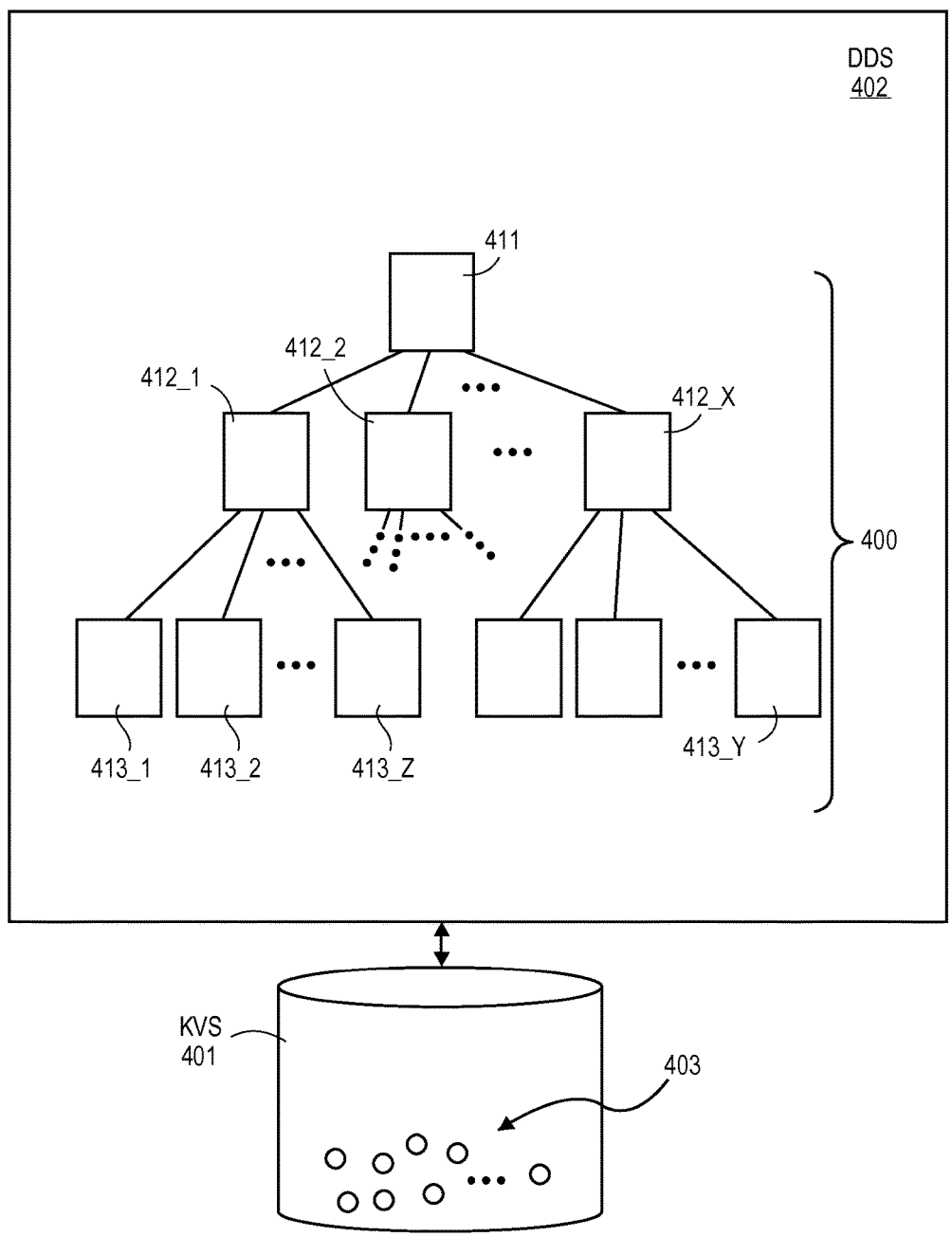
FIG. 4 shows a distributed consistent database.

FIG. 4 shows an instance of a distributed consistent database. Referring to FIG. 4, a distributed consistent database includes a hierarchy of pages 400 that are managed within a DDS instance 402. The hierarchy of pages 400 are used to navigate accesses for a collection of objects 403 within KVS 401 that the distributed consistent database is the keeper of. Thus, objects 403 typically correspond to objects containing information of the "user" ("customer information") while the hierarchy of pages 400 is used to correctly identify which of objects 403 have been targeted by any particular request made to the distributed consistent database.

In an implementation, as will be described more completely below, each page of the hierarchy 400 is kept within its own object in KVS 402. Objects containing hierarchy pages are called into DDS 402 from KVS 401, e.g., "one at a time", as their corresponding pages are actually needed (objects whose pages "might be" needed may also be called up in advance).

In an embodiment, a page is understood to be a collection of information that can be switched into memory and switched out of memory as a unit by a software program that operates on the page's information. As is known in the art, one or more pages of information are called into memory by a software program, where, there is typically some limit on the size of the pages and/or the number of pages that can be called into memory by the software program. In operation, to effect efficient use of memory, a software program will call into memory the pages it needs or believes it might need and switches out of memory the pages it does not need or believes it does not need.

In practice, each "page" may be implemented as a document (e.g., an XML document, JSON document or binary representation) or other construct that can be contained within an object store object and keep the hierarchical and/or navigational logic of the access hierarchy scheme.

Thus, in an implementation, the corpus of hierarchical pages 400 observed in FIG. 4 for an entire distributed consistent database are typically not all resident within DDS 402 at any instant of time. Rather, only a subset of these pages 400 are eventually called up from KVS 401 to satisfy any particular request. The hierarchy of pages 400 can easily "expand", however, akin to the behavior of a B+ tree, to accommodate extremely large numbers of objects 403 that the distributed consistent database is used to store.

As observed in FIG. 4, the hierarchy of pages 400 include a root page 411, various intermediate pages 412_1 through 412_X and various leaf pages 413_1 through 413_Y. Although only one level of intermediate pages 412 is depicted, a distributed consistent database may have multiple levels of intermediate pages. Each of the root page 411 and the intermediate pages 412_1 through 412_Y include the page IDs of their immediately lower pages. For example, root page 411 includes the page IDs for each of intermediate pages 412_1 through 412_Y, intermediate page 412_1 includes the page IDs for leaf pages 413_1 through 413_Z, etc. Each page may also include some form of logic and/or information to be processed by such logic (e.g., within DDS software) that determines which is the appropriate next lower page for any particular request. For example, if a particular request targets an object within objects 403 whose object ID is kept on leaf page 413_1, the logic of root page 411, in view of the request, will produce the PAGE ID for intermediate page 412_1, and, likewise, the logic of intermediate page 412_1 will produce the PAGE ID of leaf page 413_1.

In this manner, any particular request is resolved to the correct leaf page. A leaf page contains one or more object IDs or other references for the objects 403 within KVS 401 that are kept by the distributed consistent database. For example, in the case of a simple read request, when the read request is applied to the correct leaf page, the leaf page provides the object ID or other identifier for the specific object in KVS that has been requested.

3.2 The Distributed Consistent Database—Basic Access

Figure 5A:
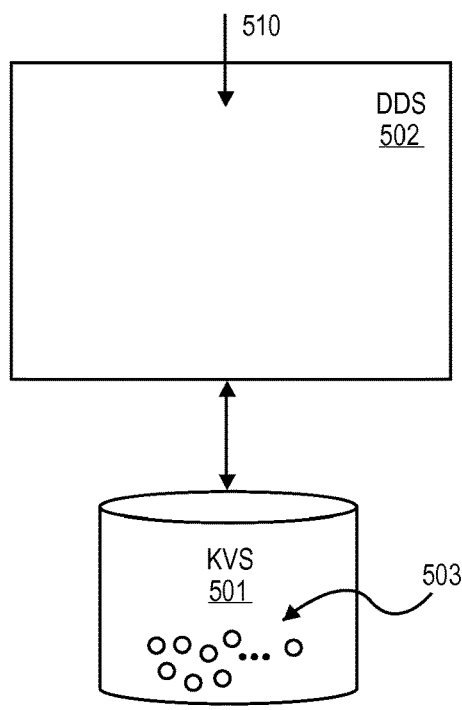
FIGS. 5a-5d show basic access behavior for a distributed consistent database.
Figure 5B:
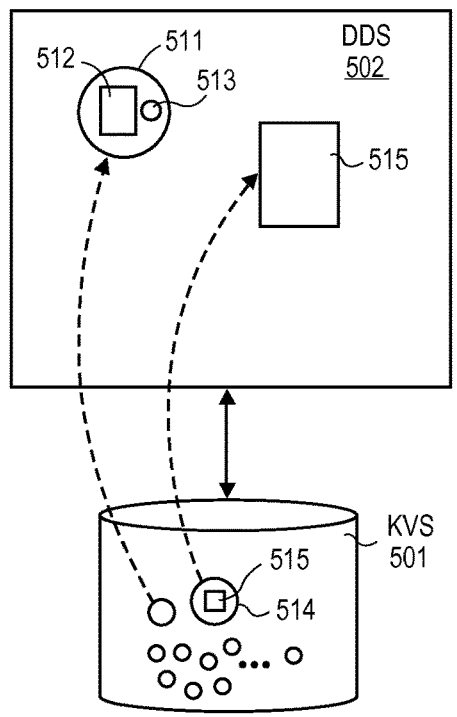
Figure 5C:
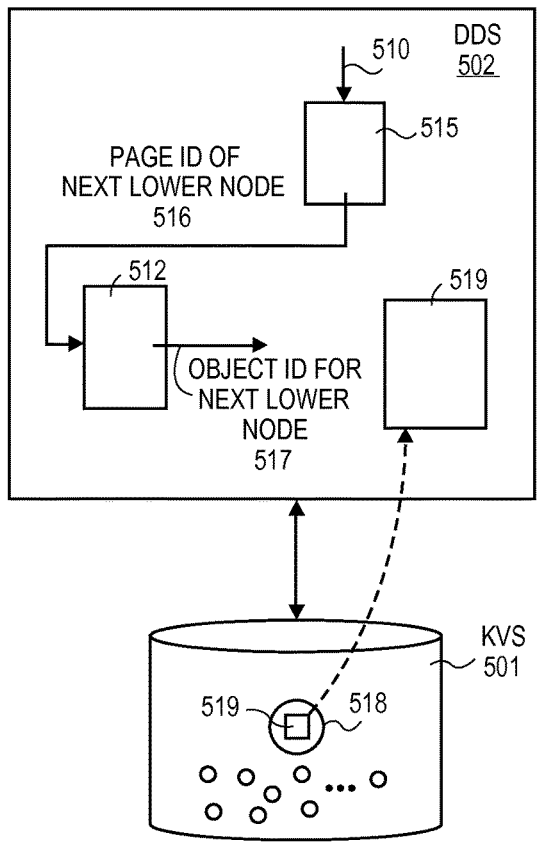
Figure 5D:
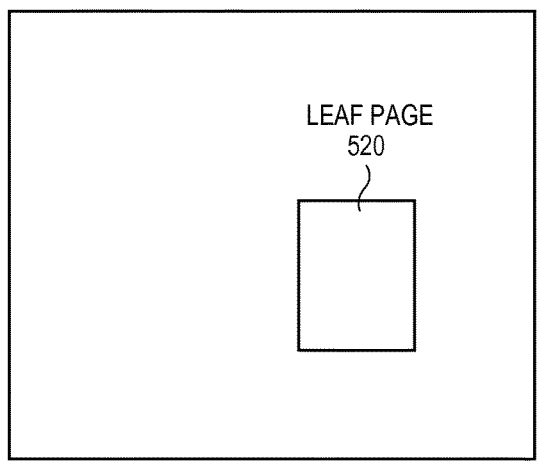
Figure 6:
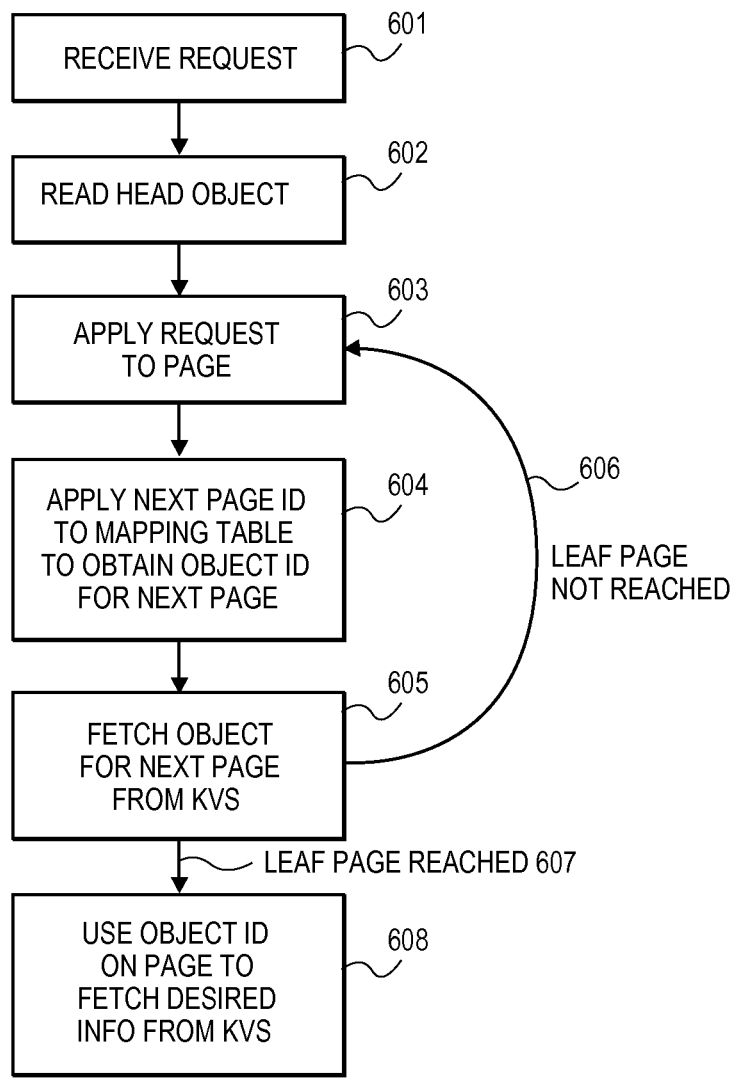
FIG. 6 shows a methodology that outlines the basic access behavior of a distributed consistent database.

FIGS. 5a-5d show basic access behavior for a distributed consistent database and FIG. 6 shows a methodology that outlines the basic access behavior.

Referring to FIG. 5a and FIG. 6, a request 510 is received that identifies a particular distributed consistent database and an action to be performed on that distributed consistent database 601. The request 510 may be generated externally from DDS 502 (e.g., in the case where the distributed consistent database is exposed for direct use) or internally within DDS 502 (e.g., in the case where a larger database solution offered by DDS is invoking the distributed consistent database). Actions to be performed on a distributed consistent database typically include any of: 1) the fetching of one or more objects 503 from within KVS 501 that the distributed consistent database is configured to keep; 2) the addition into KVS 501 of one or more objects into the group of objects 503 that the distributed consistent database is configured to keep; or, 3) the deletion from KVS 501 of one or more objects from the group of objects 503 within KVS 501 that the distributed consistent database is configured to keep.

In response to the request 510, referring to FIGS. 5b and 6, the DDS 502 reads 602 from KVS 501 a "head" object 511 for the specific distributed consistent database that is targeted by the request 510. In an implementation, the head object 511 for the distributed consistent database targeted by the request is identified in the request itself 510 or is readily identifiable from the request itself (e.g., the object ID is calculated from the request through some mathematical operation). Alternatively, the DDS 502 may keep a repository that tracks the head object IDs for all the distributed consistent databases it has instantiated in KVS 501.

The head object 511 contains a mapping table 512 and the object ID 513 for the object 514 within KVS 501 that contains the root page 515 for the distributed consistent database. As will be made more apparent in the following discussion, the mapping table 512 is a data structure that correlates the PAGE ID of the intermediate and leaf node pages of the distributed consistent database's hierarchy to its corresponding KVS object ID. The root page 515, corresponds to root page 411 of FIG. 4 and represents the root (highest level) node in the hierarchy of the distributed consistent database. The object ID 513 for the root page 515 found in the head object 511 is used to initially fetch 602 the root page 515 from KVS 501.

The information on the root page 515 identifies, via "page IDs", the immediately lower nodes of the distributed consistent database's hierarchy that stem from directly beneath the root page. The root page 515 also contains logic (or information to be used by such logic within the DDS software) for determining which of these page IDs is the correct page ID for the next lower node of the distributed consistent database's hierarchy in view of the request being processed.

Referring to FIG. 5c and FIG. 6, the request 510 is applied to the root page 515 which provides the page ID 516 for the next lower node in the distributed consistent database's hierarchy that is appropriate to satisfy the request 603. The next lower page ID 516, in turn, is provided to the mapping table 512 which provides 604 the object ID 517 for the object 518 in KVS 501 that contains the next lower page 519. The object 518 containing the next lower page 519 is fetched 605 from KVS 501 and the process repeats 606 until a leaf page is reached 607 in the distributed consistent database's hierarchy.

For ease of drawing FIG. 5d depicts a leaf page 520 being reached immediately after the first intermediate page 519. Note that only three pages have been called up from KVS to reach the leaf page 520 whereas the distributed consistent database's hierarchy of pages may be much larger than that (e.g., many more intermediate pages and leaf pages may exist).

In an embodiment, object ID(s) for requested information are found directly within a leaf page (i.e., the mapping table is not used). For example, in the case of directory request "/C/RED/BLUE/FILE", the object ID for FILE will be found in the leaf page that is called up from KVS of the distributed consistent database dedicated to the folder BLUE. The object ID is then applied directly to KVS to fetch the requested information 608. Here, the object ID for the head object for the distributed consistent database representing folder BLUE is referenced on a leaf page of a distributed consistent database representing folder RED. The object ID for the head object for the distributed consistent database representing folder RED will be referenced on a leaf page of a distributed consistent database representing root directory C. In an implementation, a distributed consistent database representing a root directory has a fixed object ID.

Although the embodiments described herein mainly contemplate an implementation where only one page is kept in an object containing a hierarchical page, it is conceivable that multiple hierarchical pages may be kept in single object.

3.3 The Distributed Consistent Database—Implementation of Changes

FIGS. 7a-7e show distributed consistent database behavior when changes are made to the distributed consistent database. FIG. 8 shows a methodology outlining such behavior.

The contents of a distributed consistent database are often not static. The hierarchy of a distributed consistent database can behave much like a B− tree in the face of changes. For instance, if a large number of objects is added to the distributed consistent database for storage, the number of intermediate and/or leaf pages in the hierarchy may expand outward. Likewise, if a number of objects kept by the distributed consistent database are deleted, content of multiple pages may be merged onto a single page with one or more of the other pages being deleted. Thus, the "shape and size" of a distributed consistent database's page hierarchy may expand and contract in response to the addition and deletion of objects that are stored in the distributed consistent database. Moreover, changes to pages should have limited ripple effects to other pages. For instance, if a leaf page is deleted, the deletion needs to be accounted for in the intermediate page that references the deleted leaf page but no other page needs to be modified.

A practical difficulty is that, as discussed above with respect to FIG. 2, the overall framework is intended to have the capability to scale to large values of N (number of DDS instances) and/or M (number of users). As such, it is possible that one or more other DDS instances and/or users may be simultaneously accessing the same distributed consistent database. In an implementation, there is no limit placed on how many reads may be made from KVS for the head object for a particular distributed consistent database. As such, anytime a particular user or DDS instance intends to impose a change to a distributed consistent database there is the potential that a large number of other DDS instances and/or users are using the distributed consistent database and intend to make their own changes as well. Some of these changes may even compete with the changes desired by the particular user or DDS instance.

In an implementation this problem is dealt with by making the objects of a distributed consistent database other than its head object immutable (that is, they cannot be modified), and, using an ACID transactional process on KVS to effect any desired changes to the distributed consistent database. Here, in embodiment, objects containing intermediate pages, objects containing leaf pages, and the customer data objects referred to by the leaf pages are all made immutable.

Figure 7A:
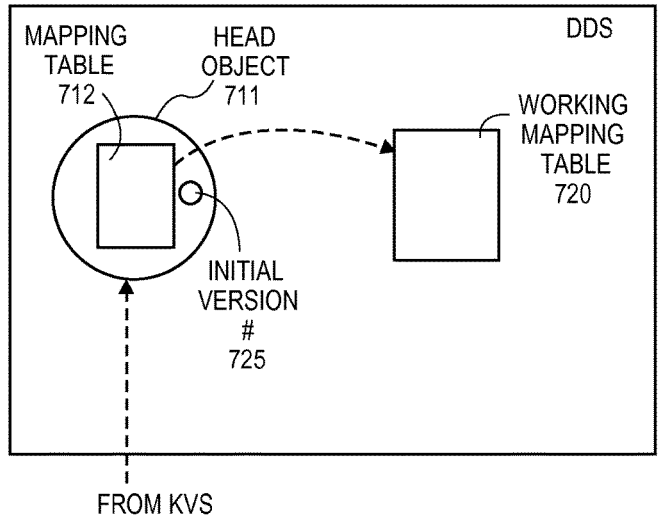
FIGS. 7a-7e show distributed consistent database behavior when changes are made to the distributed consistent database.
Figure 8:
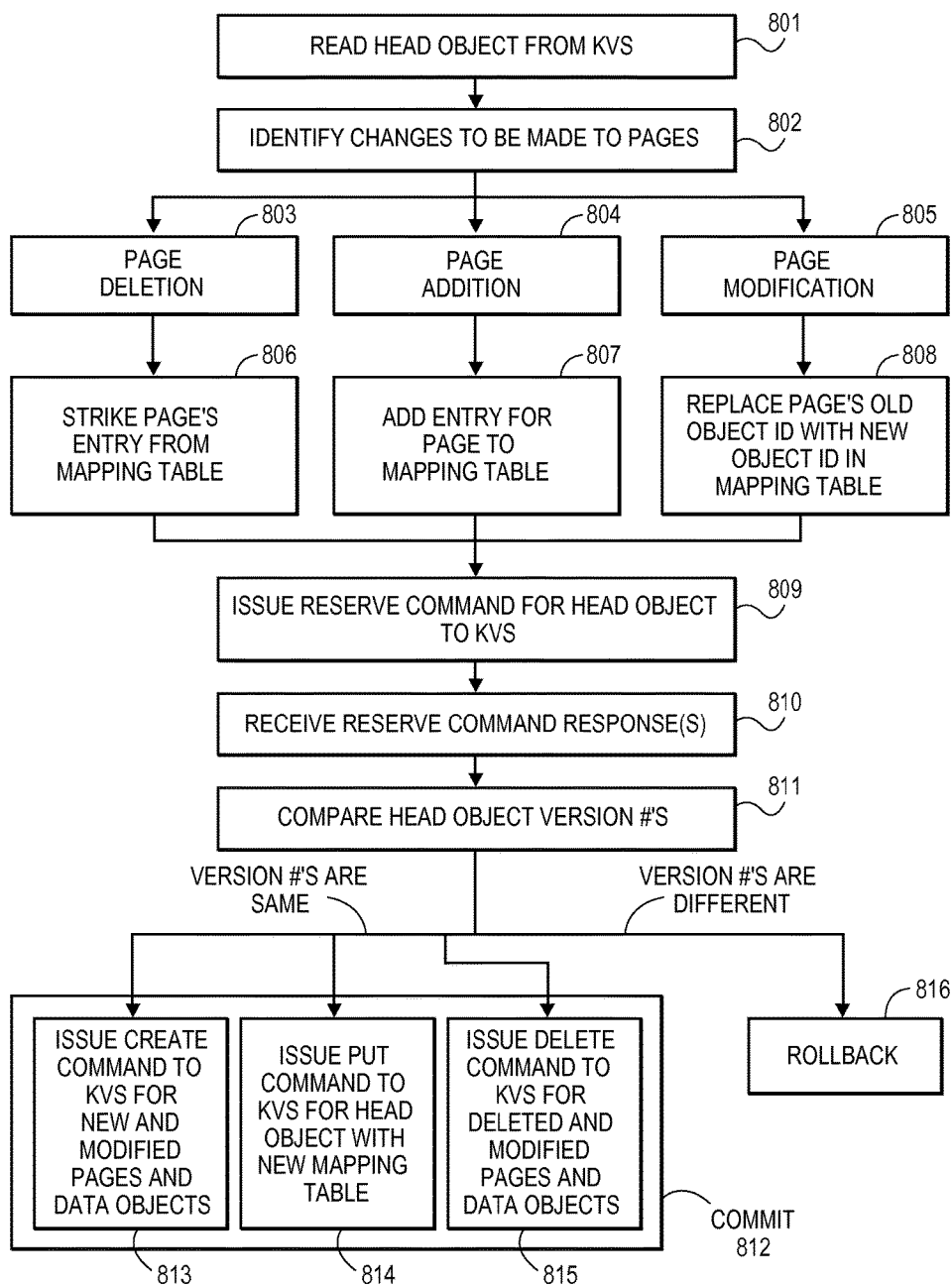
FIG. 8 shows a methodology outlining the behavior of a distributed consistent database when changes are made to the distributed consistent database.

As observed in FIGS. 7a and 8, in an embodiment, when the head object 711 for a structure is first read 801 from KVS a "working" mapping table 720 is created from the mapping table 712 contained within the head object 711. Initially the working mapping table 720 is just a copy of the mapping table 712 that is found in the head object 711. In an implementation, the head object 711 also contains meta-data 725 that tracks versioning for the head object 711. The use of the working mapping table 720 and the version number for the head object 711 will become more apparent in the following discussion.

The distributed consistent database is then accessed consistent with the methodology of FIG. 6 and the specifics of the request. The access may entail deletions of and/or additions to the customer data objects kept by the distributed consistent database. Such changes may cause changes to the content of the intermediate and/or leaf pages of the distributed consistent database's hierarchy, and/or, may change the number of intermediate and/or leaf pages. In the case of customer objects to be deleted, one or more leaf pages will have to be amended to delete any reference to their object IDs. In the case of newly created customer objects, certain leaf pages will have to be amended (and/or added) to include references to their object IDs. The specific pages that are impacted by any such changes are identified and called up from KVS 802 (if not already called up by way of the prior access). For ease of drawing, FIGS. 7a-7e do not show any of the hierarchy pages.

As observed in FIG. 8, there are three basic kinds of changes that can be made to the pages that are impacted by the structural change: 1) the deletion of a page 803; 2) the addition of page 804; and, 3) the modification of a page 805. Any number and combination of these changes may result from any combination of additions and deletions to the set of customer objects kept by the distributed consistent database.

Figure 7B:
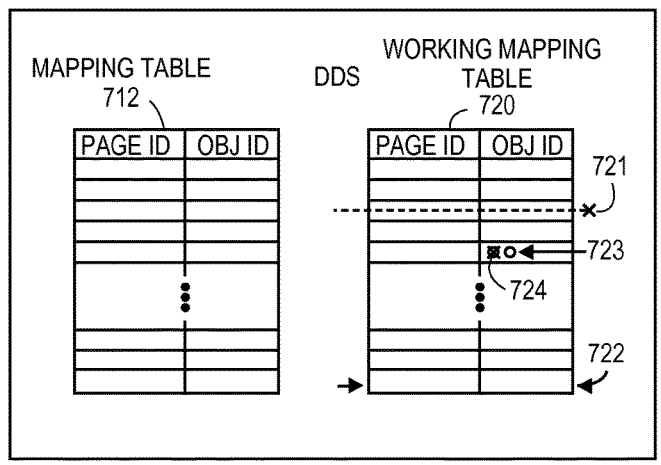

Referring to FIG. 7b and FIG. 8, if a page is to be deleted 803, its entry 721 is stricken 806 from the working mapping table 720. If a page is to be added 804, a new entry 722 having a new page ID and corresponding object ID for the new page is added 807 to the working mapping table 720. If a page is to be modified 805, the change is made to the page (which can be a change, deletion and/or addition upon the page's information), a new object ID 723 for the page is created and entered to the working mapping table 720 (the modified page keeps its page ID), and, the old object ID 724 for the page is stricken 808 from the working mapping table 720 (the old object containing the old page will be deleted from KVS). Note that process 808 essentially accounts for the characteristic that KVS objects containing pages are immutable. Here, permitting a modified page to keep its page ID dampens the "ripple up" of changes upward in the page hierarchy that would otherwise need to be made if a new page ID were used.

Figure 7C:
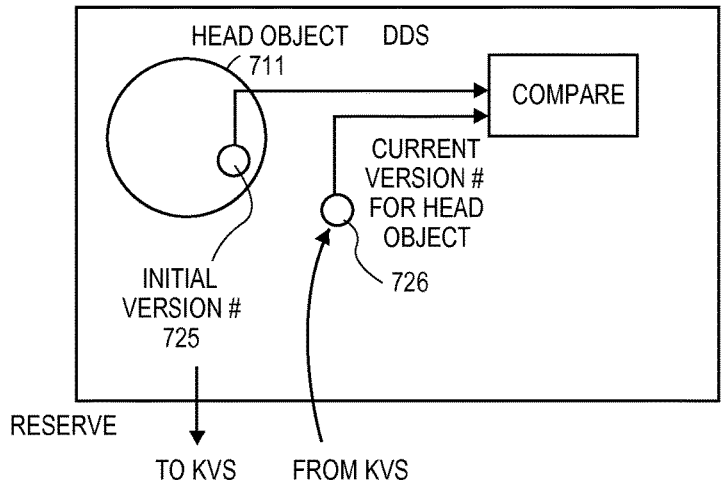
Figure 7D:
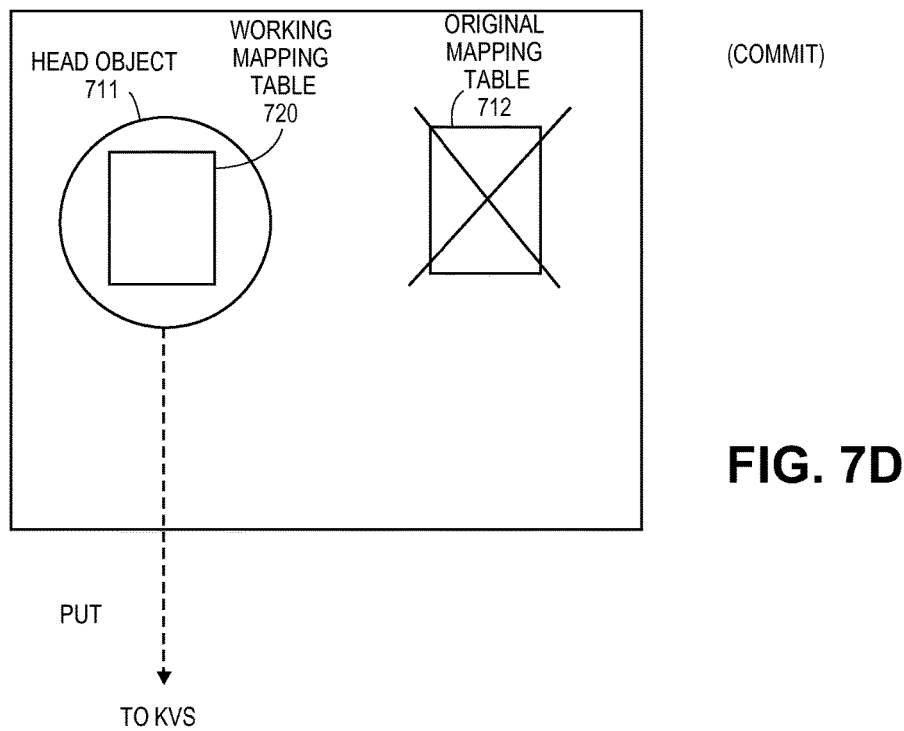

The head object 711, however, is not immutable and the DDS instance, referring to FIGS. 7c and 8, initiates a PUT operation to KVS to essentially incorporate the updated working mapping table 720 into the head object 711 rather than the original mapping table 712 that was found in the head object 711 when it was first read from KVS (at process 801). Recall that in the case of a PUT operation, a RESERVE command is initially sent 809 to every KVS node that stores the object or a replica of the object. A subsequent PUT command 813 is not issued to any such node until an appropriate response is received from each node to which a RESERVE command was sent 810.

In the case of a PUT operation, an appropriate response to a RESERVE command 809 includes the object's meta data with current version number 726, and, an indication that the specific object exists and there are no competing PUT, GET or DELETE requests for the same object. Receipt of the appropriate response from all KVS nodes having the head object or its replica confirms that the RESERVE command has locked the head object.

The current meta-data version number 726 for the head object 711 that is received in response to the RESERVE command is compared 811 with the version number 725 for the head object 711 when the head object 711 was first read from KVS 801. If the version number has not changed since the initial reading 801 of the head object 711 (i.e., the current version number 726 for the head object included in the RESERVE responses is the same as the version number 725 for the head object as of the initial read of the head object 801) there were no changes made to the distributed consistent database since the initial access 801 of the head object and the changes are committed 812.

Referring to 7d and FIG. 8, the changes are committed 812 by: 1) issuing one or more CREATE commands 813 into KVS for one or more new objects for any new pages, modified existing pages, new customer objects or effectively modified pre-existing customer objects; 2) issuing a PUT command 814 to KVS for the head object 711 including the working mapping table 720; 3) issuing one or more DELETE commands 815 for one or more objects to be deleted corresponding to deleted pages, earlier versions of modified pages or earlier versions of modified customer data objects. In an embodiment, at least processes 813 and 814 are executed serially in order.

As alluded to above, the one or more CREATE commands store data objects into KVS for any new customer data objects to be added to the group of objects 403 kept by the distributed consistent database. These include both entirely new items of data and modified versions of previously existing data (the later reflecting the immutable nature of the customer data objects). The object IDs for the newly created objects may be randomly chosen. The one or more DELETE commands are also used to delete from KVS any customer data objects to deleted from the group of objects kept by the distributed consistent database. These include both previously existing items of data that have been deleted outright and previously existing items of data that have been modified (the later again reflecting the immutable nature of the customer data objects).

Figure 7E:
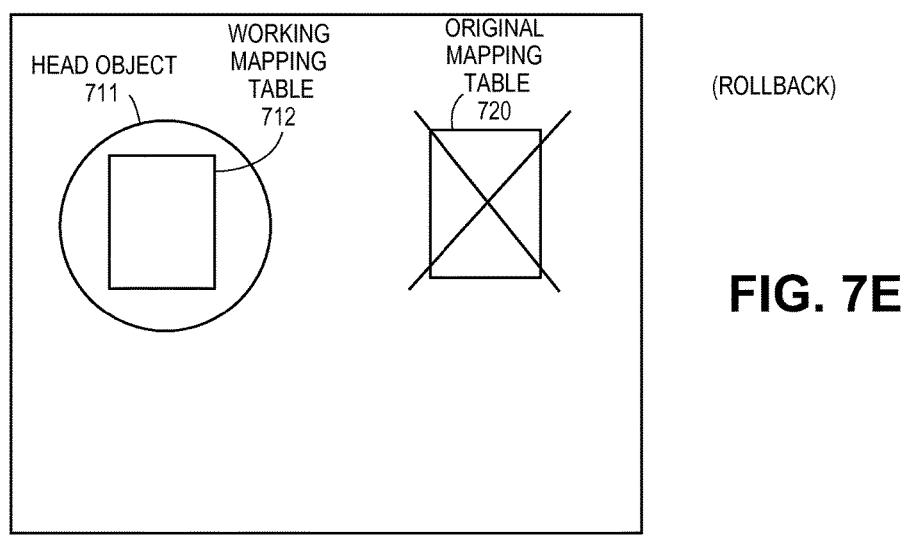

Referring to FIG. 7e and FIG. 8, if the version number has changed, the changes to be made to the distributed consistent database's hierarchy are rolled back 816 by: 1) not following through with a PUT command on the head object (as such, the version number for the head object is not incremented and the original mapping table is maintained); 2) discarding the working mapping table 720; and, 3) discarding any newly created pages (which effectively discards modified as well as actually new pages).

Note that the use of the RESERVE command for PUT operations corresponds to an optimistic locking system when the potential for multiple concurrently existing instances of the same DDS structure is considered. The number of such instances can be very large.

It is important to point out that although the KVS solution described above in Section 2.0 was presented as the underlying KVS in the discussion of the distributed consistent database provided just described above in Sections 3.0, 3.1, 3.2 and 3.3, such a presentation was only for exemplary purposes. Other embodiments that implement distributed consistent database technology may use KVS technologies other than the particular KVS solution described above in Section 2.0. Here, at least, any KVS system that implements reservations and versioning akin to processes 809-811 of FIG. 8 may be used to implement distributed consistent database technology (safety and liveness may be additionally guaranteed).

3.4 Uses of the Distributed Consistent Database to Implement Large Scale Storage Systems The generic access system discussed above has a number of different uses for effectively extending the range of KVS beyond a basic object store. These include directory and thin provisioned file storage systems. A discussion of each of these is provided immediately below.

i) Directory File Storage Systems

Figure 9:
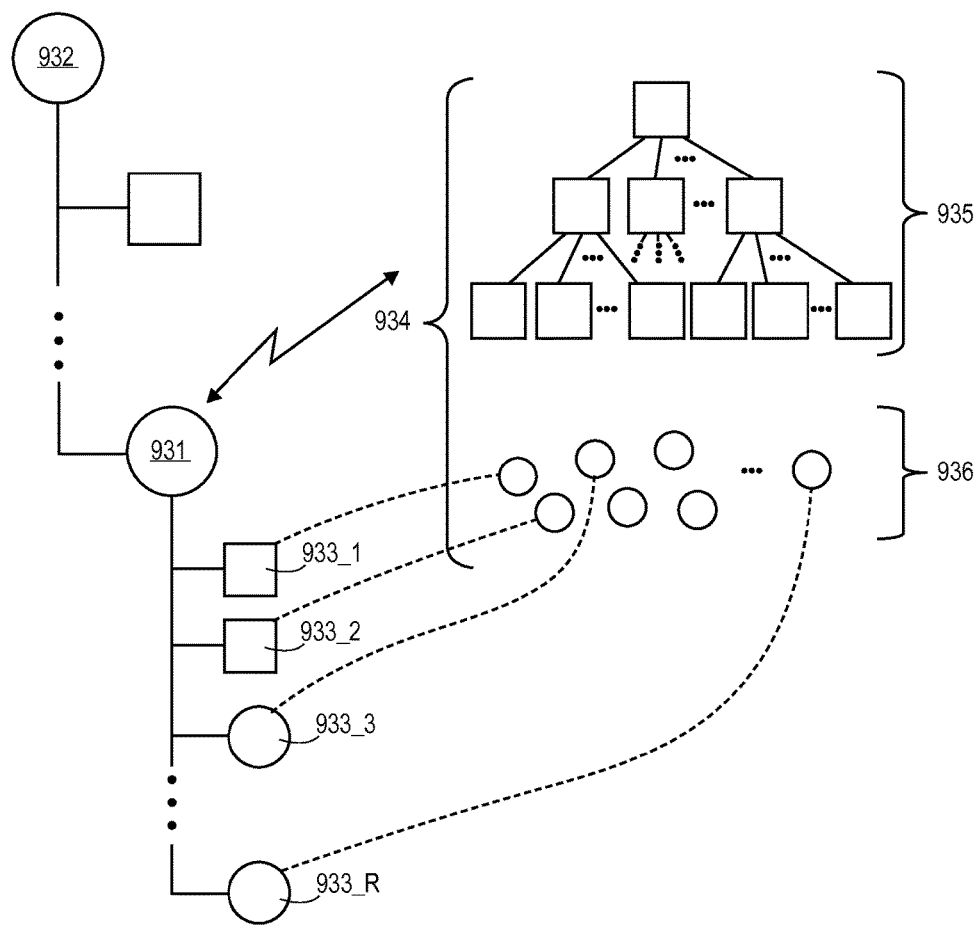
FIG. 9 depicts an exemplary use of a distributed consistent database to implement a file directory.

FIG. 9 depicts an exemplary use of the distributed consistent database to implement the file directory interface 206 of FIG. 2. As is known in the art, a specific file is targeted in a file directory system by specifying a pathway of sub-directories/folders through the directory's hierarchy (e.g., "/RED/BLUE/GOLD/FILE"). FIG. 9 depicts a segment 930 of a file directory's hierarchy. Here, a single sub-directory/folder 931 is shown. The sub-directory's parent directory 932 is shown as is its children sub-directories and files 933_1 through 933_R. A "root node" head object represents the entire file system directory and paths to all sub-directories and files flow from the root node.

In an implementation, every "node" in the file system in implemented as a distributed consistent database having its own head object, etc. Thus, parent directory 932 is implemented as a first distributed consistent database instance, sub-directory 931 is implemented as a second distributed consistent database instance and each of the children sub-directories and files 933_1 through 933_R are implemented as their own individual distributed consistent database instances.

FIG. 9 shows a representation 934 of the distributed consistent database used to implement sub-directory 931. Consistent with the discussions provided above, the distributed consistent database includes a hierarchy of pages 935 and a group of objects 936 that are kept by the distributed consistent database. For any given access to the distributed consistent database, the hierarchy of pages 935 are navigated through in piece-meal fashion to reach a specific one or more objects from the group of objects 936 kept by the distributed consistent database.

Here, the group of objects 936 kept by the distributed consistent database correspond to the children sub-directories and files 933_1 through 933_R within the sub-directory 931. Each of these objects 936 are also implemented as head object (each child sub-directory and file is implemented as its own distributed consistent database). The hierarchy of pages 934 permits for easy/efficient access of any targeted child sub-directory or file should R become extremely large.

A targeted file is reached anywhere in a file system directory by "hopping" through a chain of distributed consistent databases representing the directory/sub-directory path of the request until the desired "file" is reached (which is also implemented as a distributed consistent database). The content of the hierarchy of pages is designed to guide the navigation progression through the pages consistent with the request which specifies a file directory path.

For example, for any access that "flows" through sub-directory 931, the head object for the parent directory 932 will be called up from KVS, its hierarchy of pages will be navigated through piece-meal until a leaf page that identifies the head object for sub-directory 931 is reached. The head object for sub-directory 931 will then be called up from KVS and its hierarchy of pages 935 will be navigated through until a leaf page is reached that identifies the head object of the next sub-directory that is impacted by the request. The process continues until the targeted file is reached. If the file targeted by the request is contained by sub-directory 931 a leaf page will be reached in hierarchy 935 that identifies the head object for the targeted file.

Changes to the file system are made consistently with the discussion above in FIGS. 7a-7e and FIG. 8.

If any files or sub-directories 933_1 through 933_R within sub-directory 931 are to be deleted, their corresponding head objects are marked for deletion from KVS and the hierarchy of pages 935 are modified to no longer refer to the object IDs of these sub-directories/files. The hierarchy of pages 935 are modified at least by removing the object IDs of the deleted sub-directories/files from any leaf pages of the hierarchy 935. This may include effective page modification, entire page deletion or both.

For example, deletion of a large number of sub-directory/file objects may cause two leaf pages to merge. This causes modification to the leaf page that takes on the content of the leaf page to be deleted, and, causes modification to the intermediate page that used to refer to both leaf pages (and now needs to only refer to the one remaining leaf page). No other page modification is required. The fact that modified pages keep their page ID dampens ripple effects of page modification extending upward in the hierarchy.

Owing to the immutable property, modified pages keep their page ID but receive a new object ID in the working mapping table and are marked for storage in a new object in KVS. Objects containing the older content of a modified page are marked for deletion. Pages that are deleted outright have their entries in the working mapping table deleted and have their KVS objects marked for deletion.

The head object for sub-directory 931, which is not immutable, is then written into KVS with the new working mapping table. Head objects of sub-directories/files to be deleted are deleted from KVS. New objects for freshly modified pages are created into KVS and objects containing old modified pages or entirely deleted pages are deleted from KVS.

If any files or sub-directories are to be added to sub-directory 931, new head objects for each are marked for creation in KVS, and the hierarchy of pages 935 are modified to reference these new files or sub-directories. The hierarchy of pages 935 are modified at least by adding references for the object IDs of the newly added sub-directories/files to one or more leaf pages of the hierarchy 935. This may include effective page modification, entire page addition or both. For example, addition of a large number of sub-directory/file objects may cause a single leaf page to split into two leaf pages. This causes modification to the existing leaf page (which takes on references to new object IDs but deletes some references to pre-existing object IDs), addition of a new leaf page, and modification to the intermediate page that used to refer to the single leaf page but now has to refer to both.

As mentioned above, owing to the immutable property, modified pages keep their page ID but receive a new object ID in the working mapping table and are marked for storage in a new object in KVS. Objects containing the older content of a modified page are marked for deletion. Pages that are added outright have new entries created in the working mapping table for them and are marked to have new objects created for them in KVS.

The head object for sub-directory 931, which is not immutable, is then written into KVS with the new working mapping table. Head objects of sub-directories/files being added are created into KVS. New objects for freshly modified pages or new pages are created into KVS and objects containing old modified pages are deleted from KVS.

In an embodiment, each page ID of sub-directory 931 and each sub-directory ID and file ID kept by distributed consistent database is implemented as an "inode" number. The key into KVS to fetch the object for any of these items is obtained by concatenating the inode number with an identifier of the overall file system.

In an embodiment each file is implemented as a distributed consistent database. As such, the content of any file can be large yet be easily accessed and/or manipulated through the characteristics of the distributed consistent database.

ii) Thin Provisioning Block Storage Systems

Figure 1A:
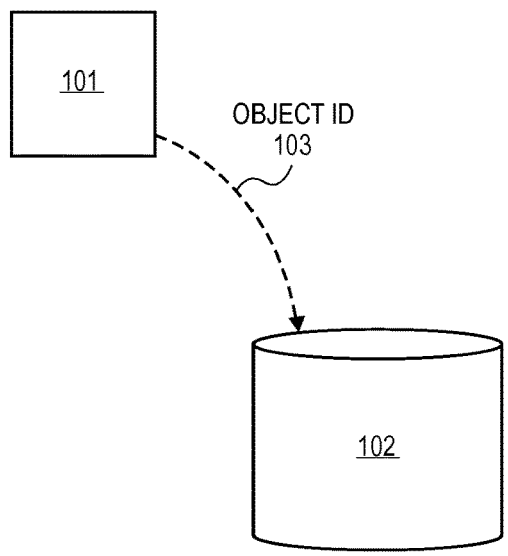
Figure 1B:
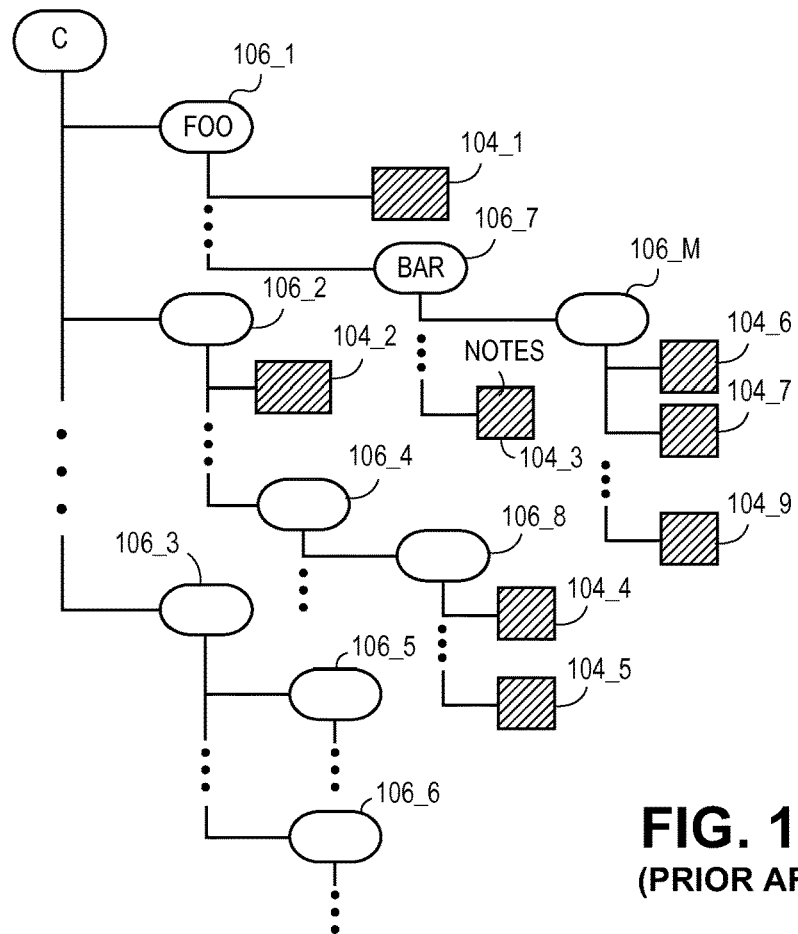
Figure 1C:
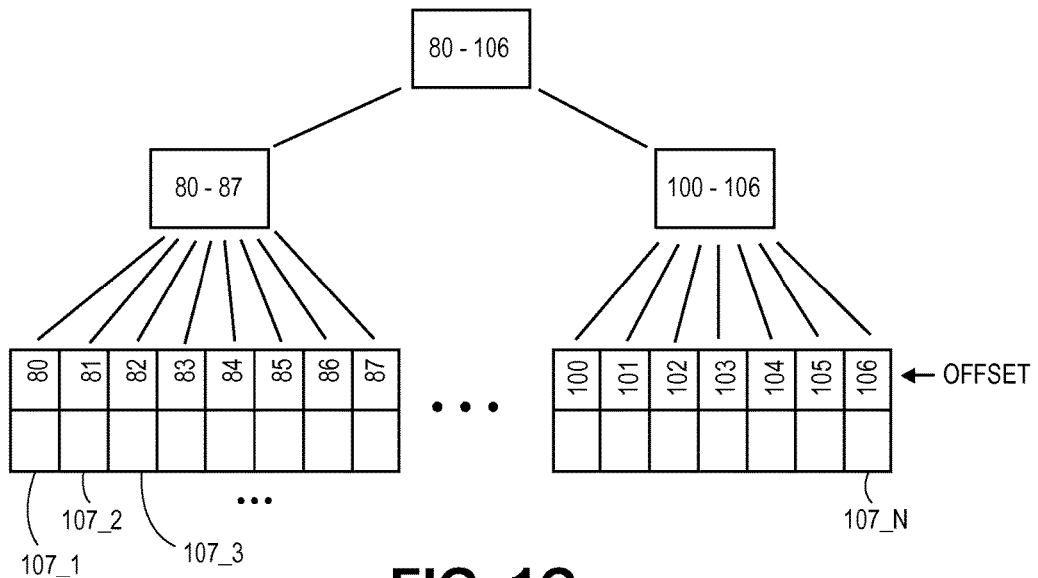
Figure 1D:
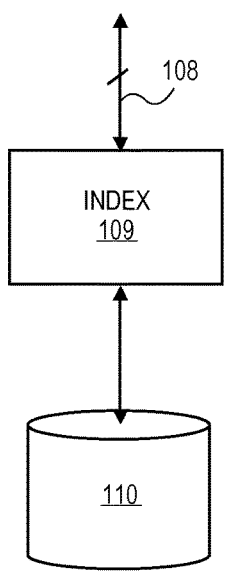
Figure 1E:
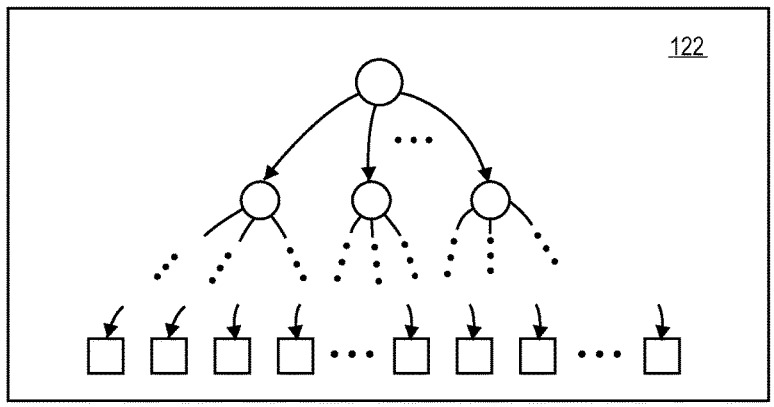
Figure 1E:
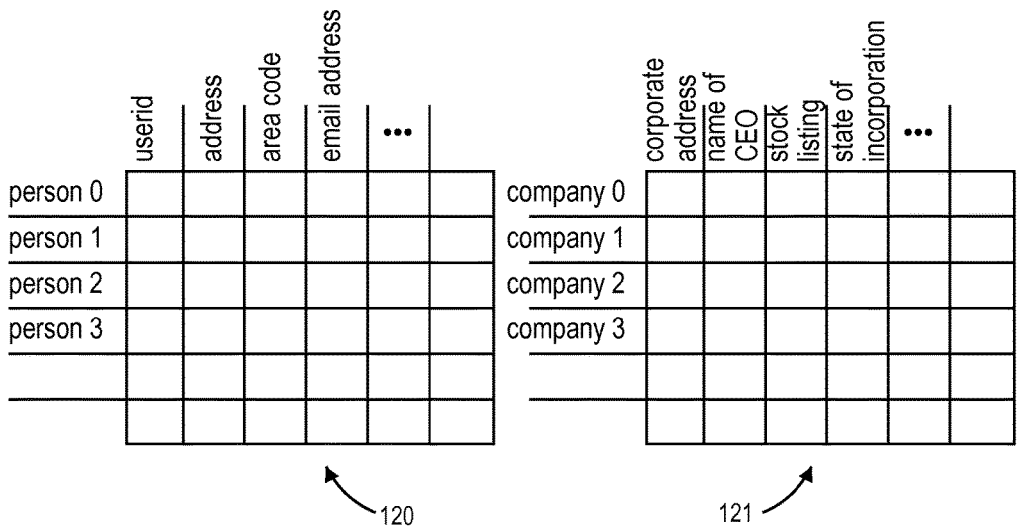

Recall from the background discussion of FIG. 1c that a common type of block storage is a "thin provisioning" system in which a block or "stripe" is identified by an offset within a larger "logical" storage resource, and where, "used" stripes are written into physical storage but unused stripes are not.

Figure 10:
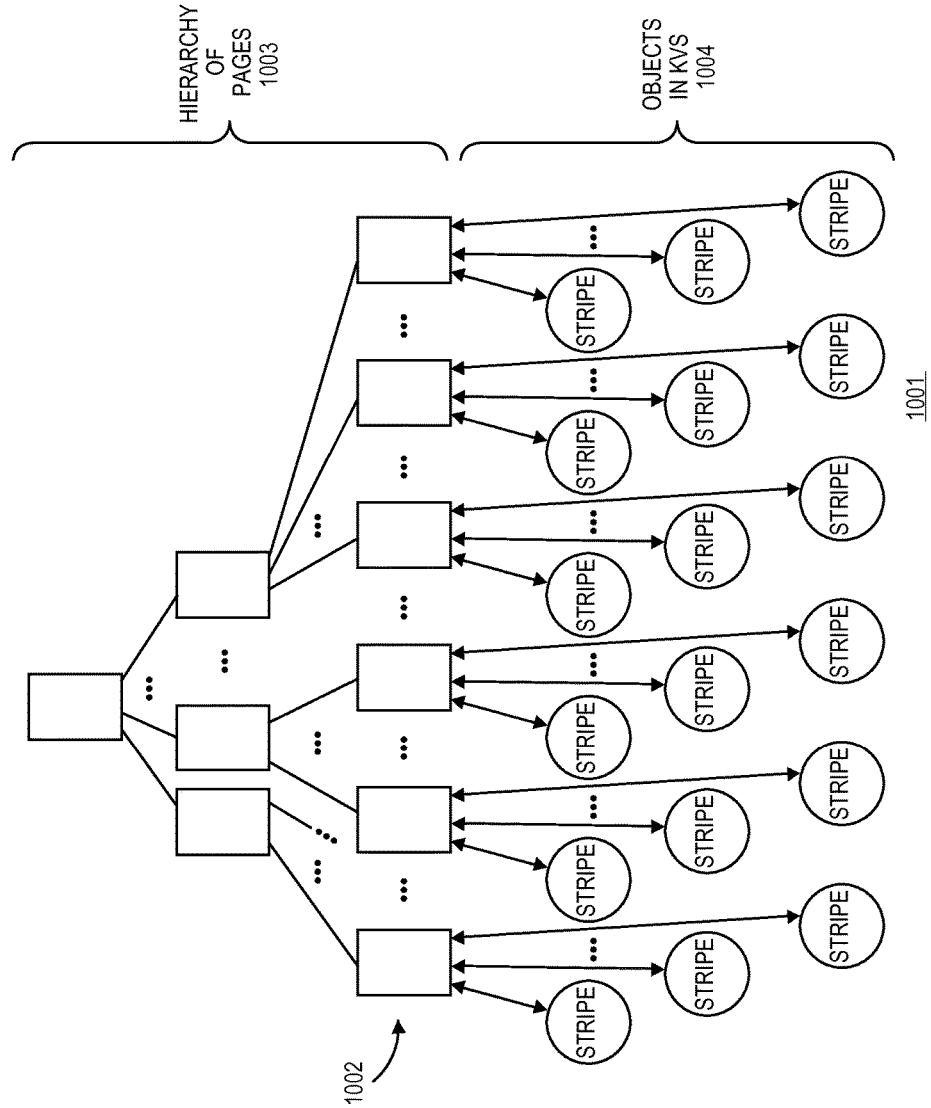
FIG. 10 depicts an exemplary use of a distributed consistent database to implement a thin provisioning block device.

FIG. 10 shows a "thin provisioned" block device implemented as a single "sparse file" that is represented as a distributed consistent database 1001. Here, the leaf pages 1002 of the distributed consistent database's hierarchy 1003 contain mappings that correlate an offset identifying a particular stripe of the sparse file to a particular object ID (that is, each object in KVS 1004 corresponds to a different stripe). In an embodiment there is one such mapping per leaf page so that, e.g., any two different stripes within a same sparse file can be simultaneously accessed. Other embodiments may choose to map multiple stripe objects from a single leaf page. Basic accesses to the distributed consistent database 1001 specify the offset of a particular stripe. The root and intermediate pages of the hierarchy of pages 1003 point to a correct lower page based on the offset specified in the access request. That is, the pages within the hierarchy 1003 of the distributed consistent database contain content to navigate to a particular leaf page based on an offset as the specified input criteria.

The content of the sparse file's stripes are stored in KVS objects. No effort is made to store the full extent of the unused portions of the larger file in KVS.

The behavior of a distributed consistent database that implements a sparse file will be as described above with respect to sections 3.1, 3.2 and 3.3. Here, in an embodiment, objects other than the head object used to implement a sparse file are made immutable (whether corresponding to intermediate or leaf pages or objects containing data stripes).

In one embodiment, all stripes are configured to be the same size. However in other embodiments, given that each stripe is implemented with its own KVS object, different stripes within a same thin provisioned file implementation can have their own custom/unique size configuration.

In order to increase throughput and performance, in an embodiment, only whole stripes are written to the KVS layer unless the application layer issues a flush on an incomplete stripe (in this case only the relevant portion of the stripe is written to KVS). A typical situation is the copying of an entire file in which copies are made in smaller sections than the full stripe size. For example, if a stripe is 1.6 Mb in size, sections of the copy for storage in the stripe may be made by the user in 16 Kb increments. In this case, the stripe is not written to until 1,000 such sections have been aggregated to form a full sized stripe's worth of data. The aggregation may be made anywhere above the KVS interface (e.g., by the DDS instance, or locally at the user's system). As discussed above, a KVS object containing a stripe is immutable so any such "write" is effected by writing the new stripe's worth of information into an entirely new object.

Operations to a file within a directory file storage system may be similarly aggregated (e.g., smaller sections of the file are aggregated above the KVS layer, then, a larger write operation is made to KVS that corresponds to the accumulation of all the aggregated parts).

Sparse files can be implemented as the "files" in a directory file system (e.g., as described above with respect to FIG. 9), or, some-other access structure may be used to access a particular one of many thin provisioned files.

3.5 Uses of the Distributed Consistent Database to Implement Applications on Top of Storage Systems Section 3.2 discussed the implementation of the file system directory and block storage system interfaces 206, 207 of FIG. 2. FIG. 2 also indicates that higher level applications such as quotas, and relational database layers can also be implemented with distributed consistent databases in KVS.

i) Quotas

A quota policy is typically used to assign a maximum amount of usable storage space to a particular user. In a common application, anytime a user attempts to write information into KVS, the quota policy is first accessed to understand what the user's maximum allotted storage amount is and how much of that allotment the user has already consumed. If the user's attempted write will exceed the user's allotted amount the user's write attempt is blocked.

In an implementation, a quota policy is implemented with a single distributed consistent database as discussed above. Here, an identifier of the user is used to first navigate through the node hierarchy of the quota distributed consistent database before the user's access is permitted. The object ID for an object in KVS having the quota information for a particular user is reached when a leaf page of the distributed consistent database's node hierarchy is reached. If the user's quota is will not be exceeded by the user's desired access, the access for the user is permitted into another database where the user's information is kept.

Additions, deletions and changes of user identifiers will cause changes to the distributed consistent database which may include changes to one or more pages in the node hierarchy of the distributed consistent database. The behavior of each affected distributed consistent database will be similar to that described above in Sections 3.1 through 3.3.

Figure 11:
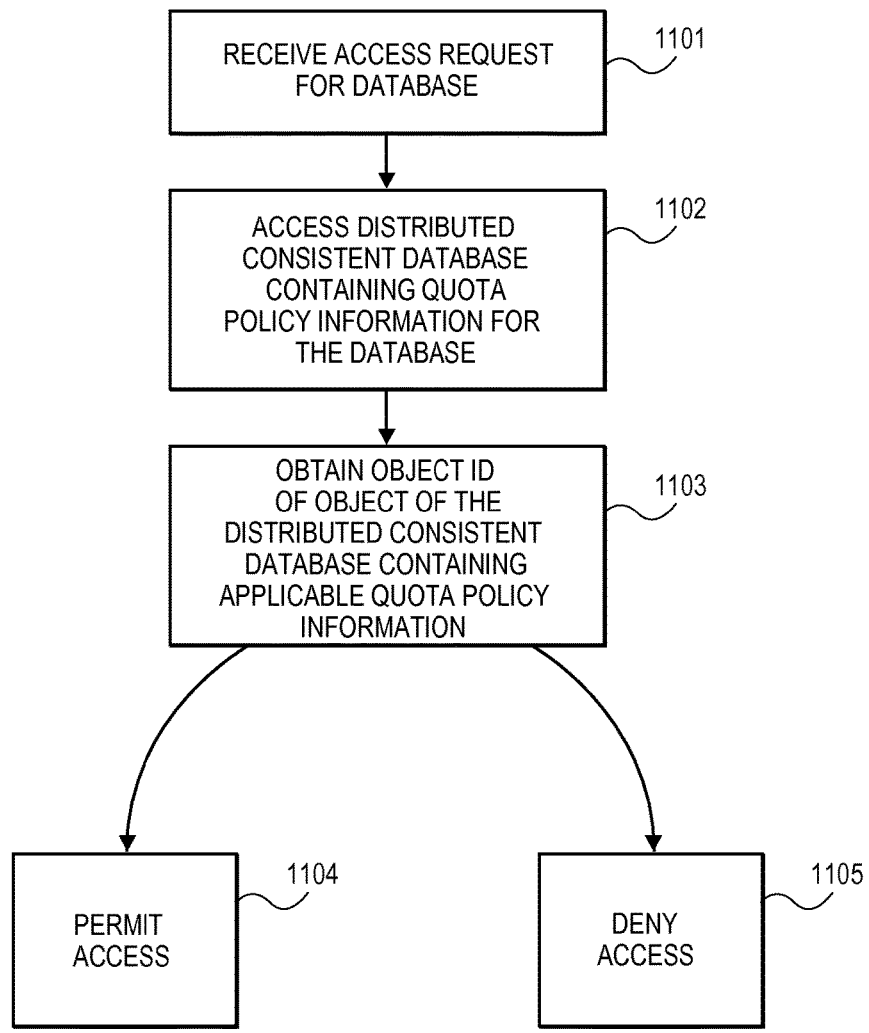
FIG. 11 depicts an exemplary use of a distributed consistent database to implement a quota system.

FIG. 11 shows a basic quota process. As observed in FIG. 11, an access for a user to (e.g., a distributed consistent) database where information for the user is kept is desired 1101. Instead of accessing this database, however, another distributed consistent database is fetched from KVS that keeps quota policies for the database 1102. Some form of identifier of the user is then applied to the quota database and its pages are progressed through as discussed above until a leaf page having an object ID for the user's quota record is obtained 1103. The object having the user's quota record is fetched from KVS. The quota record keeps information indicating how much storage space the user has used and how much storage space the user has been allocated. By comparing the contents of the record against details of the pending access, a determination can be made if the user will exceed the user's quota. If the pending access does not exceed the quota the user's access to the database is permitted 1104, if the pending access exceeds the quota the user's access is not permitted 1105.

Note that quota information is not limited to tracking capacity. The quota mechanism can be leveraged for other metrics, like the number of files for example.

ii) Relational Databases

Distributed consistent databases can also be used to implement a relational database. As observed in FIG. 12, the basic structures for a relational database include a first distributed consistent database 1201 that is used to implement a specific table ("table database"). Here, each object 1202 kept by the table database 1201 corresponds to a different row in a table of the relational database ("row object"). The row objects are retrieved with specific KVS object IDs. The hierarchy of pages 1203 of the table database 1201 accept primary key information for a particular row as input information. The resultant leaf page for the primary key input provides the object ID for the particular, targeted row object.

Queries into the table can be sped-up with one or more indexes 1204_1 through 1204_N. In an embodiment, each of the indexes 1204_1 through 1204_N is also implemented with its own respective consistent distributed database ("index database"), where, the objects "kept" by an index database correspond to the head objects of the table databases that the leaf pages of the index database point to. Here, the respective hierarchy of pages 1204_1 through 1204_N of each index database effectively implements the B+ tree of the index that the index database represents. The leaf pages provide the primary keys of the rows that match the query term. In a basic approach, there is one index for each column in the row structure (e.g., one index for every separate data item kept in the row objects 1202 of the table database 1201).

The structure of the primary key that is provided by an index includes an identifier of the head object for the table database (or information from which the head object for the table database can be determined). For example, the primary key may include both a table identifier and a row identifier. The table identifier is used to fetch the head object for the table database 1201 and the row identifier (or both the table identifier and the row identifier) are applied to the hierarchy of pages 1203 of the table database to obtain the object ID for the row identified by the primary key. Notably hashing may be performed on any of the components of a primary key provided by an index to obtain either or both of the object ID for the head object of the table database and/or the row identifier.

Figure 12:
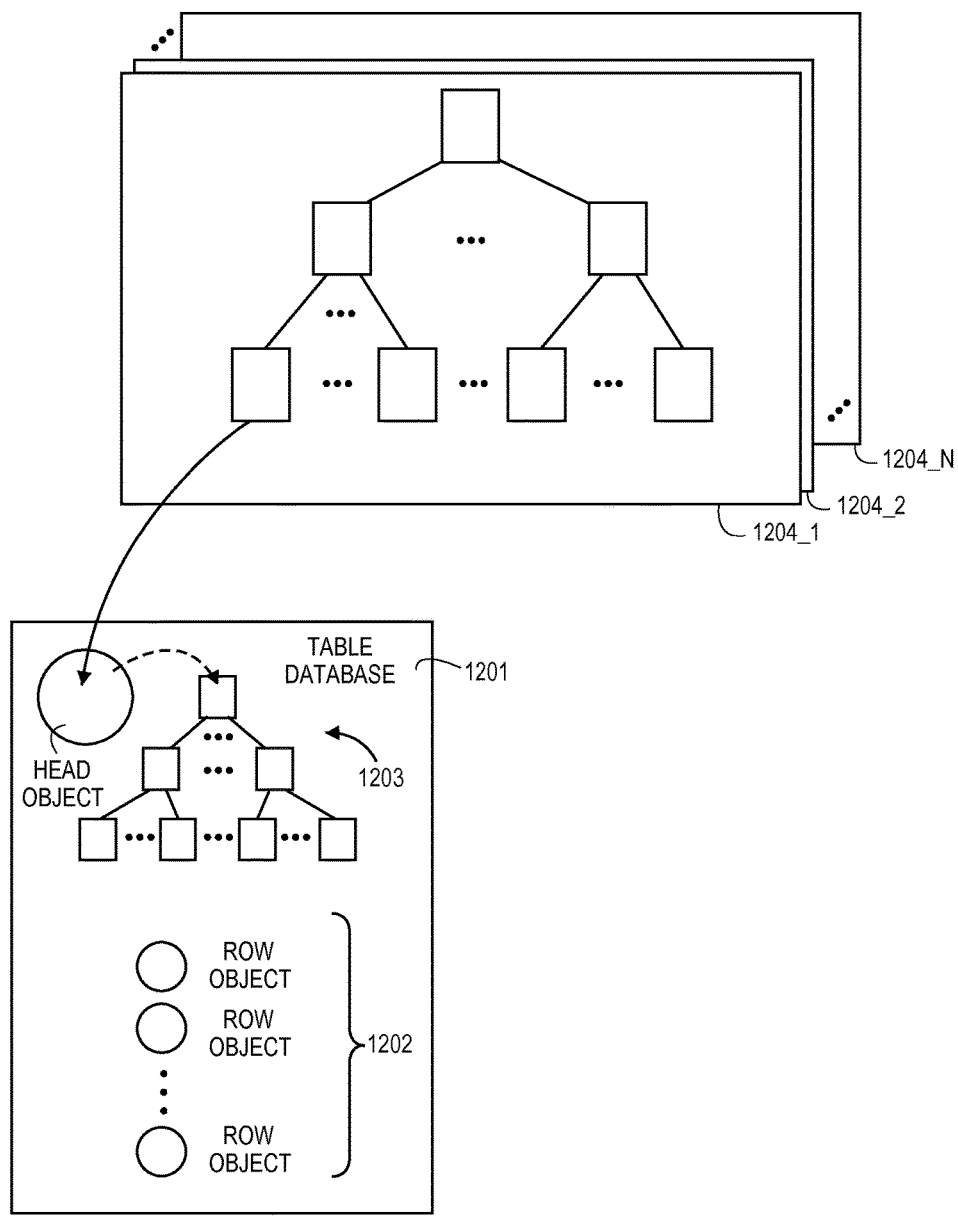
FIG. 12 depicts an exemplary use of a distributed consistent database to implement a relational database.

Other table databases for other tables within the relational database may be implemented with other consistent distributed databases (not shown in FIG. 12 for simplicity). The row object of one table database may include primary key information for another row object of another table database consistent with the operation of a relational database. As such, for example, a query process may entail firstly application of a query term to an index database 1204_1 which provides the primary key for a row object within a first table database. The contents of the row object may include a primary key for the row of a second table database. This primary key may then be used to access the second table database (through its head object, the primary key including or being useable to obtain the head object for the second table database) and the row within it specified by the primary key to obtain the result of the query.

In a simplest case all of the primary keys from an index database identify the same head object for a single table database although conceivably a single index database may provide primary keys for different table databases and their corresponding head objects. Any one or more of the indexes may be designed to support range queries or various other properties of an RDBMS.

Another "root" head object (not shown) may represent the entire relational database by including at least identifiers of the various index databases used to access the table databases. Thus, access to a particular relational database causes its corresponding root head object to be obtained. The query is then applied to the appropriate index database identified therein.

Changes to table databases in terms of addition or removal or rows (row objects) causes corresponding addition or removal of information within the content of the pages of the indexes that reference the added/deleted rows.

Quota systems can be applied to relational databases. For example a user may be limited on how many row objects the user is permitted to enter within the relational database. ACID transactions can also be performed on the relational database.

4.0 Implementation Embodiments

Any combination of the storage services/technologies discussed in the preceding sections may be made to provide storage services for one or more users.

Figure 13:
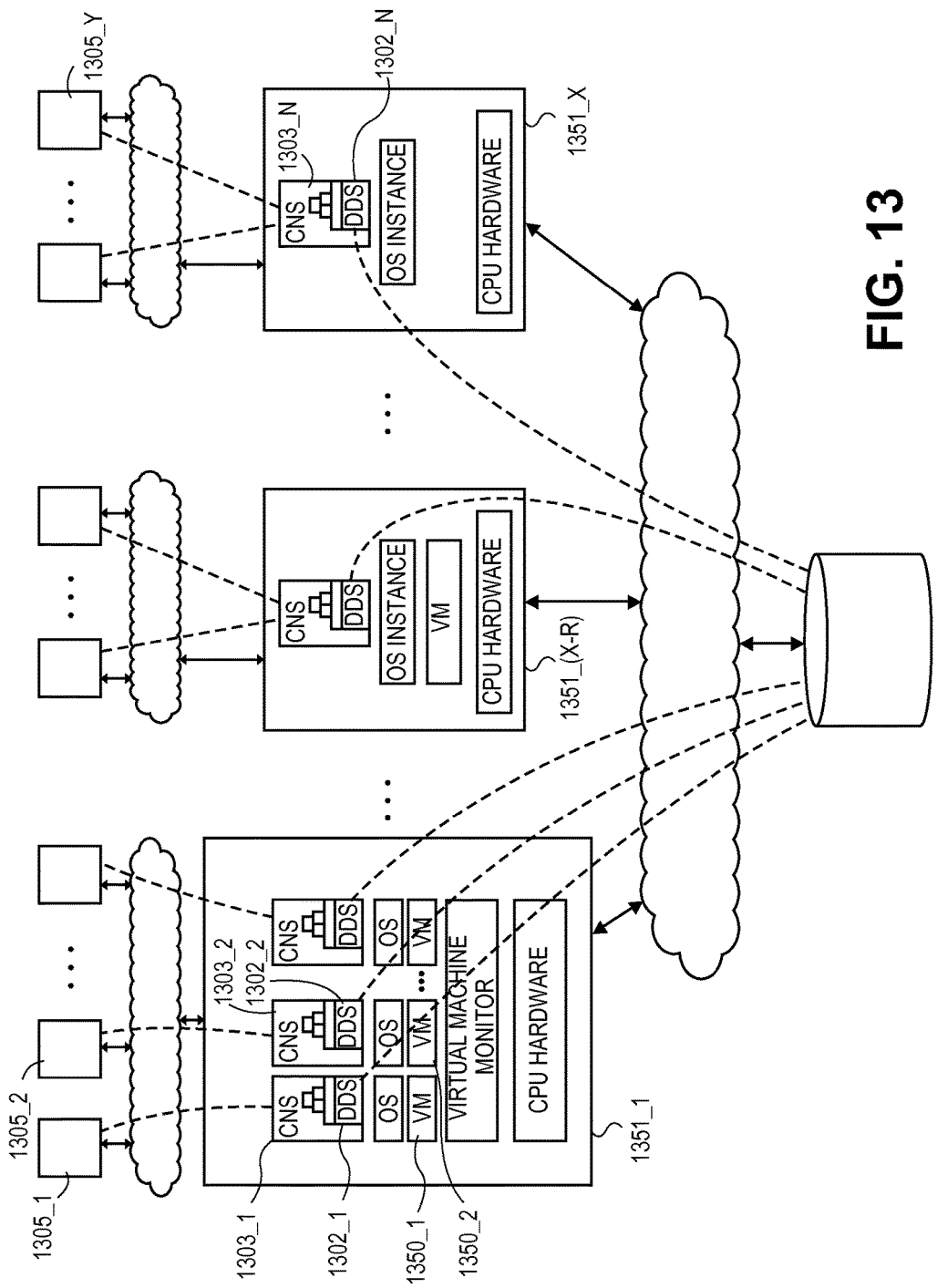
FIG. 13 is a schematic depiction of various manners in which the architecture of FIG. 2 can actually be implemented in practice.

FIG. 13 is a schematic depiction of various manners in which the architecture of FIG. 2 can actually be implemented in practice. As observed in FIG. 13, multiple CNS instances 1303_1 through 1303_N including their corresponding DDS stack 1302_1 through 1302_N can be configured to run on their own operating system instance and virtual machine 1350_1 through 1350_N. A single computing system (e.g., a server, a personal computer, a tablet device, a mobile handheld device, etc.) may support the execution of one or more CNS instances. In the case where multiple CNS instances are executed within a single computing system, the respective virtual machines of the multiple CNS instances may run on a virtual machine monitor. A CNS instance may also run on an operating system that runs directly on a computing system's CPU hardware (i.e., no virtual machine is utilized).

Regardless, as depicted in FIG. 13, there may be more than one computing system 1351_1 through 1351_N each having at least one CNS instance with corresponding DDS stack.

As discussed with respect to FIG. 2, each CNS instance may support multiple users 1305_1 through 1305_N. The multiple users may be separated from their respective CNS node(s) by any of a wide area network (WAN), metropolitan area network (MAN), local area network (LAN). A user may even be an application instance running on the same computing system that is supporting its CNS node (no external network). Multiple users may be connected to any or all of the CNS nodes by way of a same network or multiple networks.

Likewise, each of the CNS nodes may be connected to KVS through any of a WAN, MAN or LAN. Conceivably a CNS node may run on a same computing system upon which a KVS node is instantiated (i.e., no external network between the CNS node and the KVS node). Multiple CNS instances may be connected to KVS by way of a same network or multiple networks.

KVS, as discussed above in Section 2.0, may be implemented as a distributed storage system. In this case, the various distributed nodes of the KVS system are typically separated by a MAN, but may also be conceivably separated by a LAN and/or WAN.

A "cloud storage" service may be provided where the CNS nodes acts as gateways to the cloud storage service.

Processes taught by the discussion above may be performed with program code such as machine-executable instructions which cause a machine (such as a "virtual machine", a general-purpose CPU processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

A storage medium may be used to store program code. A storage medium that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 14:
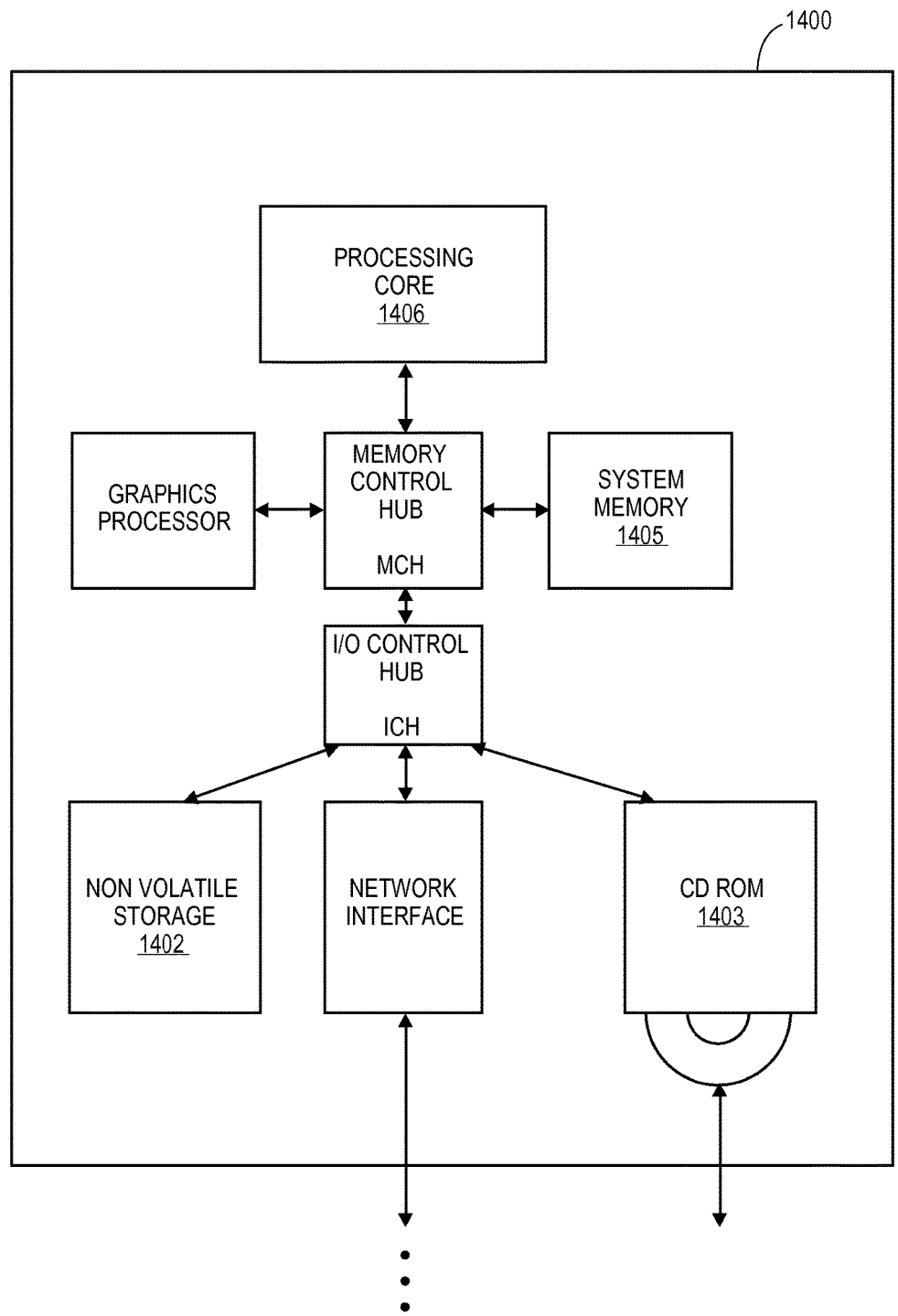
FIG. 14 shows a computer system.

FIG. 14 is a block diagram of a computing system 1400 that can execute program code stored by a storage medium. It is important to recognize that the computing system block diagram of FIG. 14 is just one of various computing system architectures. Different types of computing systems include mobile and/or handheld computing devices (e.g., smartphones, cell-phones, personal digital assistances), laptop personal computers, desktop personal computers, servers, etc.

The applicable storage medium may include one or more fixed components (such as non volatile storage component 1402 (e.g., a hard disk drive, FLASH drive or non volatile memory) or system memory 1405) and/or various movable components such as a CD ROM 1403, a compact disc, a magnetic tape, etc. operable with removable media drive 1404. In order to execute the program code, typically instructions of the program code are loaded into the Random Access Memory (RAM) system memory 1405; and, the processing core 1406 then executes the instructions. The processing core 1406 may include one or more CPU processors or CPU processing cores.

It is believed that processes taught by the discussion above can be described within various source code software environments such as, for example, object-oriented and/or non-object-oriented programming environments including but not limited to: C+/C++, PYTHON, Java, Erlang, JavaScript, etc. The source code can be subsequently compiled into intermediate code for translation on a translator/virtual machine, or, compiled into object code targeted for a specific processor instruction set architecture.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

5.0 Snapshots of Storage Systems

Storage systems typically change over time as they are used. That is, the ability to change existing data items, add new data items, add folders, delete folders, etc., causes the organization and content of the storage system to continually change as it is continually used. Various users or administrators may, however, desire to retain the state of a storage system at a particular moment in time (e.g., for later reference) yet permit changes to continue to be made to the system moving forward. A "snapshot" is the state of storage system (or storage system component) at a particular moment in its usage that is kept for subsequent referral. Typically, the storage system can continue to be used and changed after the snapshot is taken.

Figure 15:
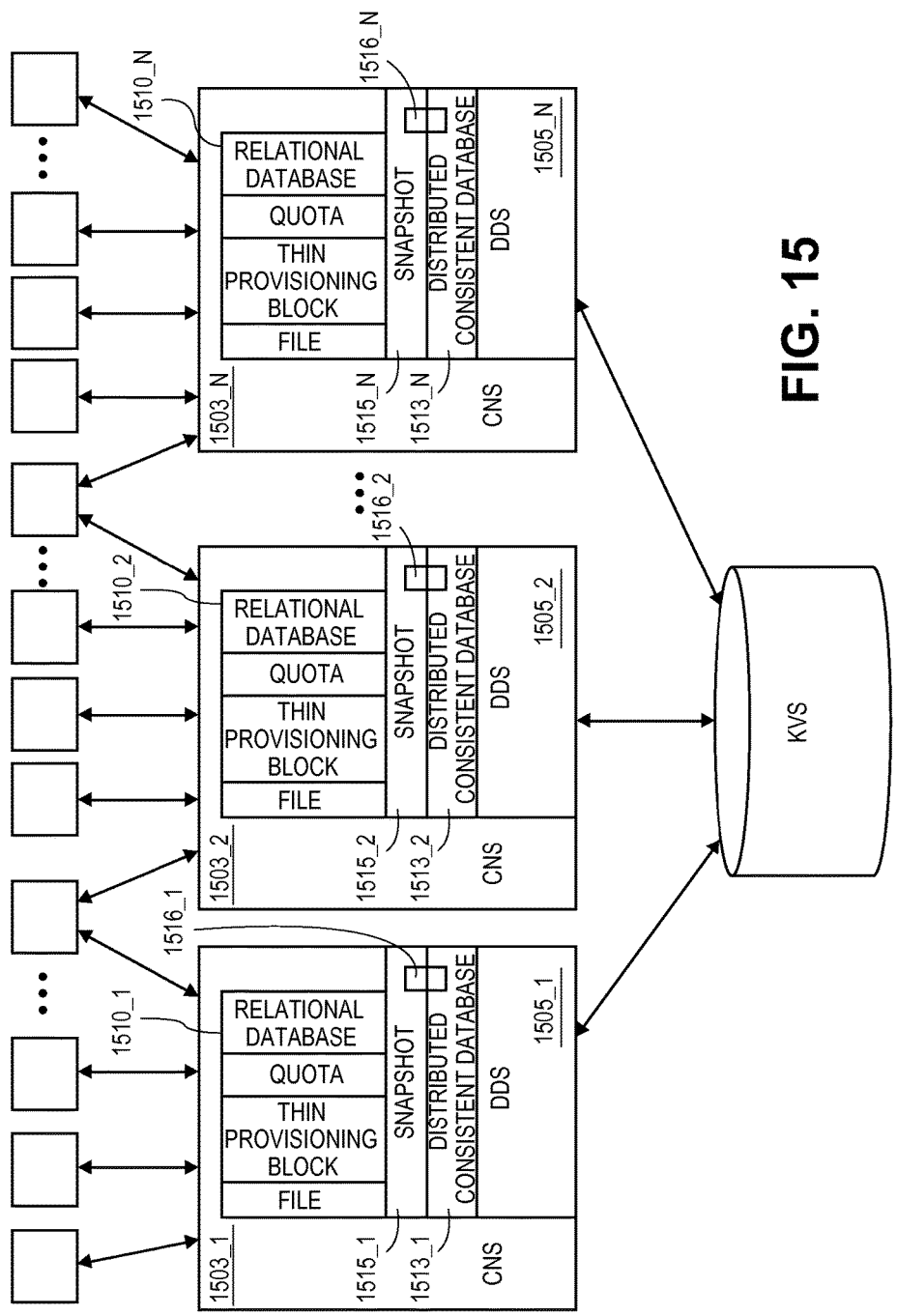
FIG. 15 shows an improved storage system that includes snapshot capability.

FIG. 15 shows a depiction of a system that is more advanced than the initial system originally depicted in FIG. 2. Comparing FIG. 15 with FIG. 2, note that the more advanced system of FIG. 15 includes the incorporation of snapshot technology 1515_1 through 1515_N associated with the distributed consistent database 1513_1 through 1513_N and DDS components 1502_1 through 1502_N of each CNS node 1503_1 through 1503_N. The snapshot components 1515_1 through 1515_N of the CNS nodes 1503_1 through 1503_N of FIG. 15 implement snapshot methodologies consistent the discussions provided immediately below so that various forms of snapshots may be taken of any of the large scale distributed storage systems described in the preceding sections.

Figure 16:
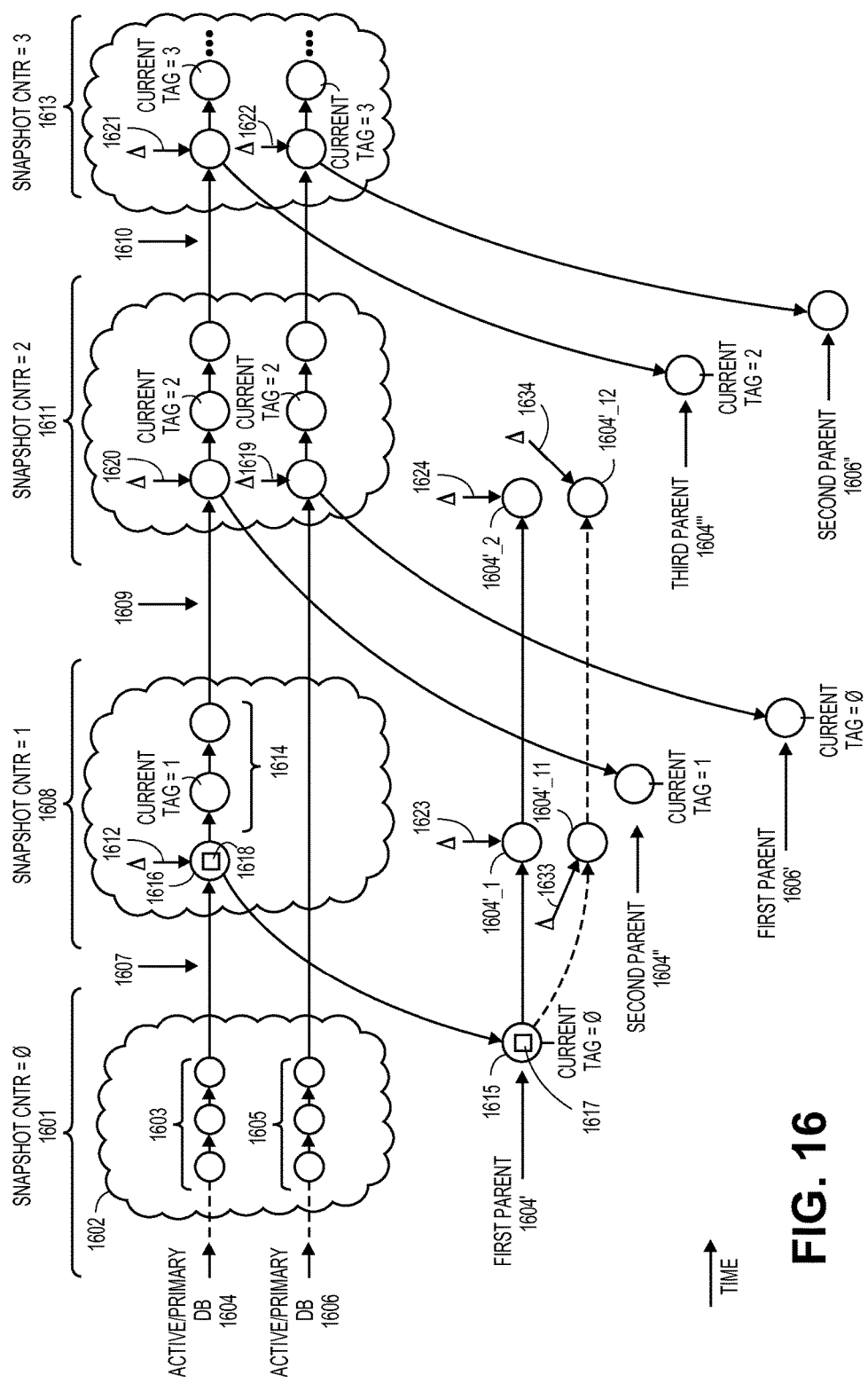
FIG. 16 shows an exemplary depiction of snapshots being taken of a storage system.

FIG. 16 pertains to an approach for taking snapshots of a storage system implemented with distributed consistent databases as discussed in previous sections (whether the storage system is implemented as an object store, a file system, a block storage system or a relational database any of which may or may not use quotas). As the KVS layer is capable of simultaneously keeping the content of multiple, different storage systems, it is understood that although the methodologies of FIG. 16 are performed on a single system as an example, such methodologies may be concurrently performed on multiple ones of the different storage systems implemented in KVS.

As observed in FIG. 16, over an initial time period 1601, the storage system 1602 is used and continually changing. Before any snapshots are taken of the system, a snapshot counter is given an initial value that indicates no snapshots exist (e.g., snapshot counter=0). Here, sequence 1603 depicts changes being made to a particular distributed consistent database 1604 over the time period 1601, and, sequence 1605 depicts changes being made to another particular consistent database 1606 over the time period 1601. Consistent with the discussions of previous sections, the storage system 1602 is composed of multiple distributed consistent databases of which database 1604 and database 1606 are part.

At moment 1607 a snapshot of the entire storage system 1602 is taken. In an embodiment, the taking of a snapshot principally involves incrementing the snapshot counter and understanding that certain meta data and actions are to be taken with respect to the storage system's distributed consistent databases and user data.

After the snapshot is taken the database continues to be used over time period 1608 which causes additional changes to be made to the database. A second snapshot is taken at moment 1609 and a third snapshot is taken at moment 1610. As can be observed in FIG. 16, changes continue to be made to distributed consistent database 1604 within time periods 1608, 1611 and 1613 after their respective snapshots 1607, 1609, 1610. Moreover, changes are made to distributed consistent database 1606 in both time periods 1611 and 1613 but changes are not made to distributed consistent database 1606 in time period 1608.

When the first change 1612 is to be made to distributed consistent database 1604 after the first snapshot 1607 is taken certain actions are taken to effectuate the first snapshot.

As observed in FIG. 16, the "active/primary" version of database 1604 has an associated "current tag" value which corresponds to the value of the snapshot counter the last time a snapshot was taken of consistent database 1604. In an embodiment, the head object for every distributed consistent database within the storage system has its own associated current tag value. Moreover, at the creation of the storage system and/or after all snapshots of the storage system have been deleted, the snapshot counter is reset to a value of 0 and all current tags of all consistent databases within the storage system are reset to a value of 0 (in various embodiments, the counter is set to zero at the creation of the file system and subsequently is never reset). New consistent databases that are added to a storage system having existing snapshots are given a current tag value of "null" to indicate they do not belong to any of the snapshots.

Here, commensurate with changes 1612 being made to active/primary database 1604, the value of the current tag of consistent database 1604 (0) is compared against the value of the snapshot counter (1). Notably, the current tag of database 1604 is less than the value of the snapshot counter. A consistent database whose current tag value is less than the value of the snapshot counter corresponds to a consistent database whose state needs to be saved if any changes are to be made to the consistent database. That is, the change 1612 that is about to be made to database 104 corresponds to its first change since the most recent snapshot 1607 of the system was taken. As such, a number of actions are taken.

First, the state of consistent database 1604 before any of the new changes 1612 are made are saved into KVS. This saved version of database 1604 can be referred to as the "first parent" 1604' of the primary/active database 1604. First parent database 1604' is given a current tag value of 0 to indicate that was the current tag value of the first parent's content when the snapshot was taken.

Second, the current tag value of the primary/active database 1604 is updated to be set equal to the current value of the snapshot counter (1). In an embodiment, all subsequent accesses to the primary/active database 1604 will perform the same comparison of the database's current tag value against the current value of the snapshot counter. Because all such comparisons will not yield a difference between these two values until the next snapshot is taken, changes can continually be made to the primary/active database 1604 over a series of separate accesses 1614 (before the next snapshot 1609 is taken) without triggering any saving of distributed consistent database state to KVS.

In an embodiment, the first parent database 1604' is realized with the same head object 1615 having same object ID as the head object of active/primary database 1604 prior to changes 1612, and, a new second head object 1616 for the version having changes 1612 is created with a new object ID that will be used to implement the active/primary database 1604 going forward. In other embodiments an opposite approach can be taken. As will be described in more detail further below, both head objects 1615, 1616 are obtainable through an "object proxy" (not depicted in FIG. 16) that a leaf page of, e.g., a higher level folder that contains database 1604 refers to instead of either of these objects 1615, 1616 specifically. As such, changes 1612 can be made to active/primary database 1604 and the first parent snapshot 1604' can be created without any changes having to be made to such a leaf page. Object proxies are discussed in more detail further below.

The head object 1615 of the first parent 1604' will have the mapping table 1617 as it existed in the active/primary database 1604 before any of the changes 1612 were made. By so doing, the state of database 1604 as it existed just prior to changes 1612 is preserved. If changes 1612 modify one or more pages of the hierarchy of pages of primary/active database 1604, new object IDs for affected pages would be listed in a new, updated mapping table 1618 kept within the new primary/active database head object 1616. As a consequence of the immutable property, the original pages will still be preserved in KVS and will be referred to by the (older) mapping table 1617 in the head object 1615 of first parent 1604'.

The actual implementation of the first parent database 1604' from head object 1615 therefore includes sharing of pages and data items that are not modified by the changes 1612. For example, as discussed just above, changes 1612 may remove a few pages from the database's hierarchy of pages and replace them with new ones. All other (unchanged) pages are contained in objects that are referred to by both the updated mapping table 1618 of the new primary/active database head object 1616 and the older mapping table 1617 of the first parent 1604' head object 1615. These principles remain in force for all subsequent changes made prior to the next snapshot 1609.

If active/primary database 1604 corresponds to a folder in a file system or block storage implementation and a change is made to a lower distributed consistent database that is referred to by a leaf page of database 1604, the change made to the lower database will be handled no differently than changes 1612 made to database 1604. Note that if a change is made to the lower database, the current tag associated with the head object of the lower head object will also be updated to a value of 1 (consistent with the discussions above). An object proxy of the lower database (again, objects proxies are discussed in more detail below) is used to differentiate which version of the lower database (the snapshotted version or the version with changes) is to be actually fetched from a leaf page of database 1604 during subsequent accesses.

Note that distributed consistent database 1606 has no changes made to it in the time period 1608 between the first 1607 and second 1609 snapshots. As such, when the first change 1619 is made to database 1606 after the second snapshot 109, the treatment will be as described above for database 1604 and changes 1612. An exception is that the current tag of database 1606 will be given a value of 2 (and not 1) to reflect that the first parent 1606' of database 1606 was created after the second snapshot 1609 and not the first snapshot 1607. The first parent 1606' will have a current tag of 0 to indicate that it represents a version that has not changed since before snapshot 1607 was taken.

Changes 1620 are also made to active/primary database 1604 after the second snapshot 1609 which results in the creation of its second parent database 1604". The second parent 1604" will have a current tag value of 1. The current tag of the active/primary database 1604 increments from 1 to 2 as a consequence of these changes.

After the third snapshot 1610 is taken, changes 1621, 1622 are again made to both active/primary databases 1604, 1606 which increases the current tag of both to 3 and creates third 1604''' and second parents 1606" respectively each having current tag values of 2.

Figure 17:
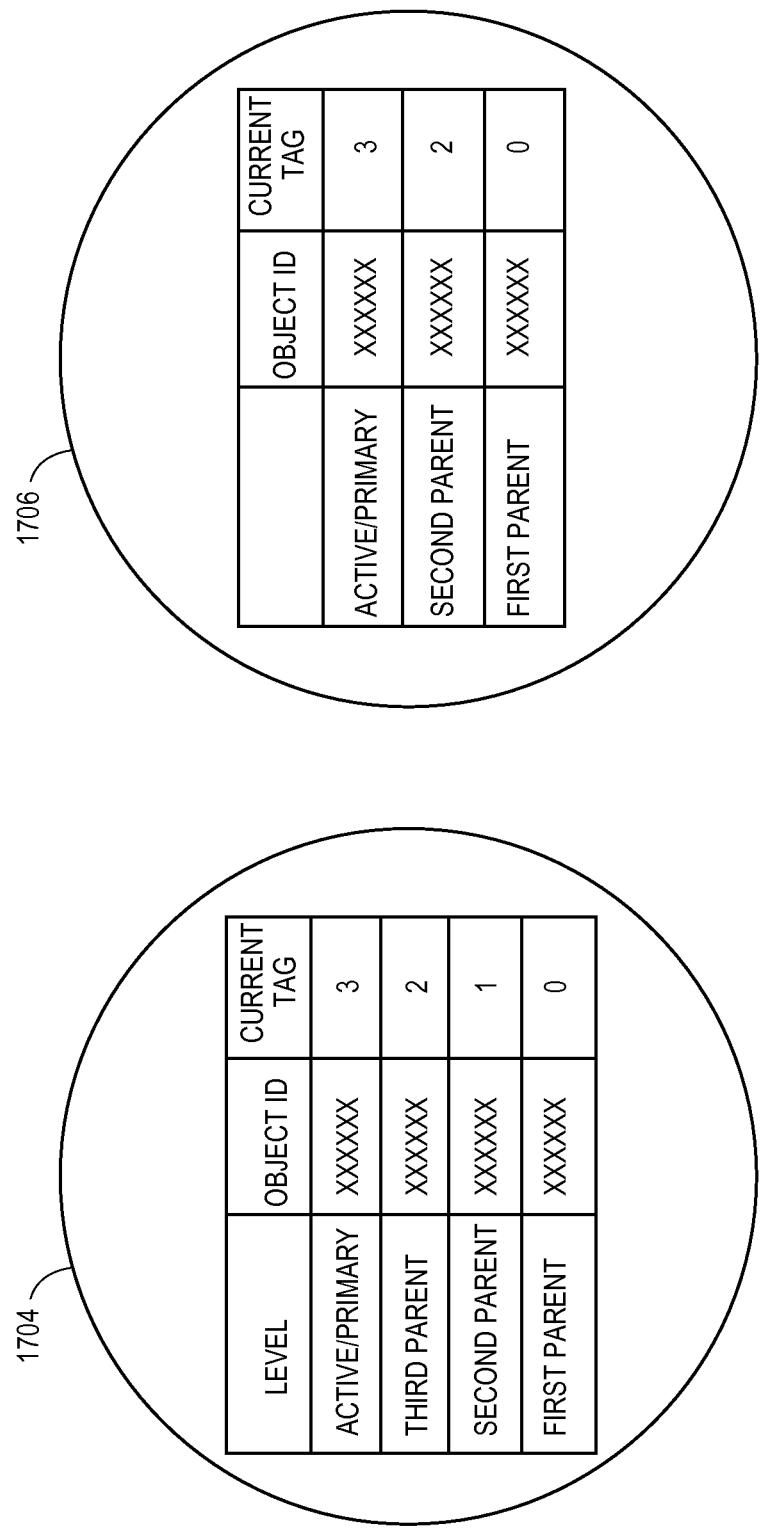
FIG. 17 shows an exemplary depiction of two object proxies.

FIG. 17 shows an exemplary object proxy 1704 for database 1604 and an exemplary object proxy 1706 for database 1606 after changes 1621 and 1622 are made to both databases respectively. As observed in FIG. 17, the object proxy 1704 for database 1604 lists the various versions of database 1604 including the active/primary version and all its parents along with their respective object ID and associated current tag value. Likewise, the object proxy 1706 for database 1606 lists the various versions of database 1606 including the active/primary version and all its parents along with the object ID of their respective head objects and associated current tag value.

In an embodiment, each object proxy is implemented as a mutable object or distributed consistent database with the information of the object proxy contained therein. In an embodiment, the respective leaf page of a higher level consistent database that "contains" database 1604 or 1606 (e.g., a folder that contains the content of database 1604 or 1606) will refer to the object proxy of a particular database rather than any of its versions specifically.

The information within the object proxy is used to fetch the correct head object for the particular version that is targeted by the particular request. For example, if the access to database 1604 is to make a change to the current version of database 1604, the object ID for the head object for the active/primary version of the database will be retrieved from the object proxy and utilized. By contrast, if the access is for a particular snapshot level of database 1604, the head object for the correct parent will be retrieved from the object proxy and utilized.

As an example, if a request is made for the snapshot level 2 information (i.e., snapshot 1609) for both databases 1604, 1606 sometime after changes 1621 and 1622 are made to the respective databases, the respective object proxies for both databases 1604, 1606 will be fetched. The object ID for the second parent 1604" (having current tag=1) will be used from object proxy 1704 and the object ID for the first parent 1606' (having current tag=0) will be used from object proxy 1706. Note that the correct retrieved version has a tag value that is the closest, lesser value to the desired snapshot level.

If a subsequent request is made for snapshot level 1 information (i.e., snapshot 1607) for both databases 1604, 1606, again the respective object proxies for both databases will be retrieved. The object ID for the head object having a current value of 0 will be selected from both object proxies (first parent 1604' and first parent 1606').

If snapshot level 1 information is no longer desired (the intent is to erase snapshot 1607), again the object IDs for first parents 1604' and 1606' (having a current tag value of 0) will be retrieved from the object proxies. Any object IDs of any pages found within the respective mapping tables of the first parents 1604' and 1606' that do not exist on the respective mapping tables of any later parents or the active/primary databases 1604, 1606 can be deleted.

If snapshot level 2 information is no longer desired (the intent is to erase snapshot 1609), the object ID for second parent 1604" of database 1604 will be retrieved from its corresponding object proxy and the same procedure discussed just above will be followed. If snapshot level 1 has not been deleted as of the deletion of snapshot level 2, the comparison of mapping table entries will also be made looking backward as well as forward. That is, the mapping table entries of second parent 1604" will be compared against first parent 1604' as well as against its junior parents and the active/primary version. Again, only the objects for entries that appear on the mapping table of second parent 1604" but also do not appear on the mapping table of first parent 1604' or any of the junior snapshots or active/primary database are permitted to be deleted.

The deletion of snapshot level 2 will have no effect on the kept versions of database 1606 regardless if snapshot level 1 was or was not deleted beforehand. If snapshot level 1 was deleted beforehand, there is no version of database 1606 having a current tag value of 1 to implement deletion of the snapshot 2 level. If snapshot level 1 was not deleted beforehand, the (first parent) version 1606' of database 1606 having a current tag value of 0 also preserves the snapshot level 1 information for database 1606. Since snapshot level 1 has not been deleted in this case, the version having a current tag value of 0 is not permitted to be erased.

The mechanism by which the entries on the mapping table of a senior parent database are compared against the entries on the mapping tables of junior parents or the active/primary database may vary from embodiment to embodiment. According to one approach, the mapping table of all junior databases (all junior parents and the active/primary database) are retrieved and compared against the mapping table entries of the parent to be deleted. Any object ID found on the mapping table of the snapshot level to be deleted that is not found on any junior mapping table are marked for deletion and deleted.

According to another embodiment, mapping tables are compared against one another when a snapshot is taken. For instance if a second parent snapshot is taken, its mapping table is compared against the mapping table of the first parent during the creation and instantiation of the second parent snapshot. Any object ID that is found on the mapping table of the first (senior) parent but that is not found on the mapping table of the second (junior) parent is understood to be eligible for deletion upon deletion of the first parent snapshot. The mapping table of all junior snapshots can be compared, e.g., at the time of their creation, to the mapping tables of all their respective senior parent snapshots in this manner to embed appropriate deletion information into the mapping tables of the senior parents.

Note that care needs to be taken with respect to the operation of a DELETE command performed at the active/primary database. Specifically, the active/primary database is not permitted to delete any objects that the mapping table of a currently existing snapshot refers to. As such, in an embodiment, whenever a snapshot of the active/primary database is taken, the entries on the mapping table of the active/primary mapping table are marked to indicate that the objected IDs listed on the mapping table are "owned" by the parent snapshot. Any such marked object IDs are therefore not deleted by the active/primary database even if nominal functions would otherwise do so (e.g., change to a hierarchical page).

Any new object IDs that are added to the mapping table of the active/primary database as a consequence of changes made to the active/primary database subsequent to the taking of the snapshot are not marked and are therefore eligible for deletion until the next snapshot is taken at which point all existing object IDs are again marked to protect them from deletion.

Object IDs that are marked for protection from deletion can nevertheless be replaced on a mapping table entry. For instance, per normal operation, if an object containing a page is changed, a new object is used to keep the new page and the entry on the mapping table will correlate the ID of the page to the object ID of the new object containing the new page. Thus the old object ID of the old page, if it is protected, will be replaced in the mapping table entry. But because it is protected it will not be deleted. In an embodiment, when the mapping table entries of an active/primary database are compared against the mapping table entries of an earlier/parent, it is understood that only the object IDs within active entries are used in the comparison (object IDs that are protected but have been replaced in the mapping table entries are not used in the comparison).

Figure 18B:
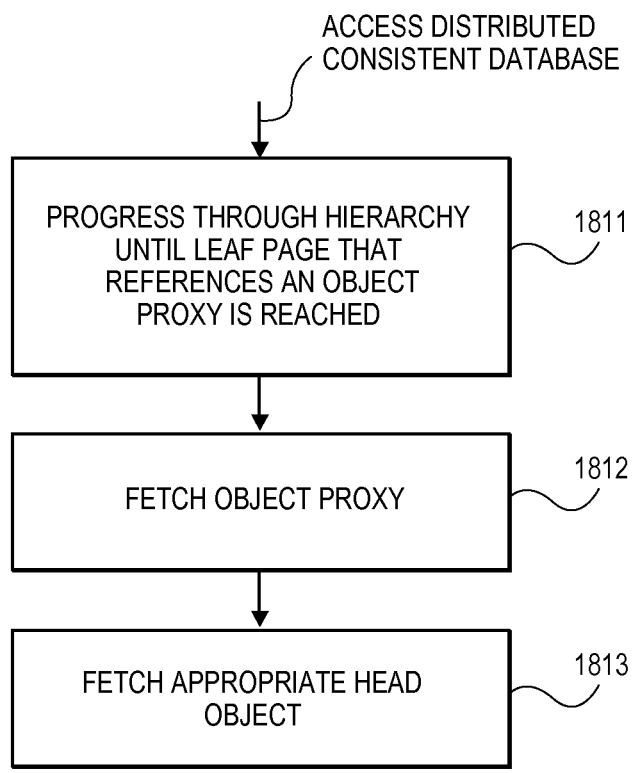
Figure 18C:
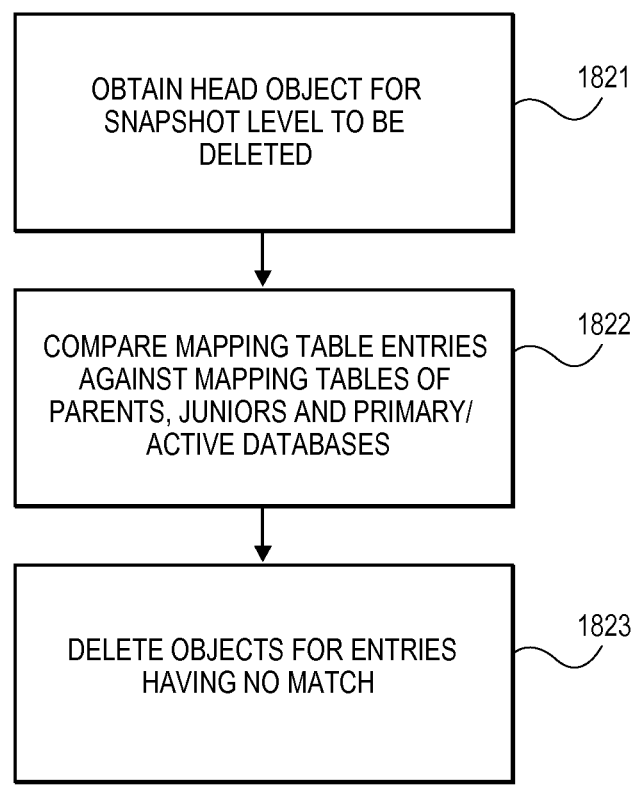

FIG. 18*a-c* illustrate some basic storage system snapshot processes discussed above. As observed in FIG. 18*a*, when a change is to be made to a distributed consistent database, the current tag for the distributed consistent database is compared to a snapshot counter 1801. If the current tag is equal to the snapshot counter, the change is made and no further processes are implemented 1802. If the current tag is behind the snapshot counter, it is understood that a snapshot has been taken and the distributed consistent database's state as of that snapshot have not yet been taken. As such, in response, the content of the head object for the distributed consistent database is saved 1803 (including its mapping table content), the entries of the mapping table to be used for the active/primary version of the distributed consistent database going forward are marked to prevent their deletion 1804, and the current tag value of the active/primary version of the distributed consistent database is set equal to the snapshot counter 1805. In conjunction with processes 1803-1805, the change is made to the distributed consistent database 1802. In an embodiment, the process of FIG. 18*a* is carried out for every consistent database in the storage system to realize a snapshot of the entire storage system.

As observed in FIG. 18*b*, when snapshot information for a particular distributed consistent database is accessed (e.g., as a file or folder within a file system or as a file within a thin provisioned block storage system), a hierarchy of distributed consistent databases and their associated hierarchy of pages are progressed through until a leaf page is reached that references the object ID for an object proxy within KVS 1811 that represents the distributed consistent database. The object proxy is fetched 1812 which contains object IDs for the respective head objects of different snapshot versions of the distributed consistent database (and the active/primary version of the distributed consistent database). A determination is made as to which snapsotted version contains the correct information for the desired snapshot level and the head object for the correct information is retrieved from KVS 1813.

As observed in FIG. 18*c*, when a decision is made to delete a snapshot level, the object proxy for a distributed consistent database is obtained and the head object for the version to be deleted (if one exists) is obtained 1821. The entries of the mapping table of the retrieved head object are compared against the entries of the mapping tables for all other parent and junior versions of the database as well as the current/primary version 1822. Entries that exist on the mapping table of the version to be deleted but do not exist on the other versions are permitted to be deleted 1823.

In various embodiments, snapshot versions can take on the characteristics of an active/primary database. More simply, changes are permitted to be made to a snapshot and the flow of changes becomes its own active/primary database.

FIG. 16 indicates that at time 1623 changes are made to first parent 1604' creating version 1604'_1 of database 1604. Changes are then again made to version 1604'_1 at time 1624 creating version 1604'_2 of database 1604. When changes are made to a snapshot, a "branch" or "fork" is said to be taken from the active/primary database. That is, the string of changes 1623, 1624 stemming from snapshot 1604' and their corresponding head objects 1604'_1 and 1604'_2 correspond to an entirely separate active/primary database level that branched from the original active/primary database 1604. In many cases, because a branch begins with a snapshot and changes can then be made to the snapshot, a "branch" is actually realized as a "read/write" snapshot. Read/write snapshots are discussed further below. In an embodiment, all object IDs stemming from the mapping table of the original snapshot 1604' are marked in the mapping tables of the branch's subsequent versions 1604'_1, 1604'_2, etc. to prevent the senior objects from being deleted during the subsequent activity of subsequent versions 1604'_1, 1604'_2. In this manner the objects referred to by the original snapshot 1604' are preserved (and as such snapshot 1604' is preserved).

In further implementations, snapshots can be taken from branches. For example, a snapshot of version 1604'_1 could be taken before the changes that created version 1604'_2 were made. The snapshot would be processed no differently than the discussion of snapshots provided just above. It may be pertinent to point out that a branch typically represents a branch for more than just one distributed consistent database (e.g., a branch for the entire data storage system).

An issue concerns the size of the object proxy when snapshots are taken along branches. If all versions of an object including snapshot versions along branches are kept in the object proxy, the object proxy itself can become too large and hamper overall system performance. As such, in an embodiment, the object proxy does not keep object IDs for all of its snapshot versions.

Instead, each head object of a version of a particular consistent database is configured to refer to its parent. For example, referring to FIG. 16, the head object for the third parent 1604''' would contain a reference to the head object for the second parent 1604" and the head object for the second parent 1604" would contain a reference to the head object for the first parent 1604'. If the head object for the active/primary database 1604 keeps a reference to the head object of its most recent parent (e.g., the third parent 1604''' in the example of FIG. 16), the object proxy need only identify the head object of the active/primary database 1604 because all parent snapshots can be obtained by chaining back through the snapshot references (e.g., the head object for the second parent 1604" can be obtained by chaining back from the active/primary 1604 to the third parent 1604''', and then from the third parent 1604''' to the second parent 1604").

If snapshots are being taken from a branch, the object proxy additionally keeps the object ID for the "head" of the branch. For example, again referring to FIG. 16, the object proxy for consistent database 1604 would not only identify the head object for the active/primary database 1604 but would also identify the head object for the active/working version 1604'_2 of the branch that stems from first parent 1604'. The active/working version 1604'_2 of the branch would contain a reference to its snapshot parent 1604'_1 which in turn would contain a reference to its parent 1604'. With this arrangement, the object proxy essentially only contains the heads of all its branches and previous snapshot versions along any particular branch can be obtained by chaining backwards from the heads.

In various embodiments, branches may be taken from branches. Again the same procedures discussed above may be applied with the only difference being that the original snapshot for a "second" branch is taken from a branch and not the primary/active database. The object proxy would be modified to include the head of the second branch as well.

In an alternate approach, the "head" of a branch is implemented as an object proxy that keeps the object ID for the working version of the branch and the object IDs of the head objects for all of the snapshots taken along the branch and its initial seed version.

In an embodiment, a data structure is kept at the root of the entire storage system that records which snapshot level each branch was taken on and the parent for each branch. Through this structure the system can fetch the appropriate information for any particular snapshot level along any particular branch. The snapshot counter may be "global" with each snapshot level assigned to any one or more of the primary/active storage system or any of its existing branches. Here, each time the system attempts to access the active/primary storage system or one of its branches, the system can comprehend what snapshot levels have previously applied to the branch being accessed and can implement appropriate procedures accordingly (if certain snapshot levels have not been assigned to a branch it can ignore them and interpret current tags accordingly). Alternatively each branch may have its own snapshot counter (where the head of each branch is defined from its parent branch and the snapshot level of its parent branch from where the branch begins). In an implementation, snapshots levels are regularly removed and the data structure does not record erased snapshot levels which keeps the size of the data structure manageable.

Regardless as to how the snapshot information is managed, in an embodiment, snapshots are declared or otherwise associated with a property that indicates whether the snapshot is a "read only" snapshot, or, a "read-write" snapshot. If a snapshot is a read only snapshot, changes are not be permitted to be made to the snapshot's recorded information of the storage system's state. By contrast, if a snapshot is a read-write snapshot, changes are permitted to be made to the snapshot's recorded information of the storage system's state. Here, the "branch" that stemmed from first parent 1604' of FIG. 16 as a consequence of the series of changes made from the first parent 1604' correspond to a form of a read-write snapshot.

Both read-only and read-write snapshots are easily scaled outward for concurrent access by multiple users (e.g., across a wide geographic disperse across multiple CNS nodes). In the case of a read-only snapshot, multiple read copies of any/all snapshot information (e.g., such a particular data object) are freely given as changes can not be made to the provided information. Even in the case of read-write snapshots, through the use of head object version numbering (to be distinguished from current tag values) as discussed above with respect to FIG. 8, conflicts between competing writes to a same consistent database are readily resolved.

FIG. 16 also indicates that in the case of read-write snapshots, multiple branches can be taken from a same snapshot level which permits ease of scaling for multiple users (or sets of users) that wish to write their own unique set of changes starting from a particular snapshot level in isolation of each other. That is, for example, a first group of users may wish to make a series of changes to a particular snapshot level in a manner that does not provide visibility to or from changes made by other users to the same snapshot level.

Here, recalling that sequence of changes 1623 and 1624 (and resulting head objects 1604'_1 and 1604'_2) correspond to a sequence of changes made to the first snapshot level of database 1604, consider additionally that these changes were made by a first group of users that seek to operate in isolation from other users. Here, a second branch and corresponding sequence of changes 1633 and 1634 (and resulting head objects 1604'_11 and 1604'_12) may be made by another group of users that also operate from the first snapshot level and seek to operate in isolation of other users (the second sequence of changes 1633 and 1634 are understood to operate according to the same principles as the first sequence of changes 1623 and 1624).

By providing the first group of users the object IDs for head objects associated with the first branch (i.e., the object IDs for head objects 1604'_1 and 1604'_2) and the second group of users the object IDs for head objects associated with the second branch (i.e., the object IDs for head objects 1604'_11 and 1604'_21), each group of users will be permitted to operate from the first snapshot level of database 1604 without visibility into or interference from the changes made by the other users.

Recall that the snapshot approaches described herein efficiently cause junior versions to refer to the unchanged objects of earlier versions. As such, a natural "de-duplication" characteristic can be observed to exist. For example, the mapping table of version 1604'_1 may include many of the same references found in the mapping table of version 1604'. As such, when accessing unchanged pages or data objects along the first branch, a user assigned to the first branch will actually use the pages and objects of version 1604'. Likewise, when accessing unchanged pages or data objects along the second branch, a user assigned to the second branch will actually use the pages and objects of version 1604' as well. By causing different users even from different branches to utilize what are essentially shared copies of same information, the system is able to efficiently scale in terms of the number of different branches that can be supported.

As observed in FIG. 15, the distributed database 1513_1 through 1513_N and snapshot 1515_1 through 1515_N functions of each CNS node 1504_1 through 1504_N may be integrated with a "volume manager" function 1516_1 through 1516_N that is designed to assign certain users to certain branches and provide them with (or otherwise cause them to only use) the object IDs of head objects associated with a specific branch that has been assigned to them. The different groups of users may correspond, for example, to different functional roles within a corporation, and/or different corporations, etc.

Note that the above examples were directed only to branches from a particular distributed consistent database. By providing the same treatment for all distributed consistent databases within a complete storage system (e.g., a large scale file system or thin provisioned block storage system) groups of users can be provided with their own isolated snapshots of the entire storage system to which they are able to make their own isolated changes. Here, as just one example, a first group of users may be given a first branch number from a particular snapshot level to which all their changes are tracked from any/all database versions at that snapshot level within the entire file system. A second group of users may be given a second branch number from the same snapshot level to provide separate read-write snapshots of the entire system to the groups of users that are in isolation of each other. In an embodiment, each such separate read-write snapshot is referred to as a "reference volume" that is provided by the volume manager function 1516_1 through 1516_N. In an embodiment, "reference volumes" may also be provided for a singular, thin provisioned block storage file.

Additionally, a "reference volume" may be established as part of the image of a virtual machine (e.g., in the case where the CNS nodes are supporting VM hosting). Here, the virtual machine image is designed to include the content of a storage system at a particular state and is expected to be able to operate in isolation to changes made by other virtual machines who also started with the same initial state information. By assigning each virtual machine a unique branch number from a particular snapshot level, each virtual machine will start with the content of the snapshot level as its initial state and be able to make changes to that state along its branch in isolation of changes made by other virtual machines to that same initial state along their own dedicated branches. The behavior of the virtual machine may be additionally designed to provided for periodic backups. In this case, each virtual machine is permitted to take snapshots from its own branch on a periodic basis.

The volume manager function 1516_1 through 1516_N (apart from virtual machine images) may additionally configure snapshots to be read-only for incremental back-ups (e.g., hourly, daily, weekly, etc.) and configure snapshots that are to be used as "reference volumes" by various users as read-write snapshots. An incremental backup snapshot taken along a particular branch can be used to "restore" that branch's reference volume (e.g., in response to a crash) by instilling the storage system's distributed consistent databases along the reference volume's branch with the respective content of these databases from the latest back-up.

Apart from volume management, the relational database functions 1510_1 through 1510_N of FIG. 15 may be configured to utilize snapshots so that multiple concurrent transactions that run off a same database implemented within KVS can instead be executed in a SERIALIZABLE fashion. For instance, a first snapshot of a database may be taken and a first transaction may be permitted to execute and commit from the first snapshot. A second transaction may be permitted to execute and commit from a second snapshot of the database that reflects the state of the database immediately after the first transaction commits.

6.0 More Detailed Embodiment with Gen Numbers

FIGS. 19A through 19I describe some general concepts and methodologies for the taking of snapshots and forks for a distributed consistent database within a storage system.

Figure 19A:
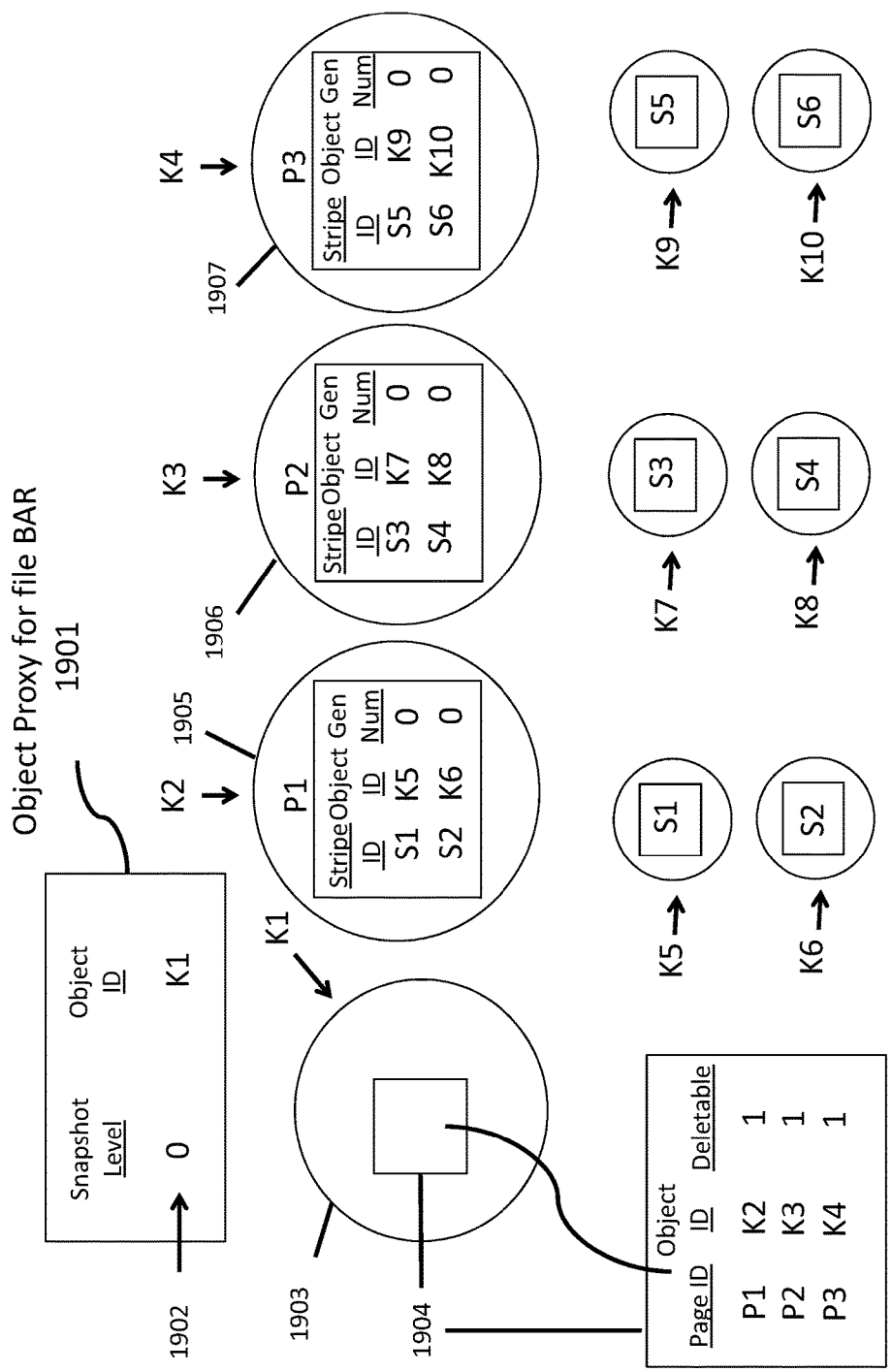

As observed in FIG. 19A, initially a thin provisioned file system is deployed having snapshot level 0. FIG. 19A pertains to only one of the files within the system (file "BAR"). Consistent with the discussions provided above, the file BAR may be contained within a folder (e.g., "FOO") that is itself implemented as a distributed consistent database whose corresponding hierarchy of pages includes a leaf page that identifies the object proxy for the file BAR. Here, object proxy 1901 corresponds to the object proxy for the file BAR. As observed, initially, the object proxy 1901 only contains a single reference 1902 to the active/primary version of the BAR file.

The active/primary version of the BAR file is depicted in FIG. 19A as including a head object 1903 having a mapping table 1904. For simplicity the hierarchy of pages is depicted as including only three leaf pages P1, P2 and P3 contained in KVS objects 1905, 1906 and 1907, respectively. Leaf page P1 references stripes S1 and S2, leaf page P2 references stripes S3 and S4 and leaf page P3 references stripes S5 and S6. Each of the stripes have a generation number of 0. As an optimization, the object proxy 1901 may be kept in the head object 1903 of the active/primary version of the BAR file (so that only one and not two KVS accesses are needed to access the active/primary version). The use of a generation number (or "gen number") will be described in more detail below.

As of the moment depicted in FIG. 19A, the highest gen number reflected in the active/primary version is 0 and the lowest gen number reflected in the active/primary version is 0. As such, the gen number is given a "range" of [0,0]. A distributed consistent database whose range includes a set of same numbers corresponds to a distributed consistent database that does not represent consolidated snapshots. Consolidated snapshots are described in more detail further below.

Figure 19B:
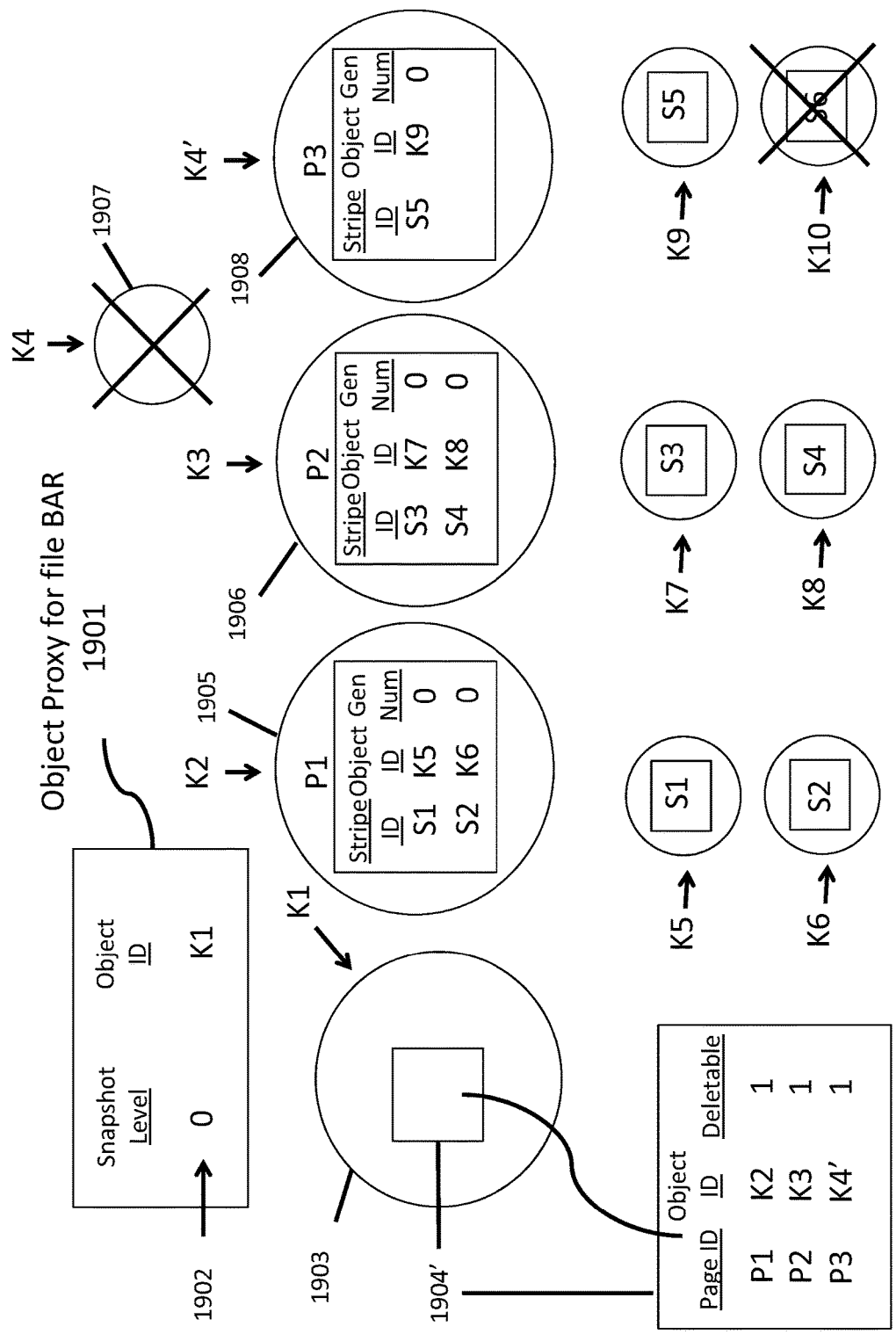

After a brief while, as observed in FIG. 19B, a change is made to the active/primary version of the BAR file. In particular, stripe S6 is deleted. Note that each of the entries in the mapping table 1904 are marked to indicate whether the object containing the page for an entry in the mapping table 1904 can be deleted. Specifically, each entry is given a value of "1" which means the respective object of each entry is permitted to be deleted. As of yet, no snapshots or forks have been taken of the BAR file which means no current state of the active/primary database needs to be preserved. In response to the deletion of stripe S6, leaf page P3 needs to be changed to now only refer to stripe S5 (and not S5 and S6).

Thus a new P3 leaf page that only references S5 is created and stored in new object 1908 (that is referenced by key K4'). Furthermore, because mapping table entries are permitted to be deleted as indicated by the extra bit in the mapping table 1904, the object 1907 that held the original version of P3 (referenced by key K4) is also deleted. The head object for the active/primary version of the BAR file is stored back into KVS with the updated mapping table 1904' that contains the reference to new object 1908 rather than object 1907 for page P3. The re-stored head object 1903 with the updated mapping table 1904' can be viewed as the current active/primary version for the BAR file. The head object is stored with current tag value of 0 because that is the value of the snapshot counter when the head object is stored. The head object also keeps range [0,0].

Figure 19C:
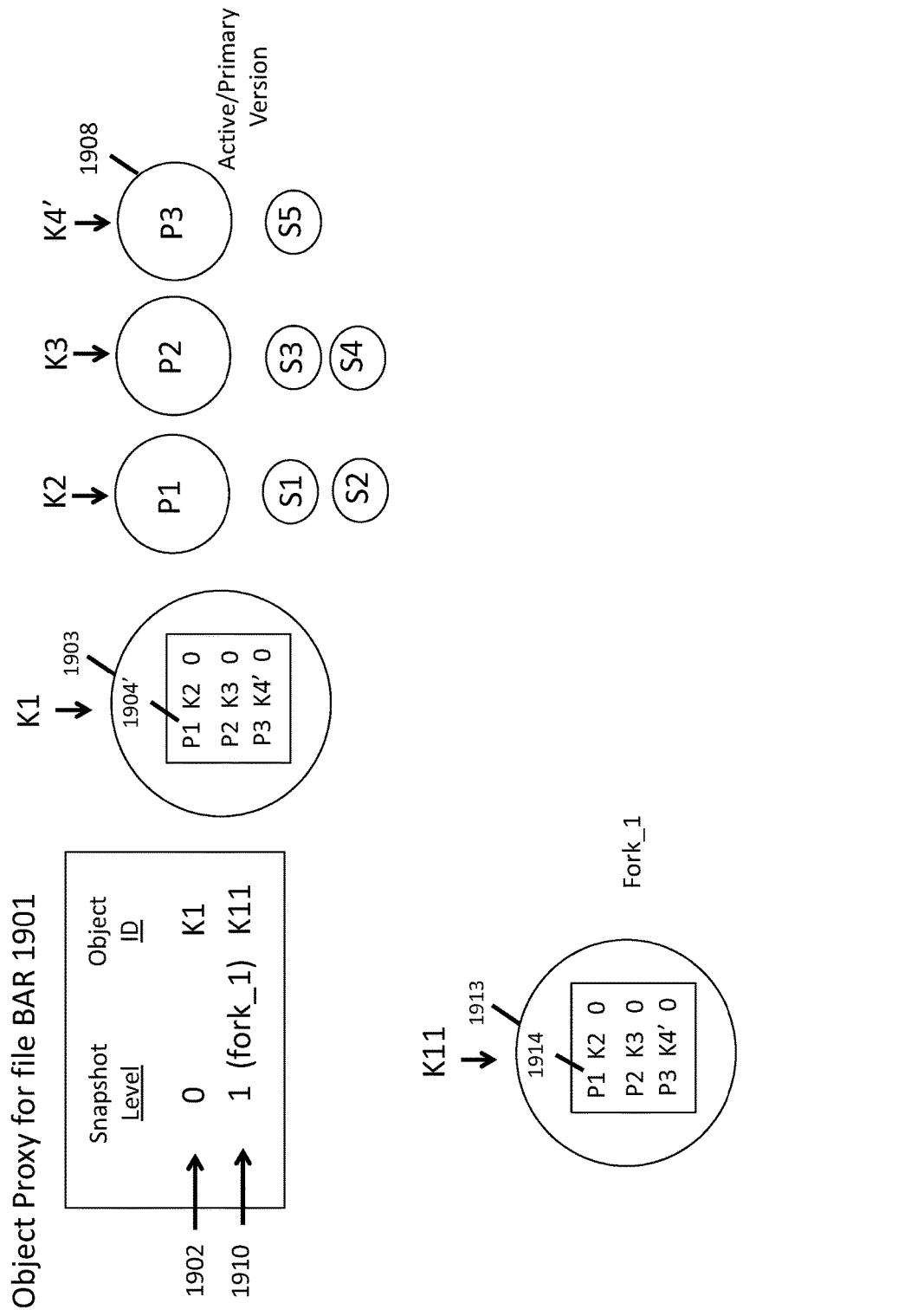

After the deletion of S6 is made, referring to FIG. 19C, a global fork is declared for the entire file system of which the BAR file is a part. Note that the global fork is declared before any other forks or snapshots of the storage system have been taken. In the present embodiment, unlike some of the embodiments discussed above (e.g., in reference to FIG. 17), the object proxy 1901 does not track versions of snapshots but does track the different forks for a particular database. As such, as will become more clear below, object proxy 1901 will contain a list of forks that are taken from the BAR file but references to snapshots taken of the BAR file are contained elsewhere. Also as will be made more clear below, the global snapshot counter nevertheless increments on either the taking of a snapshot or a fork because both cause the creation of a new head object for the BAR file.

In response to the global fork being taken of the entire file system, upon any next change to the BAR file, another new head object 1913 is copied from the head object 1903 of the active/primary version to create the "seed" database for the fork. An entry 1910 is created in the object proxy 1902 for the first fork that references the head object 1913 of the seed database for the first fork. The entry is given snapshot level 1 because the taking of the global fork caused the global snapshot counter to increment.

Note that the trigger condition for the creation of seed head 1913 is a change to the BAR file after the global fork is taken. By creating seed head 1913, the state of the active primary database at the moment of the fork was taken is preserved in head object 1903. The change to the BAR file that triggered the creation of seed head 1913 can be any change such as a change that does not change any of the data stripes kept by the active/primary version of BAR (e.g., movement of the BAR file from the FOO folder to another different folder). For ease of drawing such a non-destructive change is assumed, as such no changes to the active/primary version are observed in FIG. 19C. For additional simplicity, subsequent forks described below are assumed to be created through similar processes.

At the initial creation of the fork, the effective content of the seed database for the fork is an exact duplicate of the content of the active/primary version 1902' at the moment the fork is taken. The entries of mapping table 1904' of the active/primary version, however, are modified to reflect that they can no longer be deleted (because the fork depends on them). Likewise, the entries of the mapping table 1914 of the fork are also marked to indicate that they also cannot be deleted (because the active/primary version depends on them). The copied over seed head object 1913 is stored with current tag value of 1 because the snapshot counter was incremented from 0 to 1 in response to the creation of the fork. Moreover, the seed head object 1913 is given a gen number range of [1,1] (which means all the stripes/data objects will be tagged with a gen number of 1). Note that at this stage the fork database is only represented by the head object 1913 as it is a total copy of the active/primary version and does not yet have any modifications specified to itself. As such, the fork entirely relies on the objects holding the pages and stripes of the active/primary version.

Figure 19D:
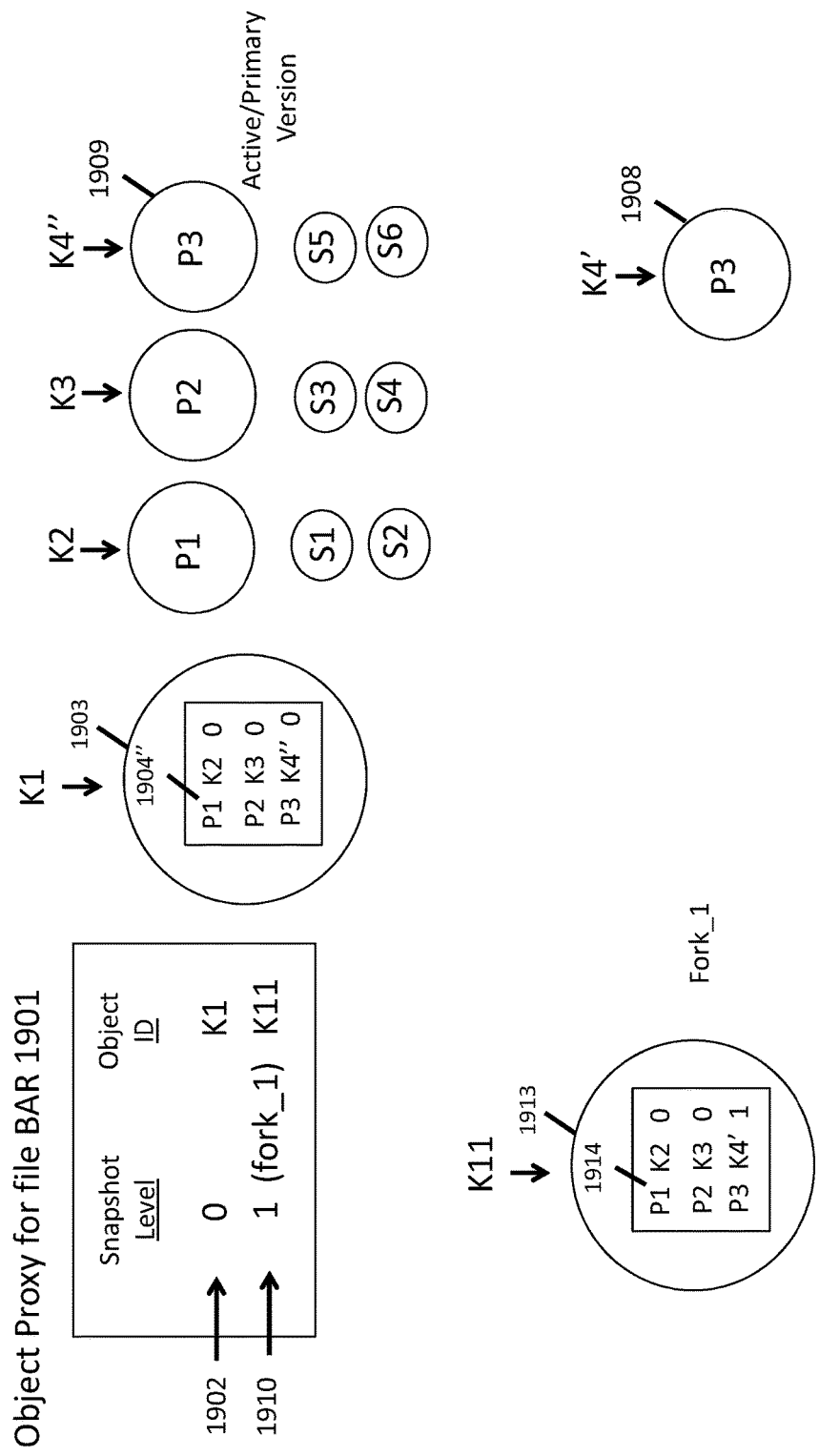

Subsequent to the creation of the fork, as observed in FIG. 19D, another change is made to the active/primary version. This time the change is the (re) addition of stripe S6 to page P3. Again a new P3 page is created for the active/primary version that references both S5 and S6 and a new object 1909, referenced by key K4", is created to store that page. The entry in mapping table 1904' is updated to reference object 1909 instead of object 1908 and the updated mapping table 1904" is kept in the head object 1903 for the active/primary version. This time, however, because of the markings in the mapping table 1904', object 1908 is not deleted but is preserved in KVS (again, the fork relies on it). Because only the fork now relies on the version of P3 kept at K4' (object 1908), the mapping table 1914 for the fork can be modified to reflect that the fork now owns this version of P3 and is free to delete it (e.g., upon a next change by the fork to P3). The head object 1903 for the current version is stored with a current tag value of 1 because that is the value of the snapshot counter when the head object is stored. Moreover, the head object is given a range of [1,1].

Figure 19E:
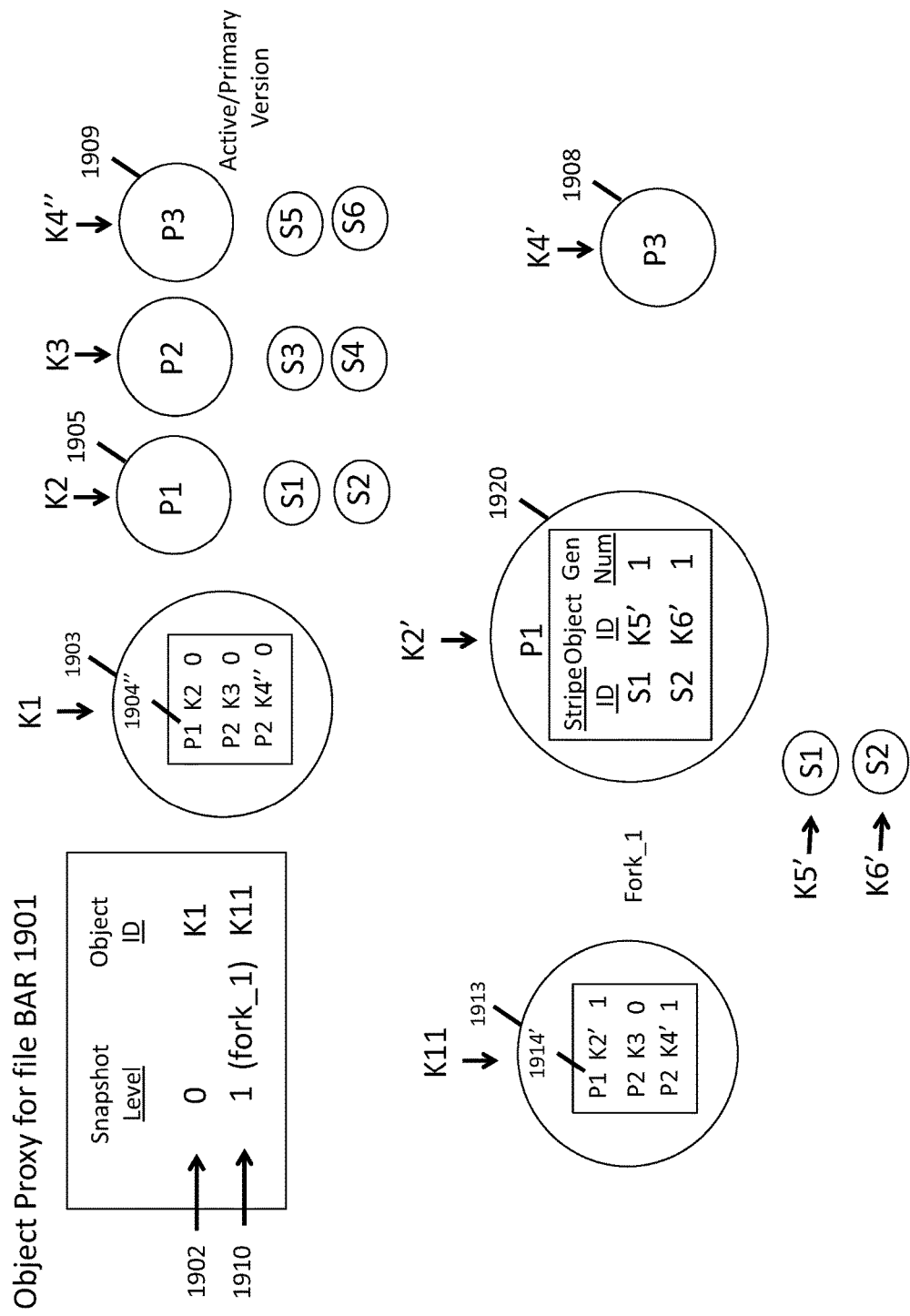

After the second change to the active/current version is made, as observed in FIG. 19E, a change is made to the fork version of the BAR file. Specifically, both stripes S1 and S2 are modified to produce versions of S1 and S2 kept in new objects referenced by K5' and K6', respectively. The modification of a data object (such as a stripe) causes its respective gen number to increment. As such, the gen number for both S1 and S2 in the fork increment from 0 to 1. Because of the modification of stripes S1 and S2, page P1 needs to be modified to change its references to new objects for stripes S1 and S2 in K5' and K6' and also increment their respective gen numbers from 0 to 1. Thus a new page P1 is created and kept in new object 1920 that is referenced with key or object ID K2'. The mapping table 1914 within the original seed head object 1913, as discussed above, originally had the entry for P1 marked to indicate that the object holding P1 in K2 could not be deleted (see mapping table 1914 of FIG. 19D).

As such the original object 1905 referenced by K2 that contained P1 is not deleted by the modification to stripes S1 and S2 (here, the active/primary version 1902 still depends on this version of P3). Nevertheless, the seed head object's original mapping table 1914 is modified to create a new mapping table 1914' that references object 1920 rather than object 1905. Additionally, the entry in the updated mapping table for page P1 now indicates that it can be deleted (since no other versions of the BAR file depend on it). Here, it is recognized that the modification to stripes S1 and S2 are local to the fork and no snapshots of the fork currently exist. As such, the fork is currently free to delete object 1920. The head object 1913 for the fork having the new mapping table 1914' is stored in KVS with a current tag of 1 and range [1,1].

Figure 19F:
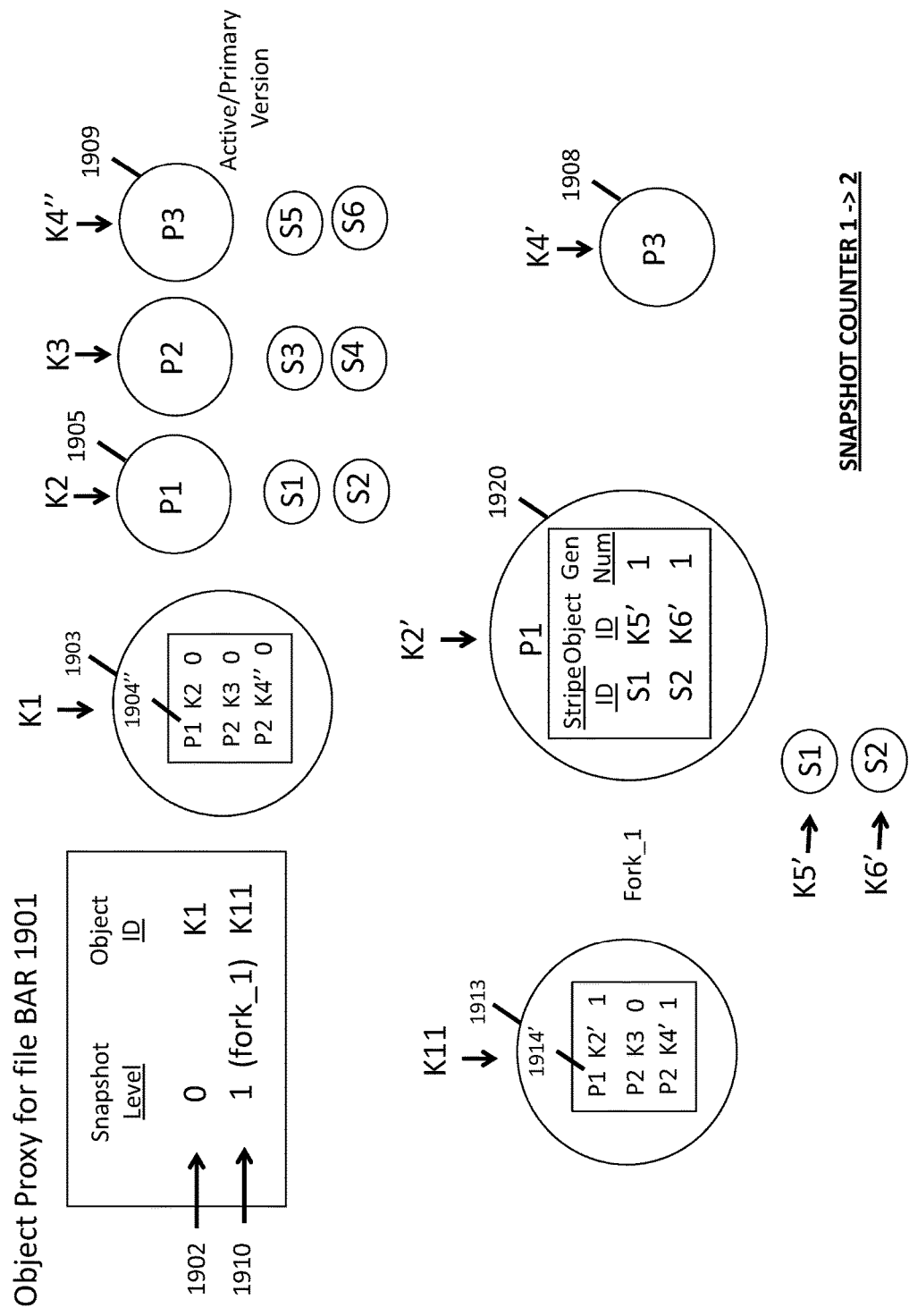

After the changes to stripes S1 and S2 are made, as observed in FIG. 19F, a global snapshot is taken of the entire storage system. As described in the preceding section, in response, the snapshot counter is incremented from a value of 1 to a value of 2.

Figure 19G:
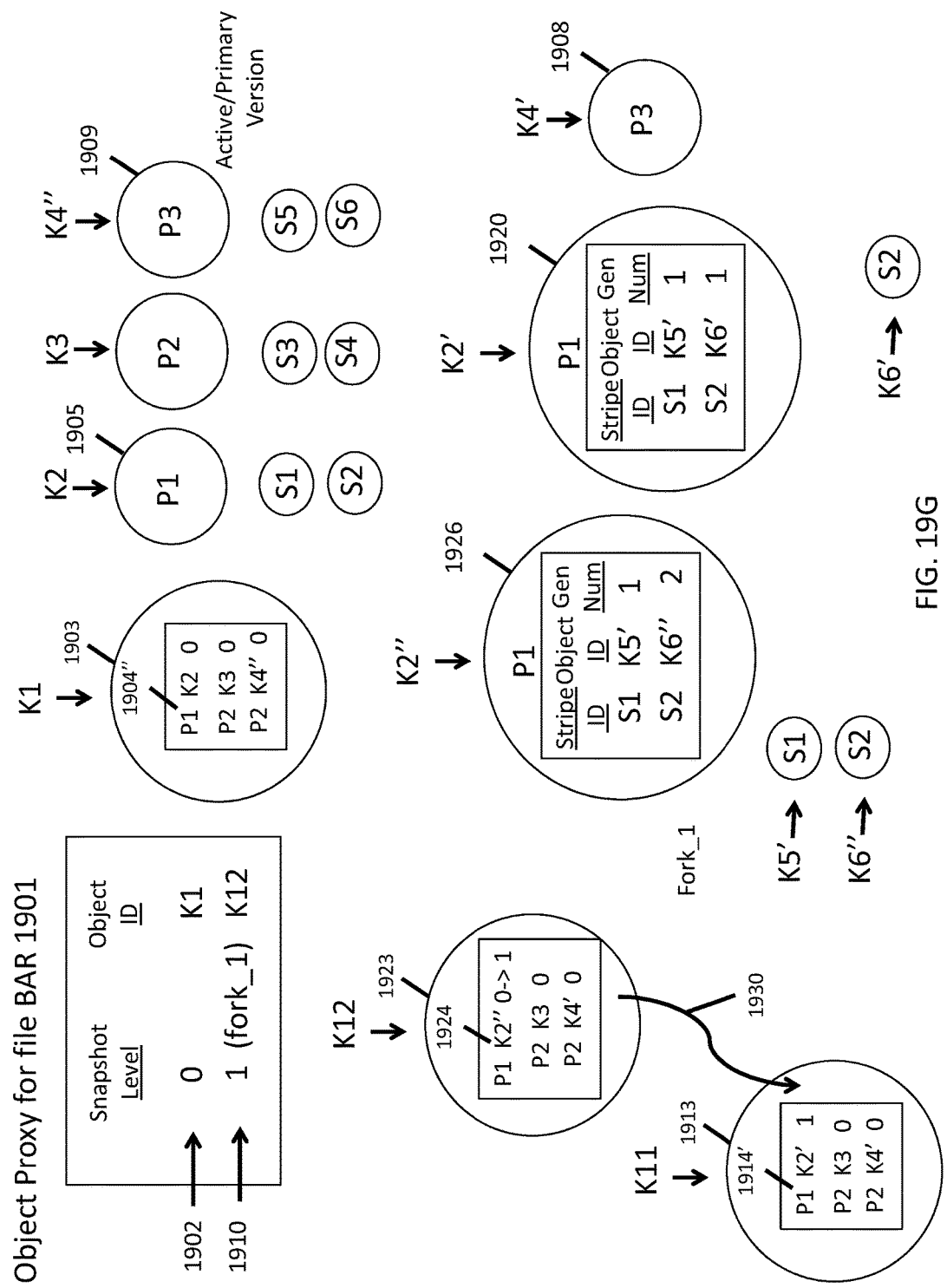

After the global snapshot counter is incremented to reflect the taking of the global snapshot, as observed in FIG. 19G, another change is made to the fork. Specifically, a modification is made only to stripe S2 which creates a new object, referenced by key/object ID K6", in which the new modified version of stripe S2 is kept. As discussed in the preceding section, the current tag value (1) of the head object 1913 for the fork is compared against the value of the snapshot counter (2). Because they are different, the head object 1913 is stored in KVS with its mapping table 1914' to preserve the state of the fork at the moment the snapshot was taken. That is, the head object 1913 having a range of [1,1] is preserved in KVS.

A second head object 1923, referenced by key/object ID K12, is created to represent the new "head" of the fork which includes a mapping table 1924 that is initially identical in content to its parent mapping table 1914' in terms of the objects that it refers to. However, the initial markings of the entries on the mapping table 1924 are modified where appropriate to reflect that none of them may be deleted (because the parent version 1913 now relies on them). The second head object 1923 also contains a reference 1930 to parent head object 1913 to "chain" the different snapshot versions of the fork together in a backward referenced fashion. Also, entry 1910 in the object proxy 1901 is modified to reflect that the new head of the fork is kept in the head object 1923 referenced by K12 (alternatively, the new head object 1923 can be given key K11 and the parent head object 1913 can be given new key K12 thereby not requiring any change to the proxy 1901). Should a user seek the snapshot level of the first snapshot taken of the fork, represented by head object 1913, the user's access will first be referenced to head object 1923 in K12 by way of the object proxy and will then referenced back to the correct head object 1913 through reference 1930.

The modification to stripe S2 along the fork additionally includes the following activities. A new object, referenced by K6" is created to store the new version of S2 and a new page P1 is created that references new object K6" and increments the gen number for S2 from 1 to 2. Another new object 1926, referenced by K2", is created to store the new version of P1. The mapping table 1924 of the new fork head object 1923 is amended to reference the new object 1926 that contains the new version of P1. Because the mapping table 1924 originally indicated that none of its entries may be deleted, the object that contains original page P1 in K2' is not deleted (because the first snapshot depends on it). However when the mapping table 1924 is modified to replace the entry for P1 with the new object 1926, the entry for P1 is marked to indicate that it can be deleted as no other versions of the BAR file depend on it. Likewise, the entry for P1 in mapping table 1914' that references K2' may also be modified to reflect that the first snapshot level may delete it since no other version depends upon it. The second head object 1923 has a current tag of 2 and a range of [2,2].

If a second global snapshot were to be taken at this point and then the first snapshot level were to be consolidated into the second snapshot level (e.g., the first snapshot level is old/stale enough and can be rid off, however, the second snapshot level still depends on its objects), head objects 1913 and 1923 could be "merged" to form a head object (which can remain in object 1923) now having range [1,2] to reflect the merger and providing the head object 1923 with ownership of both versions of P1 (referenced by K2' and K2"). The range information [1,2] can be used, e.g., for subsequent snapshot requests to recognize which snapshot levels have been consolidated into object 1923. Because new head object 1923 has ownership of both versions and the first snapshot level has been removed, object 1920 referenced by K2' can deleted. The remainder of the discussion will assume that neither the second snapshot nor the merger occurred.

Figure 19H:
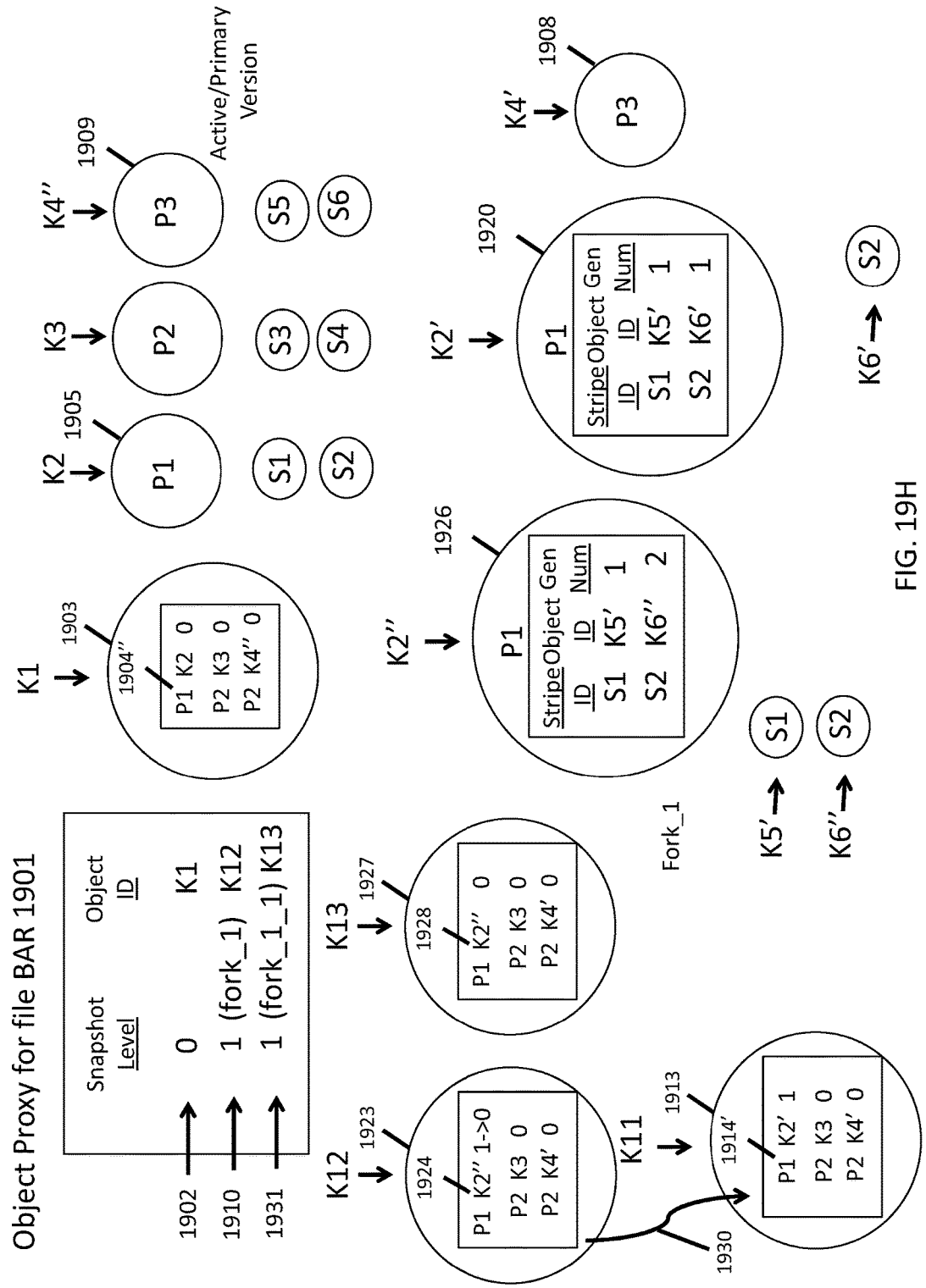

After the head object 1923 has been stored in KVS, a "local" fork from head object 1923 is taken. That is, a second fork from the first fork is taken that is specific to the BAR file and is not the result of a "global" fork taken across the entire storage system. Because the fork is a local fork there is no increment of the global snapshot counter associated with the local fork (here, a special "local fork bit" may be set to trigger creation of the local fork upon a next change to the BAR file). Referring to FIG. 19H the object proxy 1901 is therefore modified again to include a reference 1931 to the new fork which is realized with the creation of new head object 1927, referenced by key K13, that contains a mapping table 1928 whose page to object references are identical to mapping table 1924. The entries of both of mapping tables 1924 and 1928 are marked to indicate that their respective pages cannot be deleted because the first fork and second forms depend on them.

Figure 19I:
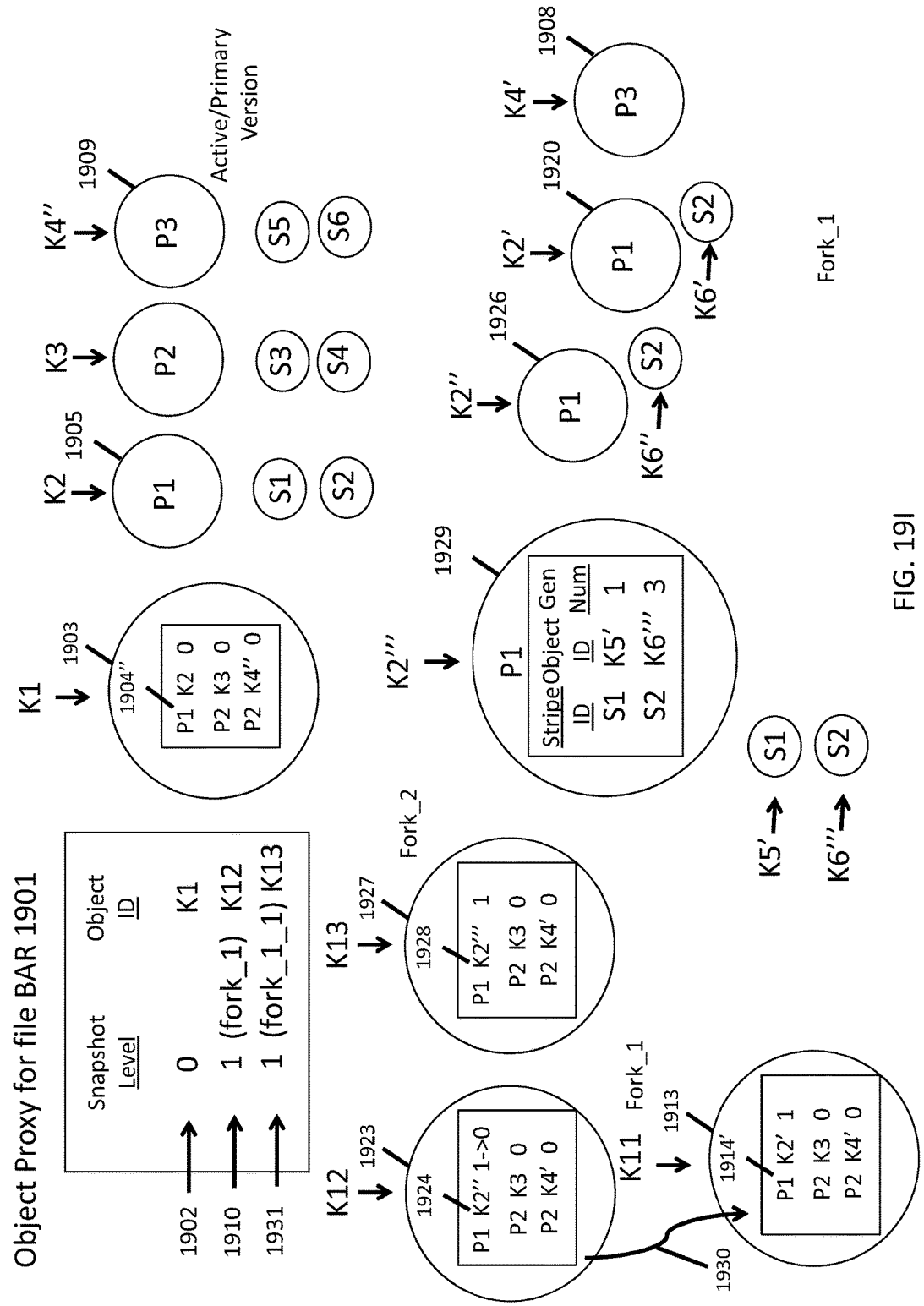

As observed in FIG. 19I a modification is made to the second fork's version of S2 which creates another version of S2 kept in K6'''. Here, the mapping table 1928 of the head object 1927 for the second fork is modified to include an entry for a new page P1 that is kept in a new object 1929. The new page P1' refers to a new data object K6''' that contains the new version of S2 and having a gen number that has been incremented from 2 to 3. The original object 1926 containing the second fork's initial version of page P1 in object 1926 is not deleted because of the markings originally found in table 1928 that indicated no pages could be deleted. However, the newly created entry in mapping table 1928 that refers to object 1929 for page P1 is marked to indicate that it can be deleted as no other version of the BAR file depends upon it. The head object 1927 for the second fork is stored in KVS with range [3,3].

Note that a "local snapshot" can effectively be implemented by forming a local fork and then not modifying it (e.g., by writing a change to it). This can be done in various ways such as simply creating a local fork and not permitting any children to derive from it. Alternatively, a child may be created from the local snapshot which acts as a seed (by writing a modification) but the child object has a reference, similar to the relationship between objects 1923 and 1913, back to the seed local fork. The object proxy in an embodiment only refers to the youngest child from the seed to keep the size of the object proxy manageable. The children back reference to one another to rely on the objects of their parent(s). By chaining through the back references the seed/snapshot view can be obtained. In an embodiment, the local snapshot level or local snapshot count is tracked by reference to the local fork identifiers (e.g., the second "1" in the notation fork_1_1 in reference 1931 of the object proxy).

Additionally it is pertinent to recognize that with respect to any of the various methodologies and processes described above, after an object is called up from KVS and subsequently manipulated or otherwise used in system memory it may be kept in system memory (e.g., as a form of caching layer above KVS) or may be written back to KVS after manipulation is made to it or it is otherwise used. Exactly what policies apply that dictate when an object called up from KVS is to be written back to KVS from system memory after manipulation is made to it or it is otherwise used may vary from embodiment depending on factors such as the size of system memory, the number of objects in system memory, priorities given to threads or applications running the methodologies/processes, the length of time an object has remained in system memory without accessed made to it, etc. Thus, with respect to the processes described above objects may be written back to KVS from system memory after being called up from KVS according to a wide range of possibilities and/or factors.

Additionally it is pertinent to recognize that with respect to any of the various methodologies and processes described above, after an object is called up from KVS and subsequently manipulated or otherwise used in system memory it may be kept in system memory (e.g., as a form of caching layer above KVS) or may be written back to KVS after manipulation is made to it or it is otherwise used. Exactly what policies apply that dictate when an object called up from KVS is to be written back to KVS from system memory after manipulation is made to it or it is otherwise used may vary from embodiment depending on factors such as the size of system memory, the number of objects in system memory, priorities given to threads or applications running the methodologies/processes, the length of time an object has remained in system memory without accessed made to it, etc. Thus, with respect to the processes described above objects may be written back to KVS from system memory after being called up from KVS according to a wide range of possibilities and/or factors.

Note that the comments made above with respect to FIGS. 13 and 14 concerning platform level details also apply to any of the global or local snapshot or branching/forking operations or other approaches discussed above in Sections 5.0 and 6.0 with respect to FIGS. 15 through 19, such as the CNS nodes depicted in FIG. 15 and any of the snapshot and/or branching or other processes they may perform as discussed above in Sections 5.0 and 6.0.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:

recognizing the taking of a snapshot of an object storage system by incrementing a snapshot counter from a first snapshot counter value to a second snapshot counter value, said object storage system implemented with multiple distributed consistent databases each characterized as a cluster of one or more objects containing hierarchical organizational information of the object storage system and/or data stored by the object storage system, said snapshot preserving state of said multiple distributed consistent databases;

in response to a desire to impart a change to any one of said distributed consistent databases subsequent to said taking of said snapshot, performing the following:

obtaining a proxy for said distributed consistent database by progressing through the respective hierarchical organizational information contained in more than one of said distributed consistent databases, said proxy identifying a current tag for an active version of said distributed consistent database and respective older current tags of parent versions of said distributed consistent database;

comparing said current tag of said active version with said second snapshot counter value and recognizing that content of said active version is to be saved;

in response to said recognizing that content of said active version is to be saved, updating said proxy to include an association between said current tag of said active version and an object storage identifier for a version of said distributed consistent database that stores said content, updating a next active version's current tag to said second snapshot counter value and reflecting the same in said proxy, and saving said change into said next active version.

2. The method of claim 1 wherein said method further comprises performing the following in response to recognizing that said content is to be saved:

marking entries on a mapping table of said active version as not eligible for deletion, said mapping table correlating identifiers of pages of said active version's hierarchy of pages to identifiers of objects where said pages are kept, said hierarchy of pages not reflecting said change.

3. The method of claim 2 wherein said method further comprises making a second change to said next active version that causes generation of a new object identifier for a particular page identifier and, as a consequence of said marking, not deleting an identifier of an object that keeps said particular page's version as it existed prior to said first change.

4. The method of claim 1 wherein said method further comprises:
recognizing the taking of another snapshot of the object storage system by incrementing said snapshot counter from the second snapshot counter value to a third snapshot counter value;
in response to a desire to impart a second change to said distributed consistent database subsequent to said taking of said another snapshot, performing the following:
obtaining said proxy for said distributed consistent database by progressing through the respective hierarchical organizational information contained in more than one of said distributed consistent databases, said proxy identifying said next active version's current tag and respective older current tags of parent versions of said distributed consistent database including said active version;
comparing said next active version's current tag with said third snapshot counter value and recognizing that content of said next active version is to be saved;
in response to said recognizing that content of said next active version is to be saved, updating said proxy to include an association between said next active version's current tag and an object storage identifier for a version of said distributed consistent database that stores said next active version's content, updating another next active version's current tag to said third snapshot counter value and reflecting the same in said proxy, and saving said second change into said another next active version.

5. The method of claim 1 wherein said method further comprises making changes to said content.

6. The method of claim 5 further comprising recognizing said changes as part of a branch.

7. The method of claim 6 wherein said proxy records an object identifier for a head of a branch but not object identifiers for head objects of parent snapshots along the branch.

8. The method of claim 7 wherein a data structure kept at a root of the storage system keeps track of respective snapshot levels where branches have been taken from.

9. The method of claim 1 wherein said method further comprises marking said snapshot for deletion and performing the following in response thereto:
comparing entries of a first mapping table for said active version against a second mapping table for said next active version and a current mapping table for said distributed consistent database;
permitting deletion of object identifiers of said entries that are not part of said second mapping table for said next active version and said current mapping table for said distributed consistent database.

10. The method of claim 1 further comprising:
recognizing a taking of a snapshot of a particular distributed consistent database within said object storage system by incrementing a snapshot counter that is specific to said particular distributed consistent database;
subsequent to said taking of said snapshot of said particular distributed consistent database, recognizing a change to be made to a data object of said particular distributed consistent database;

modifying leaf page information that contains a reference to an object proxy that identifies a current version of said data object having said change to also include a reference to the version of said data object that existed when said snapshot was taken prior to said change.

11. The method of claim 1 further comprising:
forming first and second branches from a snapshot level of said object storage system;
assigning a first of said branches to a first group of users and assigning a second of said branches to a second group of users.

12. The method of claim 1 further comprising:
forming first and second branches from a snapshot level of said object storage system;
assigning a first of said branches to a virtual machine and assigning a second of said branches to a second virtual machine.

13. A method, comprising:
keeping a proxy for stored data within an object storage system composed of multiple distributed consistent databases each characterized as a cluster of one or more objects containing hierarchical organizational information of the object storage system and/or data stored by the object storage system, said proxy identifying a first distributed consistent database, said first distributed consistent database containing an object identifier for said stored data;
copying information of said first distributed consistent database as part of forming a second distributed consistent database, said second distributed consistent database representing a seed for a fork within said object storage system, wherein said information identifies pages and their respective keys shared by both said first and second distributed consistent databases and that the same cannot be deleted;
updating said proxy to indicate the existence of the first distributed consistent database and the existence of the fork seeding from the second distributed consistent database;
in response to making a change to said fork, changing said second distributed consistent database's version of said information to indicate that a leaf page that was modified as a consequence of said change can be deleted.

14. The method of claim 13 further comprising taking a snapshot of said storage system.

15. The method of claim 13 further comprising taking a snapshot only of said second distributed consistent database.

16. The method of claim 13 wherein said fork is a global fork of said storage system.

17. The method of claim 13 wherein said fork is a local fork of said first distributed consistent data base.

18. A non transitory machine readable medium containing program code that when processed by a computing system causes a method to be performed, the method comprising:
recognizing the taking of a snapshot of an object storage system by incrementing a snapshot counter from a first snapshot counter value to a second snapshot counter value, said object storage system implemented with multiple distributed consistent databases each characterized as a cluster of one or more objects containing hierarchical organizational information of the object storage system and/or data stored by the object storage system, said snapshot preserving state of said multiple distributed consistent databases;
in response to a desire to impart a change to any one of said distributed consistent databases subsequent to said taking of said snapshot, performing the following:

obtaining a proxy for said distributed consistent database by progressing through the respective hierarchical organizational information contained in more than one of said distributed consistent databases, said proxy identifying a current tag for an active version of said distributed consistent database and respective older current tags of parent versions of said distributed consistent database;

comparing said current tag of said active version with said second snapshot counter value and recognizing that content of said active version is to be saved;

in response to said recognizing that content of said active version is to be saved, updating said proxy to include an association between said current tag of said active version and an object storage identifier for a version of said distributed consistent database that stores said content, updating a next active version's current tag to said second snapshot counter value and reflecting the same in said proxy, and saving said change into said next active version.

19. A computer system having a processor coupled to a memory, the memory containing program code that when processed by the processor causes a method to be performed, comprising:

keeping a proxy for stored data within an object storage system composed of multiple distributed consistent databases each characterized as a cluster of one or more objects containing hierarchical organizational information of the object storage system and/or data stored by the object storage system, said proxy identifying a first distributed consistent database, said first distributed consistent database containing an object identifier for said stored data;

copying information of said first distributed consistent database as part of forming a second distributed consistent database, said second distributed consistent database representing a seed for a fork within said object storage system, wherein said information identifies pages and their respective keys shared by both said first and second distributed consistent databases and that the same cannot be deleted;

updating said proxy to indicate the existence of the first distributed consistent database and the existence of the fork seeding from the second distributed consistent database;

in response to making a change to said fork, changing said second distributed consistent database's version of said information to indicate that a leaf page that was modified as a consequence of said change can be deleted.

* * * * *